(12) United States Patent
Kitani

(10) Patent No.: US 7,984,499 B2
(45) Date of Patent: Jul. 19, 2011

(54) PROCESSING DEVICE AND ASSOCIATED METHODOLOGY FOR AUTHORIZED DEVICE CERTIFICATE UPDATING

(75) Inventor: Satoshi Kitani, Tokyo (JP)

(73) Assignee: Sony Corporation, Tokyo (JP)

( * ) Notice: Subject to any disclaimer, the term of this patent is extended or adjusted under 35 U.S.C. 154(b) by 1221 days.

(21) Appl. No.: 11/596,006

(22) PCT Filed: Apr. 25, 2005

(86) PCT No.: PCT/JP2005/007855
§ 371 (c)(1),
(2), (4) Date: Dec. 14, 2006

(87) PCT Pub. No.: WO2005/109747
PCT Pub. Date: Nov. 17, 2005

(65) Prior Publication Data
US 2007/0209077 A1    Sep. 6, 2007

(30) Foreign Application Priority Data

May 10, 2004 (JP) ................................. 2004-140210
Jun. 7, 2004 (JP) ................................. 2004-168489

(51) Int. Cl.
*G06F 21/00* (2006.01)
(52) U.S. Cl. ............... 726/19; 713/156; 726/6; 726/10; 726/18
(58) Field of Classification Search ............ 726/16–19, 726/5–7, 31; 713/155–158, 173, 175
See application file for complete search history.

(56) References Cited

U.S. PATENT DOCUMENTS 5,748,740 A * 5/1998 Curry et al. ............... 705/65
2002/0056747 A1 * 5/2002 Matsuyama et al. .......... 235/382
2003/0093676 A1 * 5/2003 Kawamura et al. .......... 713/175
2004/0078338 A1 * 4/2004 Ohta et al. ................... 705/51
2004/0243805 A1 * 12/2004 Enokida ....................... 713/175

FOREIGN PATENT DOCUMENTS

JP    2004 7328    1/2004
JP    2004 80174   3/2004

OTHER PUBLICATIONS

Blundo et al. A Softyware Infrastructure for Authenticated Web Metering. IEEE Computer Society(Apr. 2004)[online], [retrieved on Sep. 24, 2010].Reterieved from the Internet <IEEE Xplore>.*

* cited by examiner

*Primary Examiner* — Minh Dinh
*Assistant Examiner* — Venkat Perungavoor
(74) *Attorney, Agent, or Firm* — Oblon, Spivak, McClelland, Maier & Neustadt, L.L.P.

(57) ABSTRACT

A configuration for preventing authentication processing due to continuous use of an old authorized device certificate, and illegal use of contents is provided. An arrangement is made wherein with playback or recording processing of contents accompanying data transfer between two different devices such as a drive and a host or the like, when performing mutual authentication between devices for executing data transfer, the number of times of authentication is counted, and in the event of this reaching a predetermined upper limit value of the number of times of authentication, authentication processing is cancelled, and it is necessary to update a certificate to be applied to authentication. The present configuration eliminates contents use due to continuity of authentication processing to which an old certificate is applied, and enables prompting a user to obtain the newest certificate.

20 Claims, 38 Drawing Sheets

FIG. 14

(a) PUBLIC KEY CERTIFICATE (PKC) DATA

| CERTIFICATE ID |
|---|
| PUBLIC KEY |
| OTHER INFORMATION (E.G., VERSION, ISSUER) |

(b) STRUCTURE EXAMPLE OF PUBLIC KEY CERTIFICATE (PKC) IN THE CASE OF EMPLOYING ELLIPTICAL ENCRYPTION

| BYTE | BIT 7 | 6 | 5 | 4 | 3 | 2 | 1 | 0 |
|---|---|---|---|---|---|---|---|---|
| 0 | CERTIFICATE TYPE = 1 ||||||||
| 1 | RESERVED ||||||||
| 2 | |||||||| 
| 3 | CERTIFICATE ID (40 BITS) ||||||||
| : | ||||||||
| 7 | ||||||||
| 8 | PUBLIC KEY (320 BITS) ||||||||
| : | ||||||||
| 47 | ||||||||
| 48 | SIGNATURE (320 BITS) ||||||||
| : | ||||||||
| 87 | ||||||||

FIG. 15

(a) AUTHORIZED DEVICE GROUP CERTIFICATE (ADGC) DATA (CERTIFICATE DATA)

| AUTHORIZED DEVICE GROUP CERTIFICATE DATA LENGTH (AGDC LENGTH) |
|---|
| ADGL SEQUENCE NUMBER |
| AIC DATA |
| FIRST PUBLIC KEY CERTIFICATE ID (FIRST PKC–ID WITHIN ADGC) |
| LAST PUBLIC KEY CERTIFICATE ID (LAST PKC–ID WITHIN ADGC) |
| AUTHORIZED PUBLIC KEY CERTIFICATE INFORMATION |

(b) STRUCTURE EXAMPLE OF AUTHORIZED DEVICE GROUP CERTIFICATE IN THE CASE OF EMPLOYING ELLIPTICAL ENCRYPTION (ADGC: AUTHORIZED DEVICE GROUP CERTIFICATE)

| BYTE | BIT 7 | 6 | 5 | 4 | 3 | 2 | 1 | 0 |
|---|---|---|---|---|---|---|---|---|
| 0 | CERTIFICATE TYPE = 2 ||||||||
| 1 | ADGC LENGTH (N+12 BYTES) ||||||||
| 2 |  ||||||||
| 3 | ADGC SEQUENCE NUMBER ||||||||
| 4 |  ||||||||
| 5 | AIC DATE ||||||||
| 6 |  ||||||||
| 7 | FIRST PUBLIC KEY CERTIFICATE ID IN ADGC (40 BITS) ||||||||
| : |  ||||||||
| 11 |  ||||||||
| 12 | LAST PUBLIC KEY CERTIFICATE ID IN ADGC (40 BITS) ||||||||
| : |  ||||||||
| 16 |  ||||||||
| 17 | AUTHORIZED PUBLIC KEY CERTIFICATE INFORMATION (N BYTES) ||||||||
| : |  ||||||||
| N+16 |  ||||||||
| N+17 | SIGNATURE (320 BITS) ||||||||
| : |  ||||||||
| N+56 |  ||||||||

(c) AUTHORIZED DEVICE GROUP LIST (ADGL: AUTHORIZED DEVICE GROUP LIST)

| LIST DATA LENGTH (ADGL LENGTH) |
|---|
| AIC DATA |
| NUMBER OF ADGC (n) |
| ADGC_1 |
| ADGC_2 |
| : |
| ADGC_n |

FIG. 16

(a) ADGL INFORMATION CERTIFICATE (CERTIFICATE DATA)

| ADGL SEQUENCE NUMBER | AIC DATA | RESERVED |
|---|---|---|

(b) EXAMPLE OF ADGL INFORMATION CERTIFICATE IN THE CASE OF EMPLOYING ELLIPTICAL ENCRYPTION (ADGL INFORMATION CERTIFICATE)

| BYTE | BIT 7 | 6 | 5 | 4 | 3 | 2 | 1 | 0 |
|---|---|---|---|---|---|---|---|---|
| 0 | | | | CERTIFICATE TYPE = 3 | | | | |
| 1 | ADGL SEQUENCE NUMBER | | | | | | | |
| 2 | | | | | | | | |
| 3 | AIC DATA | | | | | | | |
| 4 | | | | | | | | |
| 5 | | | | | | | | |
| : | | | | | | | | |
| 9 | | | | | | | | |
| 10 | RESERVED (40 BITS) | | | | | | | |
| : | | | | | | | | |
| 49 | SIGNATURE (320 BITS) | | | | | | | |

FIG. 17

| CERTIFICATE TYPE | INFORMATION RECORDING MEDIUM (DISC) | DRIVE | HOST |
|---|---|---|---|
| 1 (PUBLICATION KEY) CERTIFICATE: PKC) | NO RECORDING | STORE PKC IN NONVOLATILE MEMORY BEFORE SHIPPING | PKC IS STORED IN NONVOLATILE MEMORY BEFORE SHIPPING |
| 2 (AUTHORIZED DEVICE GROUP CERTIFICATE: ADGC)=ADGL | RECORDING TO LEAD-IN AREA | READ OUT ADGC FROM DISC AND TRANSFER TO HOST. REQUEST HOST TO TRANSFER ADGC IN WHICH HOST PUBLIC KEY CERTIFICATE ID IS REGISTERED, AND CONFIRM REGISTRATION OF HOST USING THIS. | OBTAIN ADGL OR ADGC RECORED IN DISC THROUGH DRIVE. ALTERNATIVELY, CAN BE OBTAINED FROM SERVER CONNECTED TO NETWORK. STORE IN NONVOLATILE MEMORY (ADGL-H). |
| 3 (ADGL INFORMATION CERTIFICATE: AIC) | RECORDING TO LEAD-IN AREA | READ OUT AIC FROM DISC. OR, RECEIVE AIC FROM HOST. STORE IN NON-VOLATILE MEMORY (AIC-D). | RECEIVE AIC FROM DRIVE. ALTERNATIVELY, CAN BE OBTAINED FROM A SERVER CONNECTED TO NETWORK. STORE IN NONVOLATILE MEMORY (AIC-H). |

(c) COMPARATIVE UPDATING PROCESSING 3

FIG. 32
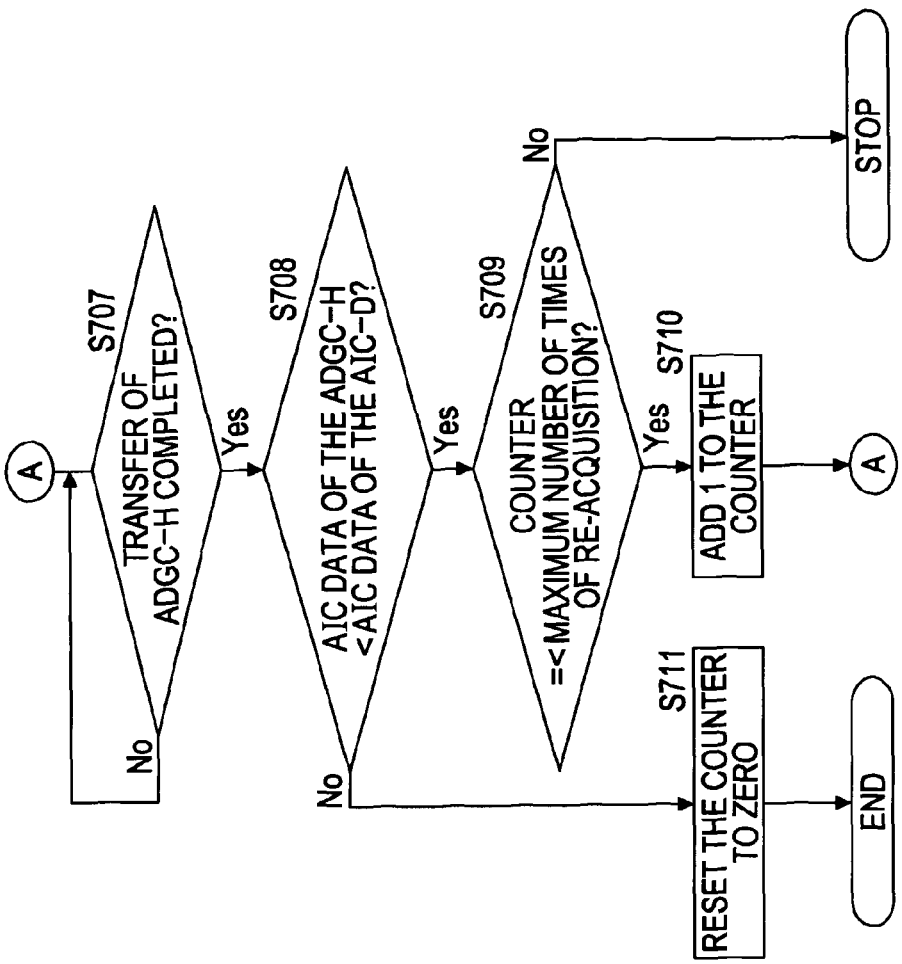
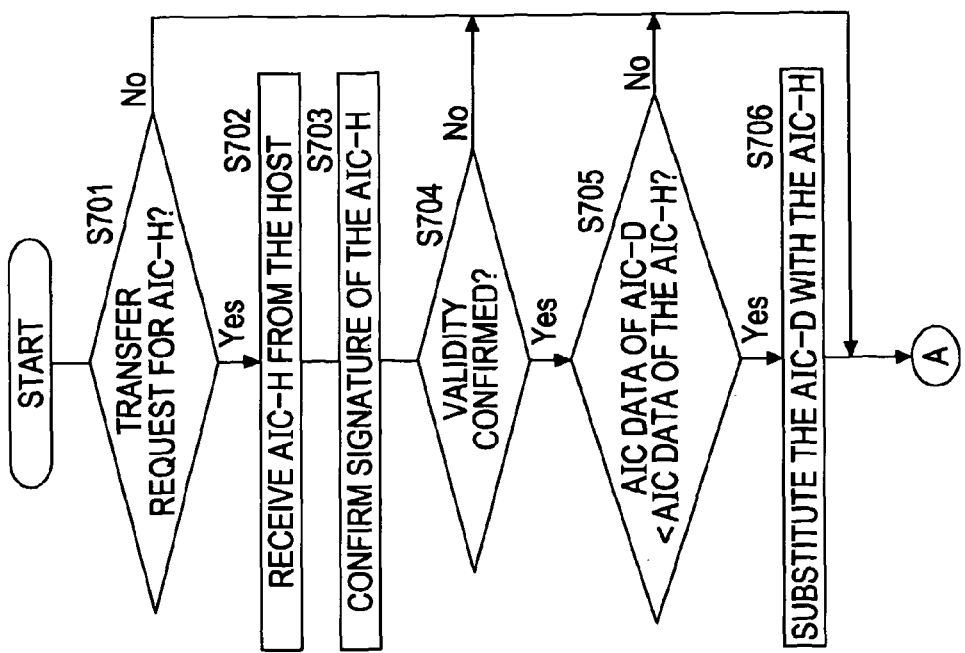

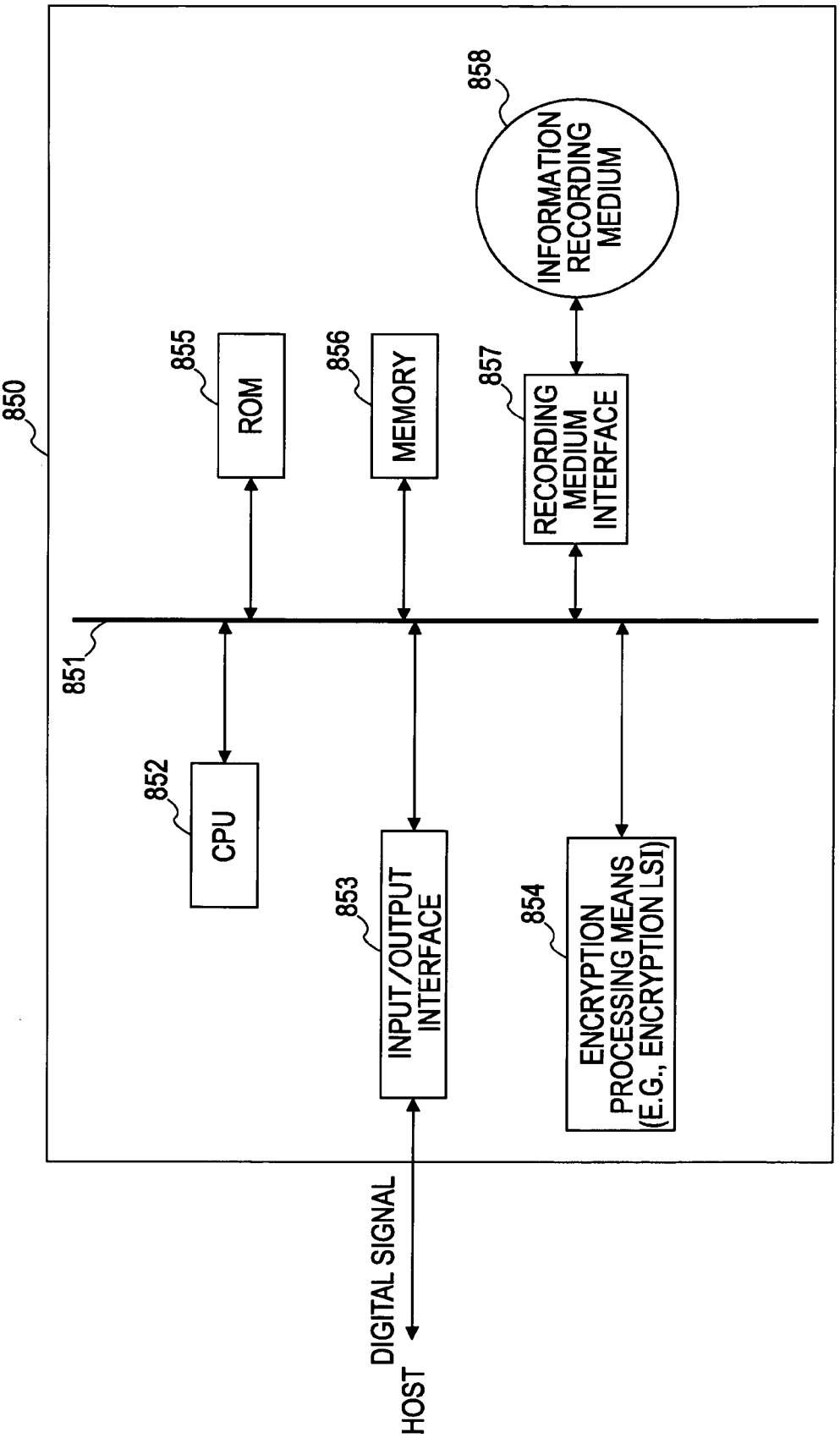

PROCESSING DEVICE AND ASSOCIATED METHODOLOGY FOR AUTHORIZED DEVICE CERTIFICATE UPDATING

TECHNICAL FIELD

The present invention relates to an information processing device. Further in detail, the present invention relates to an information processing device wherein illegal use of contents is prevented.

BACKGROUND ART

In recent years, information recording media capable of storing large-capacity data, such as DVD, Blu-ray Disc, and so forth have become widely used, and a use mode for recording/playing back digital contents, for example, such as high-resolution image data, high-quality audio data, and so forth in/from a recording medium such as a disk or the like has been commonized.

Examples of a mode for performing contents playback from an information recording medium, contents recording processing to an information recording medium include a mode for utilizing a drive for driving an information recording medium (disc), and a device in which playback/recording processing functions are integrated, and a processing mode for connecting a drive and an information processing device serving as a host, for example, such as a PC or the like for executing a playback processing or recording processing program using a bus or the like, and performing data transfer between the drive and the host.

For example, as for issues in the case of performing data transfer between a drive and a host, there is an issue wherein unauthorized contents use, and probability of outflow increase. With regard to many contents such as music data, image data, and so forth, distribution rights thereof and so forth are generally held by originator or seller thereof. Accordingly, when distributing these contents, a certain use restriction and so forth is generally employed, i.e., an arrangement is made wherein authorized users alone are allowed to use contents, and it is prevented from performing unauthorized copying.

Employing a digital recording device and a recording medium enables recording and playback to be repeated without deteriorating images and audio, and accordingly, distribution of contents copied illegally, and circulation of pirated discs in which contents are copied in a recording medium such as CD-R, DVD, or the like have become a major issue.

Visual information and music information can be stored in a large-capacity-type recording medium such as DVD, Blue-ray Disc, or the like. In the event of circulating such a digital data recording medium in a market, it is indispensable to employ a configuration for preventing illegal copying, and realizing protection of a copyright holder. Nowadays, in order to prevent such illegal copying of digital data, various techniques for preventing illegal copying to a digital recording device and a recording medium have been put into practical use.

For example, with DVD players, the contents scrambling system (CSS) has been employed. With the contents scrambling system, video data, audio data, or the like is encrypted and recorded in a recording medium, for example, DVD-ROM (Read Only Memory), the key to be employed for decrypting encrypted data thereof is provided to only the players which received license thereof. A license is provided to only the players designed to follow predetermined operation rules such as not performing illegal copying, and so forth.

Accordingly, the player which has received a license can play back images and audio by decrypting encrypted data recorded in an information recording medium using the provided key.

On the other hand, the player which has not received a license has no key to decrypt encrypted data, so cannot decrypt encrypted data recorded in an information recording medium. Thus, the contents scrambling system (CSS) provides a system for allowing only the players possessing an authorized license to use contents.

However, the contents scrambling system (CSS) includes an issue wherein it is difficult to eliminate illegal use of contents in a sure manner. Particularly, with processing for playing back contents by outputting contents from a drive mounting an information recording medium to an information processing device such as a PC or the like, an issue wherein illegal use of contents can be performed occurs. Description will be made below regarding this issue with reference to drawings.

FIG. 1 illustrates a data example stored in an information recording medium storing contents employing the contents scrambling system (CSS), and processing of a playback instrument (player).

The information recording medium 10 illustrated in FIG. 1 is, for example, a DVD video disc, which stores an encrypted disc key (secured disc key) 11, an encrypted title key 12 corresponding to the title of contents stored in the information recording medium 10, and scrambled MPEG data 13 which is contents subjected to scrambling based on the CSS method.

A playback instrument 20 for executing playback of contents while mounted on the information recording medium 10, for example, a DVD player executes decrypting processing of the encrypted disc key (secured disc key) 11 to obtain a disc key by applying a master key stored in the playback instrument 20 in step S11, executes decrypting processing of the encrypted title key 12 obtained from the information recording medium 10 to obtain a title key by applying the disc key obtained in step S12, and executes descrambling processing of the scrambled MPEG data 13 by applying the obtained title key in step S13, following which executes MPEG decoding processing to play back audio/visual data 25 in step S14.

Next, description will be made regarding a processing sequence wherein contents is input from a drive connected to a host (e.g., PC) for executing an player application serving as a contents playback processing program to the host (PC) side, and playback of the contents is performed using the player application of the host.

As illustrated in FIG. 2, mutual authentication and key sharing (AKE: Authentication and Key Exchange) is performed between a drive 30 mounted on an information recording medium and a player application 40 at the host side in steps S31 and S41 illustrated in the drawing. The mutual authentication processing is performed in accordance with an algorithm following the public key encryption method, for example. A session key is generated in the mutual authentication, and the drive 30 and the player application 40 at the PC side share the session key.

The drive 30 executes re-encryption of the encrypted disc key 11 obtained from the information recording medium by applying the session key to transmit this key to the player application 40 in step S32, and also executes re-encryption of the encrypted title key 12 obtained from the information recording medium by applying the session key to transmit this key to the player application 40 in step S33. The drive 30, and the PC serving as the execution device of the player application 40 are connected to a connection bus, e.g., an ATAPI- BUS, such encrypted key information is transmitted to the player application 40 side of the host (PC) via the connection bus.

Further, the drive 30 outputs the scrambled MPEG data 13 which is contents, which is obtained from the information recording medium, and is subjected to scrambling processing based on the CSS method, to the PC side via the connection bus between the drive and PC.

The player application 40 at the PC side obtains the encrypted disc key 11 by decrypting the re-encrypted data using the session key of the encrypted disc key 11 received from the drive 30 in step S42, and further obtains the encrypted title key 12 by decrypting the re-encrypted data using the session key of the encrypted title key 12 received from the drive 30.

The subsequent processing in step S51 through S55 is the same processing as the processing (S11 through S14) previously described with reference to FIG. 1.

The drawing in which the processing at the drive side in the processing illustrated in FIG. 2 is represented with a flowchart is FIG. 3. Upon determination being made in step S61 that the information recording medium (disc) is inserted, the drive 30 executes mutual authentication and key sharing (AKE: Authentication and Key Exchange) as to the host, i.e., the PC executing the player application 40 illustrated in FIG. 2 in step S62.

Upon achieving the mutual authentication and key sharing (AKE) (Yes in step S63), transition into a state wherein output of the CSS scrambled data which is contents stored in an information recording medium mounted on the drive is permitted occurs, and this state in which output of the CSS scrambled data is permitted continues until the information recording medium is ejected, or a power source is turned off.

Thus, the drive is set to a state in which output of the CSS scrambled data is not permitted before mutual authentication is established with an instrument serving as a contents output destination, and following mutual authentication with the instrument serving as a contents output destination being established, the drive is set to a state in which output of the CSS scrambled data is permitted, and this output permitted state continues until the information recording medium is ejected, or the power source is turned off.

The illegal use of contents illustrated in FIG. 4 can be caused depending on such a permissive condition of output of contents from the drive.

FIG. 4(1) illustrates a bypass use example of contents by switching the application at the host side such as a PC or the like serving as a contents output destination from the drive.

Description will be made regarding the processing (steps S71 through S73) at the host (PC) 60 side. In step S71, mutual authentication is performed between the drive 50 mounted on the information recording medium and the authorized player application of the host (PC) 60. According to establishment of this mutual authentication, the drive 50 is set to a state in which output of the CSS scrambled data is permitted.

In step S72, audio/visual data including the CSS scrambled data is read out from the drive 50, and is stored in a hard disk.

In step S73, the application is switched into a CSS descrambling software, and descrambling processing of the CSS scrambled data stored in the hard disk is performed.

Such processing enables descrambling, and the plaintext contents subjected to descrambling can be used without any restriction.

The processing illustrated in FIG. 4(2) illustrates an illegal use of contents due to wiretapping processing of the connection bus between the host (PC) and the drive, e.g., ATAPI-BUS.

Description will be made regarding the processing (steps S81 through S83) at the host (PC) 60 side. In step S81, mutual authentication is performed between the drive 50 mounted on the information recording medium and the authorized player application of the host (PC) 60 to perform obtaining and playback of contents.

The contents is input as CSS scrambled data via the connection bus between the host (PC) and the drive, e.g., ATAPI-BUS.

The host 60 performs monitoring of the connection bus between the host (PC) and the drive, and stores the data obtained by monitoring, i.e., CSS scrambled data in the hard disk.

In step S63, descrambling processing of the CSS scrambled data stored in the hard disk is performed by applying a CSS descrambling software.

Such processing enables contents subjected to descrambling to be obtained, and the plaintext contents subjected to descrambling can be used without any restriction.

Thus, the current contents scrambling system (CSS) cannot eliminate illegal use of contents in a sure manner. Particularly, as described above, the current contents scrambling system (CSS) includes an issue wherein illegal use of contents readily occurs when playing back contents by outputting contents from a drive mounted on an information recording medium to an information processing device such as a PC or the like.

DISCLOSURE OF INVENTION

Problems to be Solved by the Invention

The present invention has been made in light of the above issues, and it is an object of the present invention to provide an information processing device, and an information processing method, and a computer program, which enable illegal use of contents to be eliminated by strictly executing validity determination of a public key certificate to be applied to mutual authentication between devices for executing data transfer in playback or recording processing of contents accompanying data transfer between two different devices such as a drive and a host.

Further, in detail, it is an object of the present invention to provide an information processing device, and an information processing method, and a computer program wherein in the event of performing transfer of digital contents from the transmitting side (source) device of the contents to the receiving side (sync) device, mutual authentication based on public key encryption is performed between the devices, and a certificate (authorized device group certificate) is referenced to determine validity of the public key certificate of each device to be applied to the mutual authentication. At this time, new/old determination of a certificate is made based on data, for example, such as the number of registered devices, the number of invalid (revoked) devices, or the like to eliminate application of an old certificate (authorized device group certificate), thereby enabling illegal use of contents based on illegal authentication processing applying an old certificate to be eliminated, and further, a configuration is employed wherein the host counts the number of times of authentication as to the drive, and in the event of the number of times of authentication reaching a predetermined upper limit value, stops execution of authentication processing, and prompts the drive side to obtain a new certificate, whereby continuous use of an old certificate can be eliminated.

Means for Solving the Problems

A first aspect of the present invention is
an information processing device comprising:
a certificate storage unit for storing authorized device certificates;
an authentication execution unit for executing device authentication processing, and executing processing applying the authorized device certificate in the authentication processing; and
a count-value storage unit for counting the number of times of authentication to be executed via the authentication execution unit, and storing a count value;
wherein the authentication execution unit is configured so as to execute authentication processing under conditions that the count value of the number of times of authentication has not reached a predetermined upper value of the number of times of authentication.

Further, with an embodiment of the information processing device according to the present invention, the information processing device further includes an updating execution unit for executing updating processing of an authorized device certificate stored in the certificate storage unit in authorized device certificate obtaining processing via a communication unit, in the event that the count value of the number of times of authentication stored in the count-value storage unit has reached a predetermined upper limit of the number of times of authentication.

Further, with an embodiment of the information processing device according to the present invention, the information processing device executes reset processing of the count value of the number of times of authentication of the count-value storage unit along with updating processing of an authorized device certificate by the updating execution unit.

Further, with an embodiment of the information processing device according to the present invention, the information processing device is configured so as to execute obtaining of an authorized device certificate by the updating execution unit as obtaining processing from a server connected to a network.

Further, with an embodiment of the information processing device according to the present invention, the information processing device is configured wherein the updating execution unit includes an updating execution unit for executing validity confirmation processing of an authorized device certificate obtained externally, and executing updating processing of an authorized device certificate stored in the certificate storage unit in the case of confirming validity.

Further, with an embodiment of the information processing device according to the present invention, the information processing device is configured so as to execute notification processing as to a user, in the event that the count value of the number of times of authentication has reached a predetermined upper limit of the number of times of authentication.

Further, with an embodiment of the information processing device according to the present invention, the information processing device is configured so as to output at least part of certificate data of the certificates obtained externally by the updating execution unit to a drive serving as an entity with which authentication processing is being executed as certification data to be stored in the drive.

Further, with an embodiment of the information processing device according to the present invention, the information processing device is configured wherein the certificate data to be stored in the drive is a certificate including data to be applied to new/old comparison of an authorized device certificate.

Further, with an embodiment of the information processing device according to the present invention, the information processing device is configured wherein the data to be applied to new/old comparison of an authorized device certificate is any data of a sequence number to be recorded in an authorized device certificate, the number of registered devices, and the number of invalid (revoked) devices.

Further, a second aspect of the present invention is
an information processing method comprising:
a comparison step for executing comparison processing between the count value of the number of times of authentication, and a predetermined upper limit value of the number of times of authentication; and
an authentication step for executing authentication processing under conditions that the count value of the number of times of authentication has not reached a predetermined upper limit value of the number of times of authentication.

Further, with an embodiment of the information processing method according to the present invention, the information processing method further comprises a step for executing processing for counting up the count value of the number of times of authentication stored in a storage unit along with completion of the authentication step.

Further, with an embodiment of the information processing method according to the present invention, the information processing method further includes an updating step for executing obtaining processing of an authorized device certificate via a communication unit, and executing updating processing of an authorized device certificate stored in the certificate storage unit, in the event that the count value of the number of times of authentication stored in the count-value storage unit has reached a predetermined upper limit of the number of times of authentication.

Further, with an embodiment of the information processing method according to the present invention, reset processing of the count value of the number of times of authentication of the count-value storage unit is executed along with updating processing of an authorized device certificate in the updating step.

Further, with an embodiment of the information processing method according to the present invention, obtaining of an authorized device certificate in the updating step is executed as obtaining processing from a server connected to a network.

Further, with an embodiment of the information processing method according to the present invention, the updating step executes validity confirmation processing of an authorized device certificate obtained externally, and executes updating processing of an authorized device certificate stored in the certificate storage unit in the case of confirming validity.

Further, with an embodiment of the information processing method according to the present invention, the information processing method executes notification processing as to a user, in the event that the count value of the number of times of authentication has reached a predetermined upper limit of the number of times of authentication.

Further, with an embodiment of the information processing method according to the present invention, the information processing method further comprises a step for outputting at least part of certificate data of the certificates obtained externally in the updating step to a drive serving as an entity with which authentication processing is being executed as certification data to be stored in the drive.

Further, with an embodiment of the information processing method according to the present invention, the certificate data to be stored in the drive is a certificate including data to be applied to new/old comparison of an authorized device certificate.

Further, with an embodiment of the information processing method according to the present invention, the data to be applied to new/old comparison of an authorized device certificate is any data of a sequence number to be recorded in an authorized device certificate, the number of registered devices, and the number of invalid (revoked) devices.

Further, a third aspect of the present invention is a computer program comprising:

a comparison step for executing comparison processing between the count value of the number of times of authentication, and a predetermined upper limit value of the number of times of authentication; and an authentication step for executing authentication processing under conditions that the count value of the number of times of authentication has not reached a predetermined upper limit value of the number of times of authentication.

Note that a computer program according to the present invention is a computer program which can be provided to a computer system which can execute various types of program code with a recording medium or a communication medium which is provided in a computer-readable format, for example, a recording medium such as CD, FD, MO, or the like, or a communication medium such as a network. Such a program is provided in a computer-readable format, thereby realizing processing corresponding to the program on a computer system.

Further objects, features, and advantages of the present invention will become more fully apparent from detailed description of the present invention by way of the later-described embodiments of the present invention and the attached drawings. Note that the term "system" in the present specification means a logical group configuration of multiple devices, and is not restricted to a case in which the devices having the respective configurations are included in the same casing.

Advantages

According to the configuration of the present invention, an arrangement is made wherein with playback or recording processing of contents accompanying data transfer between two different devices such as a drive and a host or the like, when performing mutual authentication between devices for executing data transfer, the number of times of authentication is counted, and in the event of this reaching a predetermined upper limit value of the number of times of authentication, authentication processing is cancelled, and it is necessary to update a certificate to be applied to authentication, whereby contents use due to continuity of authentication processing to which an old certificate is applied can be eliminated, and obtaining of the latest certificate can be prompted.

With the configuration of the present invention, in the event of performing transfer of contents from the transmission side (source) device to the reception side (sync) device of the contents, an authorized device group certificate is applied to determine validity of the public key certificate of each device to be applied in mutual authentication employing the public key encryption method to be executed. Further, in order to perform new/old determination of this authorized device group certificate, an arrangement is made wherein an ADGL information certificate (AIC) in which the number of registered devices of an authorized device group list (registration list) set as a group of authorized device group certificates, the number of invalid (revoked) devices, or the like is set as registration data is applied, an arrangement is made wherein the recency of an authorized group certificate is determined based on the changing situation of the number of registered or revoked devices of the registration information, such as regarding a certificate of which the number of registered devices is great as a new one, or regarding a certificate of which the number of revoked devices is small as a new one, an arrangement is made wherein mutual authentication is executed by determining validity of the public key certificate of a device applying a new authorized device group certificate, and further, and an arrangement is made wherein the number of times of authentication is counted, and in the event of the counted value reaching a predetermined upper limit value, authentication is cancelled, it is necessary to update a certificate to be applied to authentication, thereby preventing authentication processing to which an old authorized device certificate is applied, preventing illegal contents acquisition, and eliminating illegal use of contents.

An arrangement is made wherein updating processing of an authorized device group list (registration list) which an information processing device stores is executed as appropriate based on an ADGL information certificate (AIC) in which the number of registered devices, the number of invalid (revoked) devices, or the like is set as registration data, whereby the storage list of the information processing device for executing playback or recording processing of contents can be updated as necessary.

Further, the number of registered devices or the number of revoked devices is applied to new/old determination of each certificate, whereby the number of rewriting of flash memory to be employed as nonvolatile memory for storing certificates of the drive or host can be reduced. That is to say, in the event of new/old determination using a sequence number, all sequence numbers are updated when a sequence number is changed, and accordingly, frequency in use of flash memory increases, but upon the number of registered devices or the number of revoked devices being applied to new/old determination of each certificate, it is unnecessary to perform updating of a certificate at the drive and host when the number of registered devices or the number of revoked devices is unchanged, resulting in reduction in the number of times of rewriting of the flash memory. Accordingly, small inexpensive memory can be mounted.

BRIEF DESCRIPTION OF THE DRAWINGS

FIG. 14 is a diagram describing the data configuration of a public key certificate.

FIG. 15 is a diagram describing the data configurations of an authorized device group certificate (ADGC) and an authorized group list (ADGL).

FIG. 16 is a diagram describing the data configuration of an ADGL information certificate (AIC).

FIG. 17 is a diagram describing certificates to be stored in an information recording medium, a drive, and an information processing device.

FIG. 32 is a flowchart describing processing of a drive at the time of updating processing of registration information based on AIC data=the number of revoked devices in the case of allowing re-obtaining of an ADGL in a host.

FIG. 38 is a diagram illustrating a configuration example of an information processing device serving as a drive of the present invention.

BEST MODE FOR CARRYING OUT THE INVENTION

Description will be made below in detail regarding an information processing device, and an information processing method, and a computer program according to the present invention with reference to the drawings. Note that description will be made in accordance with the following described items.

1. Data Stored in Information Recording Medium
2. Overview of Contents Playback Processing
3. Processing Accompanying Transfer of Contents between Drive and Host
4. Counting of the Number of Times of Authentication, and Certificate Updating Processing
5. Configuration of Information Processing Device

[1. Data Stored in Information Recording Medium]

Figure 5:
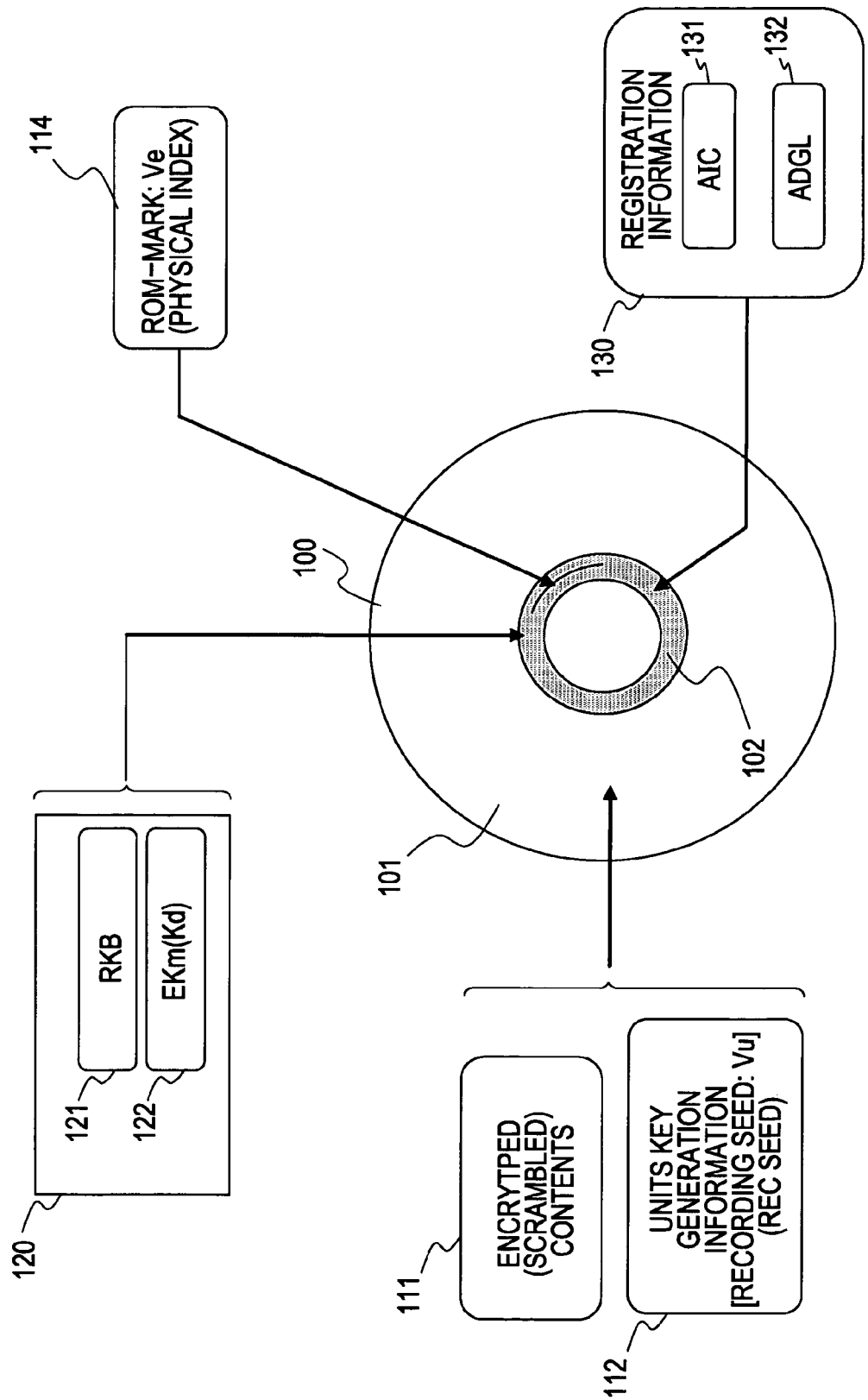
FIG. 5 is a diagram describing the data stored in an information recording medium of the present invention.

First, description will be made regarding data stored in an information recording medium. FIG. 5 illustrates one example of an information recording medium in which contents is stored.

This disc is, for example, an information recording medium such as a Blu-ray disc, DVD, or the like, which is an information recording medium storing authorized contents manufactured at a disc manufacturing factory under allowance of a so-called contents right holder having an authorized contents copyright, or a distribution right, or an information recording medium capable of recording contents. Note that with the following embodiments, description will be made regarding a disc-type medium as an example of an information recording medium, but the present invention can be applied to various types of information recording medium.

As illustrated in FIG. 5, an information recording medium 100 includes a data storage region 101 storing data such as contents and so forth, and a lead-in region 102 storing attendant information corresponding to a disc and stored contents, key information to be applied to decryption processing of contents, further a device for executing playback and recording processing of contents, i.e., a host such as a drive, PC, or the like, registration information such as a host application and the like, and so forth.

The data storage region 101 stores encrypted (scrambled) contents 111, and unit key generation information Vu112 which is a recording seed (REC SEED) serving as information necessary for generating of a key to be applied to decryption processing of encrypted contents. Note that scrambling processing is one pattern of encryption processing, and with the present specification, an expression called encrypted contents is employed as the leading concept of scrambled contents. The encrypted contents 111 is sectioned into a predetermined unit increments, and each unit is subjected to encryption applying the unit key corresponding to each unit, and is stored in the data storage region 101 of the information recording medium 100 in this state. The unit key generation information Vu112 is information to be applied to generation of these respective unit keys, and is also referred to as seed information.

The lead-in region 102 stores various types of information necessary for generating a key to be applied to decryption processing of the encrypted contents 111. One thereof is a ROM mark Ve114. The ROM mark Ve114 is also referred to as a physical index, which is fixed information which cannot be rewritten. The lead-in region 102 further stores encryption key information 120.

The encryption key information 120 is configured of key information (key generation information) for generating a key to be applied to decryption processing of the encrypted contents 111 stored in the data storage region 101 of the information recording medium, as with the above unit key generation information Vu112 and the ROM mark Ve114.

That is to say, the encryption key information 120 is information including, for example, an RKB (Renewal Key Block) 121 serving as an encryption key block necessary for obtaining a media key Km which is set as a key corresponding to contents stored in an information recording medium, and an encrypted disc key EKm (Kd) 122 obtained by encrypting a disc key Kd serving as a key to be applied to decryption processing of the encrypted contents 111 by applying the media key Km as keys to be applied to the decryption processing of the encrypted contents 111. Let us say that EKa(b) indicates data obtained by encrypting data b with a key Ka.

The RKB (Renewal Key Block) 121 is an encryption key block which is generated based on a tree-structured key distribution method known as one pattern of the broadcast encryption method, and also is an encryption key block which enables the media key Km to be obtained by decryption processing which applies the device key distributed to the information processing device serving as a user device holding an authorized license for executing playback/recording of contents utilizing an information recording medium. Modifying the configuration data of the encryption key block RKB enables a user device capable of obtaining the media key Km to be selected.

In the event that the administration center determines that a device (user device or playback application) for executing playback/recording of contents is unauthorized, modifying the configuration of the RKB makes it impossible to obtain of the media key Km by an unauthorized device. Note that the device which is determined as an unauthorized device is registered in the administration center as a revoked (invalid) device. The administration center holds the registration information of devices, and updates this as appropriate.

The lead-in region 102 stores registration information 130. The registration information 130 is information for determining validity of the public key certificate of a device for executing playback and recording processing of contents, i.e., a drive, a host such as a PC or the like, a host application, or the like, that is to say, information including an authorized device group list (ADGL: ADGL list) 132 which is set as a group of authorized device group certificates (ADGC) which are authorized device certificates in which the registration of a device is recorded, and an ADGL information certificate (AIC) 131 serving as a number-of-device data certificate storing at least either of the number of devices recorded in the authorized device group list (ADGL), or the number of devices registered as invalid (revoked) devices, i.e., the number of invalid (revoked) devices.

The details of the ADGL information certificate (AIC) 131, and the authorized device group list (ADGL: ADGC list) 132 will be described at a subsequent stage. Note that it is not indispensable that the ROM mark Ve114, encryption key information 120, and registration information 130 are always included in the lead-in region 102, these may be included in the data region 101.

When executing playback of data from the information recording medium 100 or data recording processing as to the information recording medium 100, devices for executing processing of contents to be recorded or played back, specifically, (a) A drive for mounting the information recording medium 100, and executing recording and reading of data, and (b) A host for executing input/output of data as to a drive, and executing playback of contents or generation of recorded contents, mutual authentication between the above (a) and (b) devices is performed, and following confirmation that each device is an authorized device, input/output of contents between the devices can be allowed. With this mutual authentication, authentication processing employing the public key encryption method is performed.

With the authentication processing employing the public key encryption method, it is necessary to mutually confirm validity of the public key certificate held by each device of the drive and host. The registration information of the authorized device group certificate (ADGC) is employed for determination of validity of a public key certificate. However, the authorized device group certificate (ADGC) is updated as appropriate in accordance with change in the device registration information, and a new version is issued as necessary.

Executing authentication processing utilizing an old authorized device group certificate (ADGC) causes a situation wherein contents is output to an authorized device based on incorrect authorization that a device which has been already invalidated (revoked) is regarded as a valid device. Accordingly, it is necessary to perform authentication processing utilizing a newer authorized device group certificate (ADGC) to eliminate illegal use of contents. With the arrangement of the present invention, the ADGL information certificate (AIC) is employed for new/old determination of the authorized device group certificate (ADGC). The details of this processing will be described at a subsequent stage.

Figure 6:
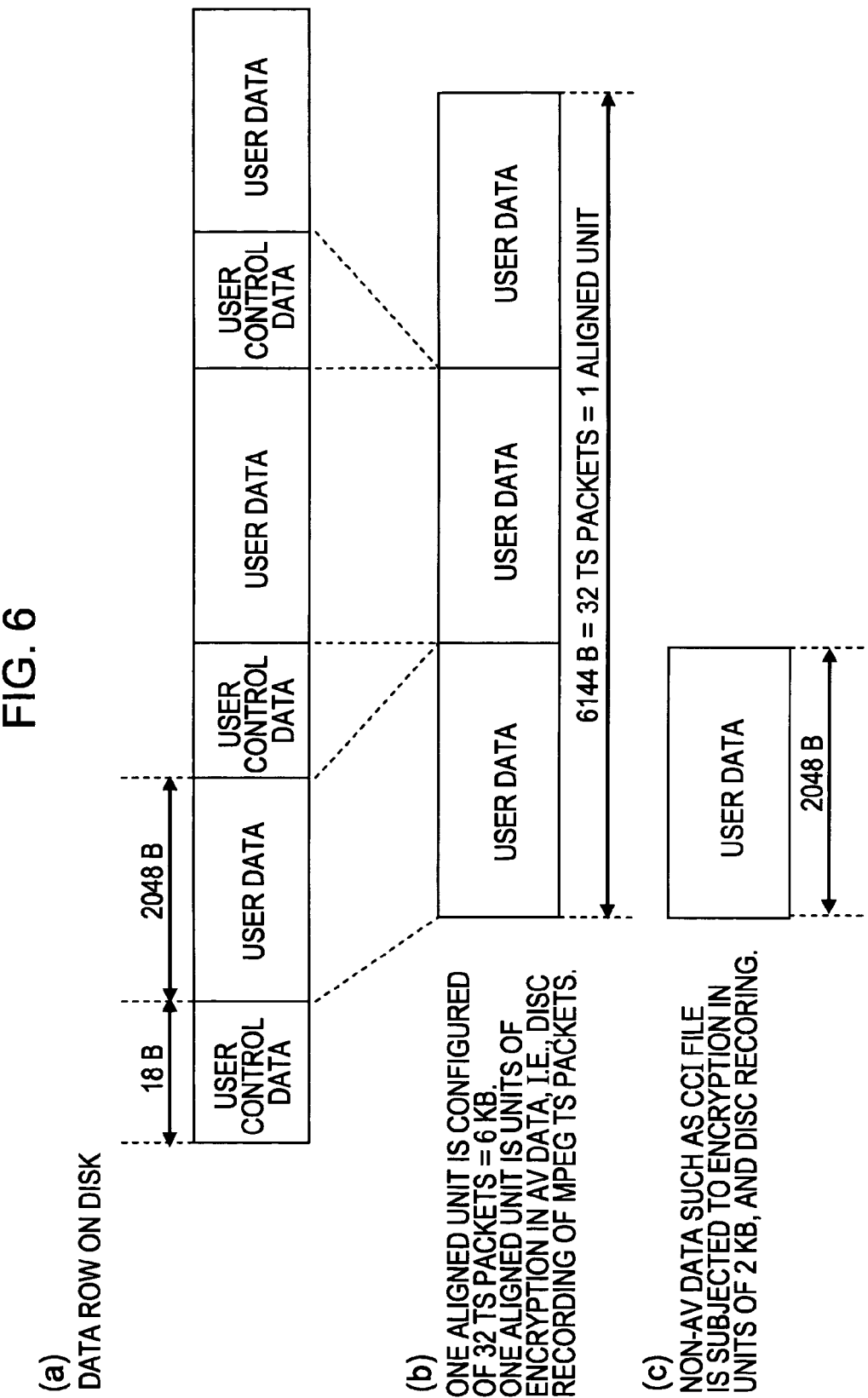
FIG. 6 is a diagram describing the configuration of data stored in an information recording medium of the present invention.

Next, description will be made regarding the details of the recording configuration of the encrypted contents 111 stored in the information recording medium 100 with reference to FIG. 6 through FIG. 8. FIG. 6(a) is the data recording configuration to be stored in the information recording medium. User control data (UCD) of 18 bytes, and user data of 2048 bytes including actual AV contents data and so forth are configured as one sector data.

As illustrated in FIG. 6(b), data of 6144 bytes which is equivalent to three sectors of user data is set as one unit (1 AU:

Aligned Unit) serving as one block encryption processing unit, i.e., one block. Data of 6144 bytes is equivalent to 32 TS (Transport Stream) packets. Note that the setting units of a block is not restricted to a method taking data of 6144 bytes, and various settings can be performed, such as a method for setting data of 2048 bytes which is equivalent to one sector as one encryption processing unit, i.e., one block, and so forth.

As illustrated in FIG. 6(c), the user data storing copy control information CCI corresponding to contents is encrypted in units of 2 K (2048) bytes, and recorded.

Note that user control data of 18 bytes is removed from an encrypted object, and user data alone is encrypted and recorded.

Figure 7:
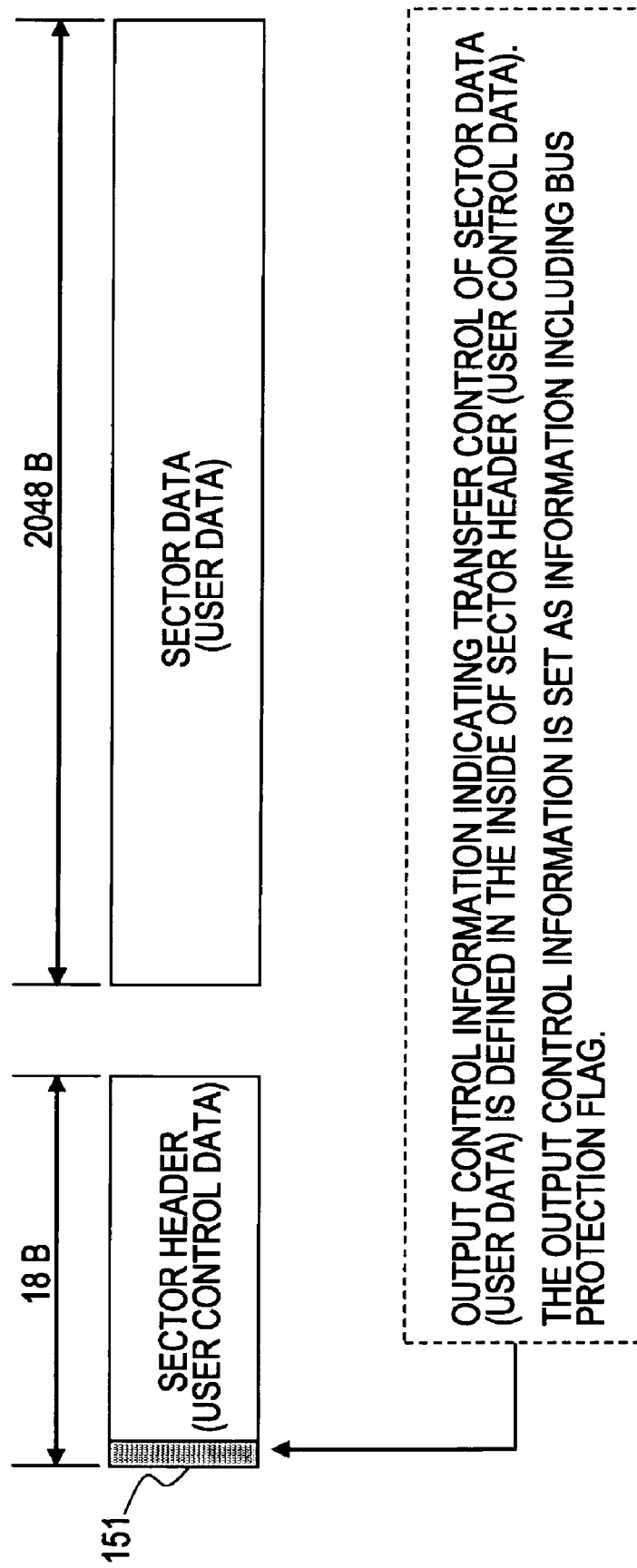
FIG. 7 is a diagram describing the configurations of sector data and a sector header serving as data stored in an information recording medium of the present invention.

FIG. 7 illustrates the configuration of one piece of sector data. One piece of sector data is made up of user control data (UCD) of 18 bytes, and user data of 2048 bytes.

User control data (UCD) is also referred to as a sector header, and output control information 151 in units of sector is recorded in part thereof.

The output control information 151 is set as the transfer control information of the corresponding sector data (user data), e.g., information including a bus protection flag which is output control information as to an information processing device such as a host (PC) or the like from a drive.

Figure 8:
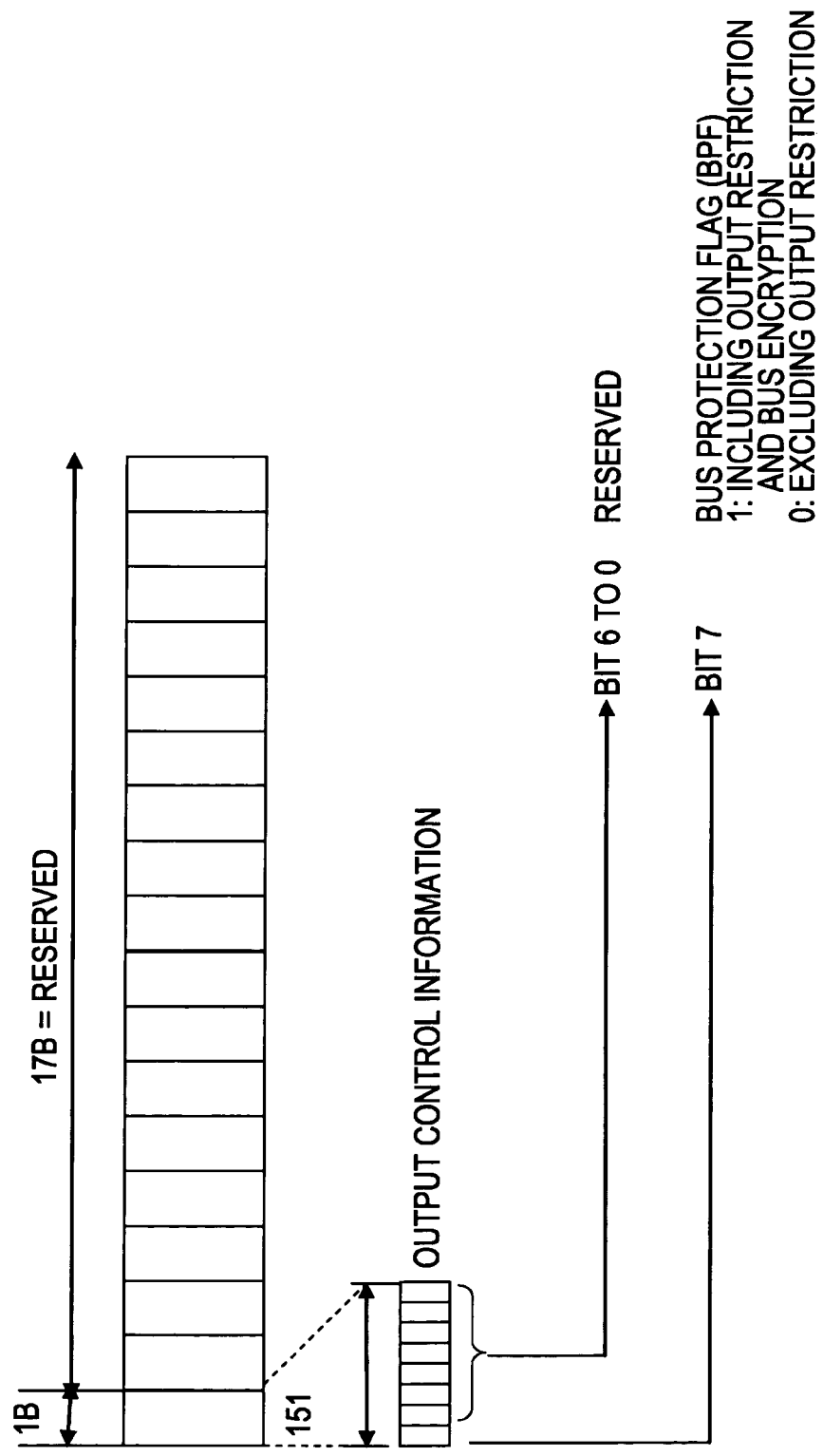
FIG. 8 is a diagram describing the details of output control information to be recorded in the sector header of an information recording medium of the present invention.

FIG. 8 illustrates the detailed configuration of the output control information 151 to be recorded in user control data (UCD). The output control information 151 is recorded in one-byte (8-bit) data of user control data (UCD).

The bits of bit 6 through bit 0 are reserved regions, and one bit of bit 7 is set as a bus protection flag. The bus protection flag is utilized as determination information of whether to execute control of readout contents of the information recording medium. Specifically, for example, the bus protection flag is set as follows.

bus protection flag=1 means including output restriction, and bus encryption bus protection flag=0 means including no output restriction Note that bus encryption is encryption processing which is executed at the time of transfer of contents between a drive and a host, and detail thereof will be described later.

[2. Overview of Contents Playback Processing]

Next, playback processing of contents stored in the above information recording medium will be described. There are two playback patterns of contents stored in the information recording medium. The first pattern is a pattern wherein the information recording medium is mounted, and a device itself for executing readout of data from the information recording medium executes playback processing, and the second pattern is a pattern wherein a drive for executing readout of data from the information recording medium, and a playback processing device such as a host (PC) or the like for executing playback processing are configured as separate devices, in between the drive device and the playback processing device is connected with data transfer bus, and playback processing is performed by executing transfer of data via the connection bus.

First, description will be made with reference to FIG. 9 regarding a processing sequence wherein a device itself for executing readout of data from the information recording medium executes playback processing.

A playback instrument 300 also serving as a drive sets the information recording medium 200 storing the encrypted contents 260, and executes various types of encryption processing such as reading of data, generation of a key, decryption of contents, and so forth to output contents.

An information recording medium 200 stores various types of information previously described with reference to FIG. 5, i.e., registration information 201 serving as a registration device list to be applied to mutual authentication and key exchange processing (AKE) in accordance with the public key encryption method, an RKB 202 serving as an encryption key block storing a media key Km, an encrypted disc key Ekm(Kd) 203 obtained by encrypting a disc key Kd with the media key Km, a ROM mark Ve204, unit key generation information Vu205, and encrypted contents 206.

Description will be made regarding processing of the playback instrument 300 also serving as a drive. The playback instrument 300 also serving as a drive executes decryption processing of the RKB 202 serving as an encryption key block by applying a device key Kdev 301 stored in the instrument beforehand to obtain the media key Km from the RKB 202. Note that only the instrument of which use of contents has been authorized can obtain the media key Km from the RKB 202, so an instrument revoked as unauthorized instrument cannot decrypt the RKB using a device key possessed by itself, and cannot obtain the media key Km.

Upon succeeding in obtaining of the media key Km in step S101, the playback instrument 300 also serving as a drive executes decryption processing of the encrypted disc key Ekm(Kd) obtained from the information recording medium 200 by applying the obtained media key Km to obtain the disc key Kd in step S102.

Next, in step S103, the playback instrument 300 also serving as a drive executes key generation processing based on the obtained disc key Kd, and the ROM mark Ve204 obtained from the information recording medium 200, e.g., key generation processing in accordance with the AES encryption algorithm to generate an embedded key Ke.

Description will be made in detail regarding the details of the key generation processing in accordance with the AES encryption algorithm with reference to FIG. 10. As illustrated in FIG. 10, the key generation in accordance with the AES encryption algorithm is processing wherein an AES encryption processing block 311 executes AES encryption processing in which an encryption key is applied to an input value, and outputs the exclusive-OR (XOR) computing result between output thereof and the input value. In step S103 in FIG. 9, the playback instrument 300 also serving as a drive executes key processing assuming that the ROM mark Ve204 is taken as an input value, and the disc key Kd is taken as an applied key to obtain the embedded key Ke serving as an output value.

Next, in step S104, the playback instrument 300 also serving as a drive executes key generation processing based on the obtained embedded key Ke and the unit key generation information Vu205 obtained from the information recording medium 200 to generate a unit key Ku. This key generation processing is also executed as the key generation processing in accordance with the AES encryption algorithm described with reference to FIG. 10. With regard to the Vu205, an individual value can be defined as to each unit of multiple units using "Unit_Key_Gen_Value.inf", but description as to one unit thereof will be continued here.

Next, in step S105, the playback instrument 300 also serving as a drive executes decryption processing of the encrypted contents 206 to which the generated unit key Ku is applied, to output the contents.

Figure 11:
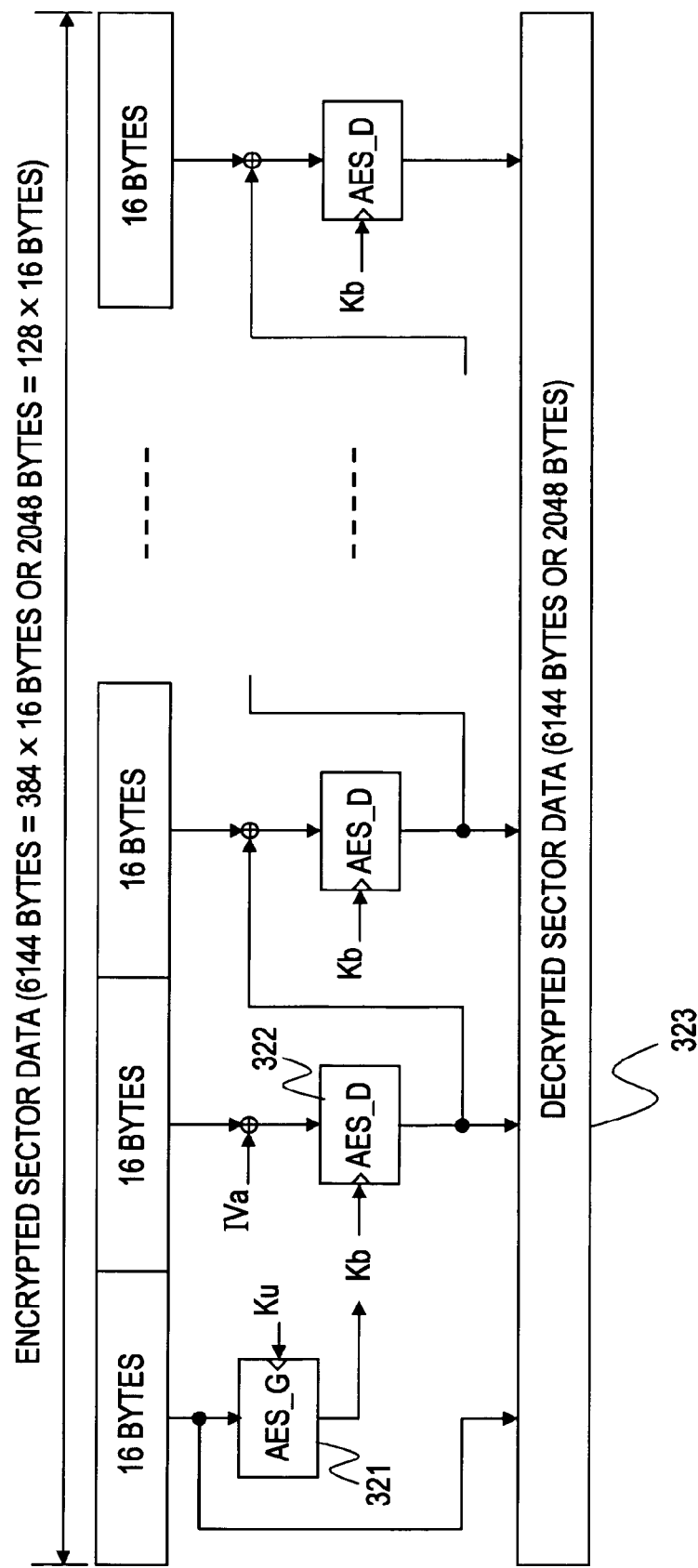
FIG. 11 is a diagram describing data decrypting processing in accordance with the AES encryption algorithm to be executed in playback of contents stored in an information recording medium.

Description will be made regarding the details of the decryption processing of the encrypted contents 106 to which the unit key Ku in step S105 is applied with reference to FIG. 11.

The encrypted contents 206 is subjected to encryption in units of block serving as predetermined data units, and stored in the information recording medium 200. As illustrated in FIG. 11, for example, sector data of 6144 bytes is subjected to encryption for each 16-byte block.

Description will be made regarding the procedures of decryption processing. First, the headmost 16-byte data is obtained from the sector data of 6144 bytes, and the key generation processing in accordance with the AES encryption algorithm at an AES key generation processing block [AES_G] 321. This is the same processing as previously described with reference to FIG. 10. Assuming that the output of the AES key generation processing block 321 is taken as a block key Kb, description processing of the next 16-byte data is executed at an AES decryption processing block [AES_D] 322 by applying the block key Kb.

At the AES decryption processing block [AES_D] 322, the decryption processing in accordance with the AES encryption algorithm to which the block key Kb is applied taking the exclusive-OR (XOR) result between the second 16-byte data of the sector data and an initial value IVa is executed to obtain the decrypted data of the 16-byte block data, and also this obtained data is taken as an input value to be applied to decryption of the next block. Hereinafter, decrypted sector data 323 can be obtained by executing the same processing repeatedly. Note that the initial value IVa is a constant which has been set beforehand. The IVa is sometimes set as a value which can be obtained from user control data or user data corresponding to the sector data, for example.

Figure 9:
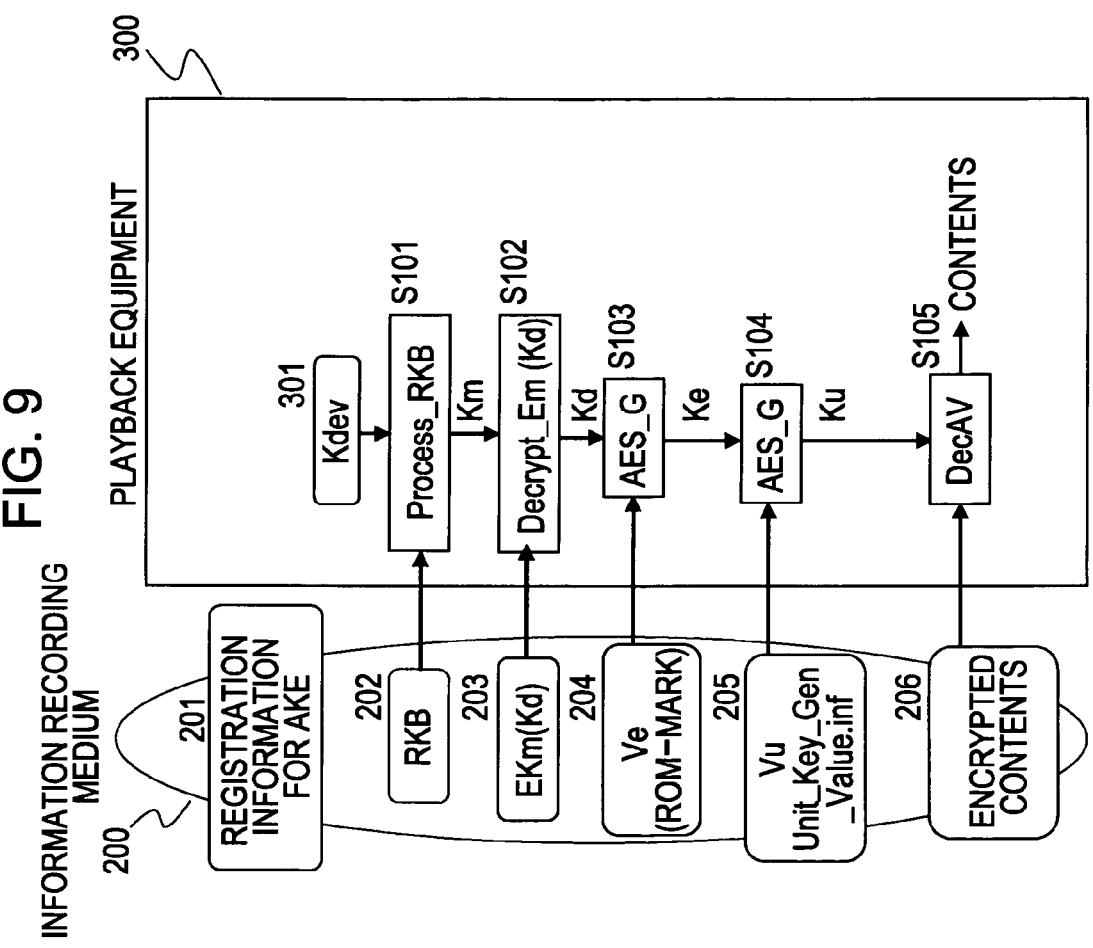
FIG. 9 is a diagram describing a processing sequence of a playback instrument for reading contents stored in an information recording medium, and executing playback.
Figure 10:
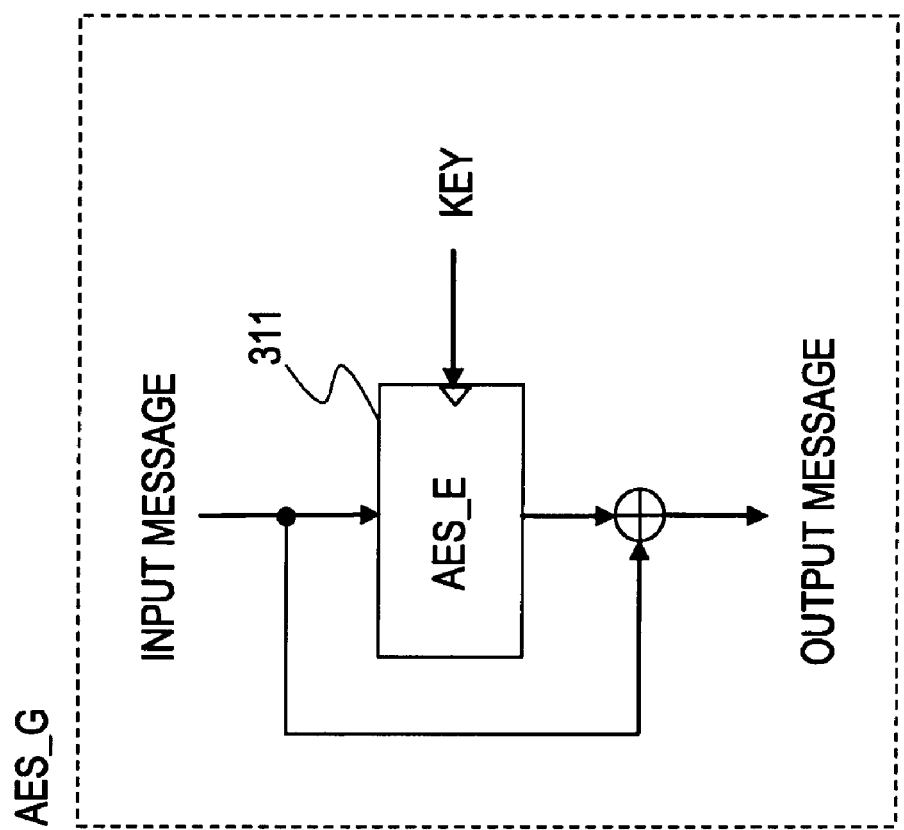
FIG. 10 is a diagram describing key generation processing in accordance with AES encryption algorithm to be executed in playback of contents stored in an information recording medium.

In step S105 in FIG. 9, the playback instrument 300 also serving as a drive thus executes the decryption processing in units of block by applying the unit key Ku to output the decrypted contents.

Figure 1:
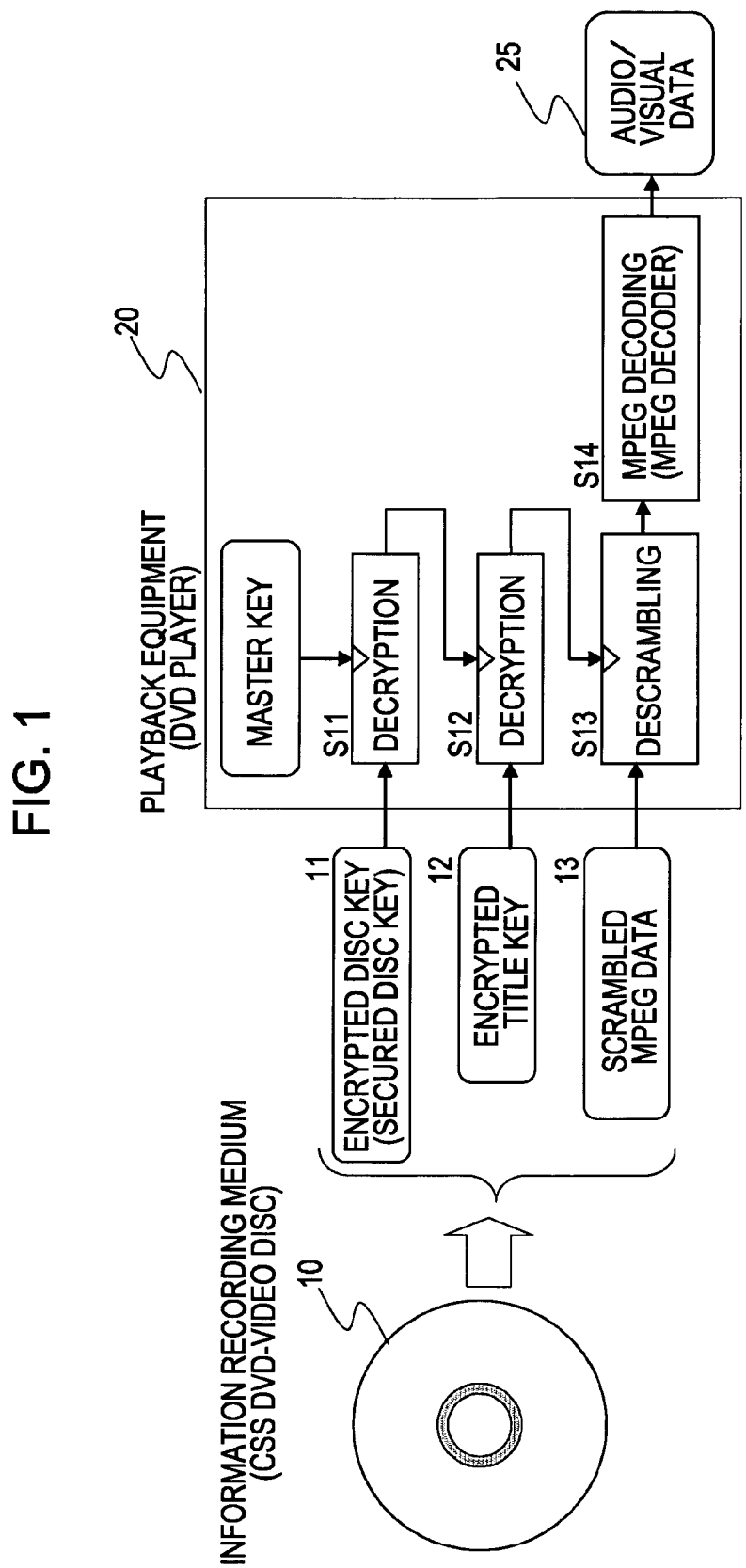
FIG. 1 is a diagram describing a playback sequence of contents stored in an existing information recording medium.
Figure 2:
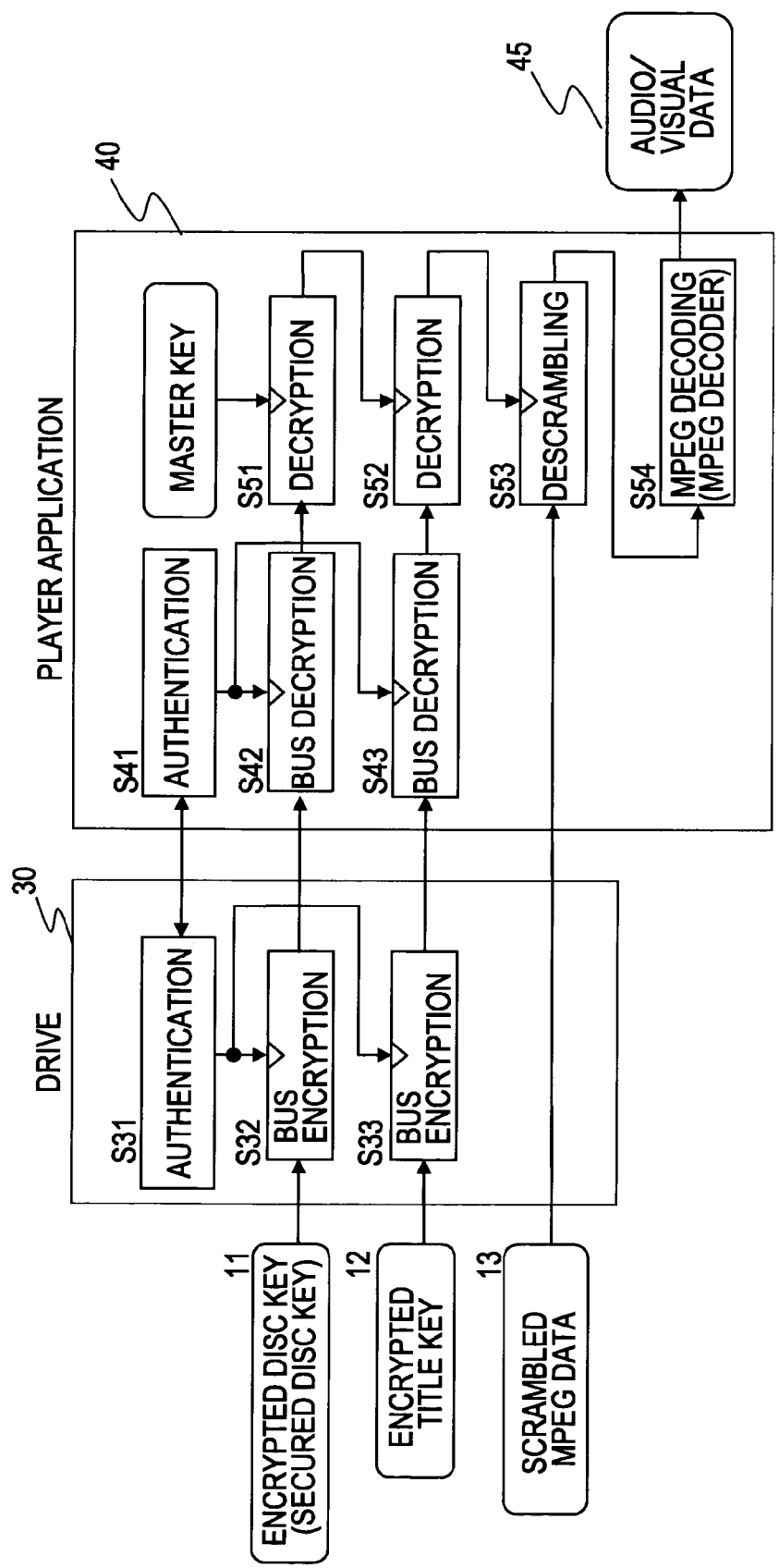
FIG. 2 is a diagram describing a playback sequence of drive output contents in an existing information processing device.
Figure 3:
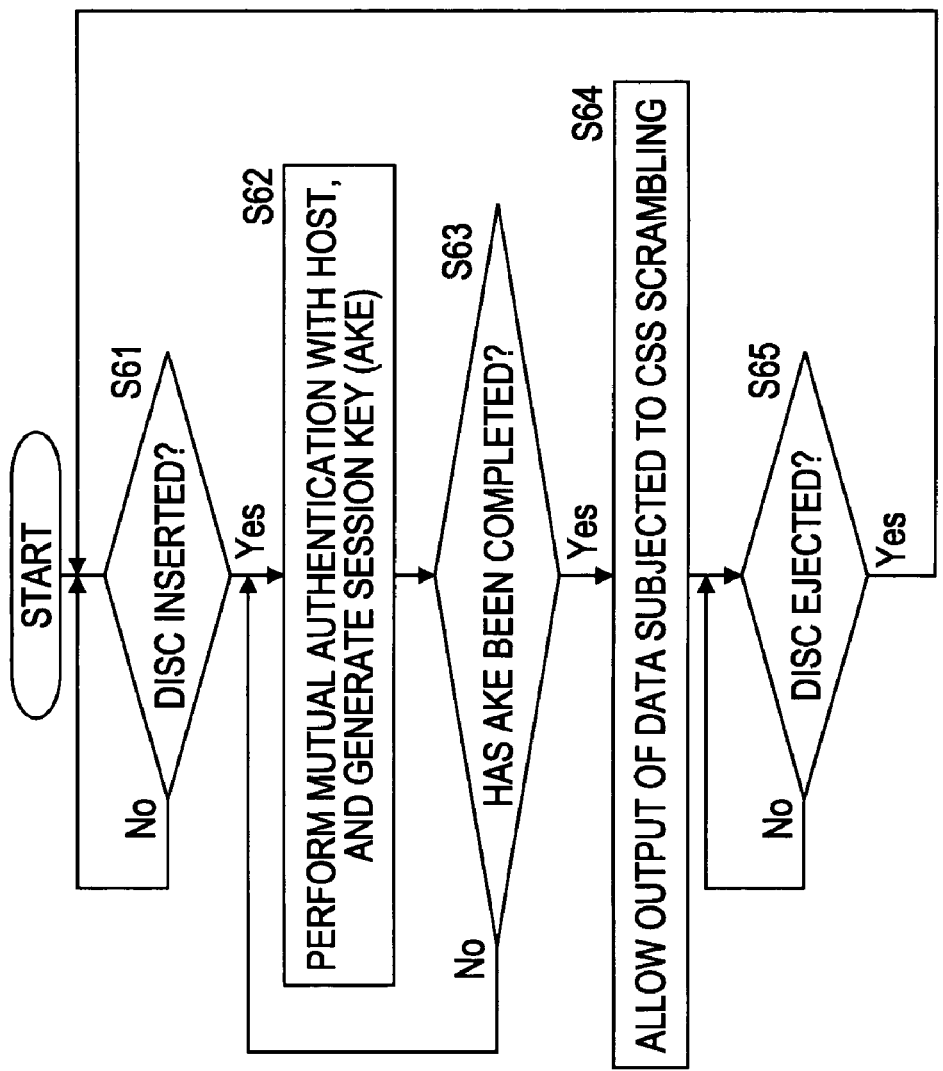
FIG. 3 is a flowchart describing a contents output sequence from a drive.

Thus, in the event of executing reading of information from the information recording medium and playback processing within one instrument, probability of leaks of contents is small, and also probability of causing a problem such as infringement of copyright of contents is small. However, as previously described with reference to FIG. 2 through FIG. 4, in the event of performing playback processing by outputting contents to the instrument such as a PC or the like from the drive mounted on the information recording medium via the bus, or in the event of a processing arrangement wherein contents is input to the drive from the instrument such as a PC or the like, and recorded in the information recording medium, various types of problem sometimes occur.

According to the configuration of the present invention, even with a configuration wherein input/output of contents is performed between the drive mounting such an information recording medium and a host instrument such as a PC or the like, secure data transfer is realized, thereby enabling prevention of illegal use of contents.

[3. Processing Accompanying Transfer of Contents between Drive and Host]

Next, description will be made regarding the details of processing accompanying transfer of contents between the drive and the host. First, description will be made regarding various types of key information and certificate held by an instrument for executing playback of data or recording of data at the host instrument side such as an information recording medium, drive, PC, or the like, or a host such as application or the like with reference to FIG. 12 and the subsequent drawings.

Figure 12:
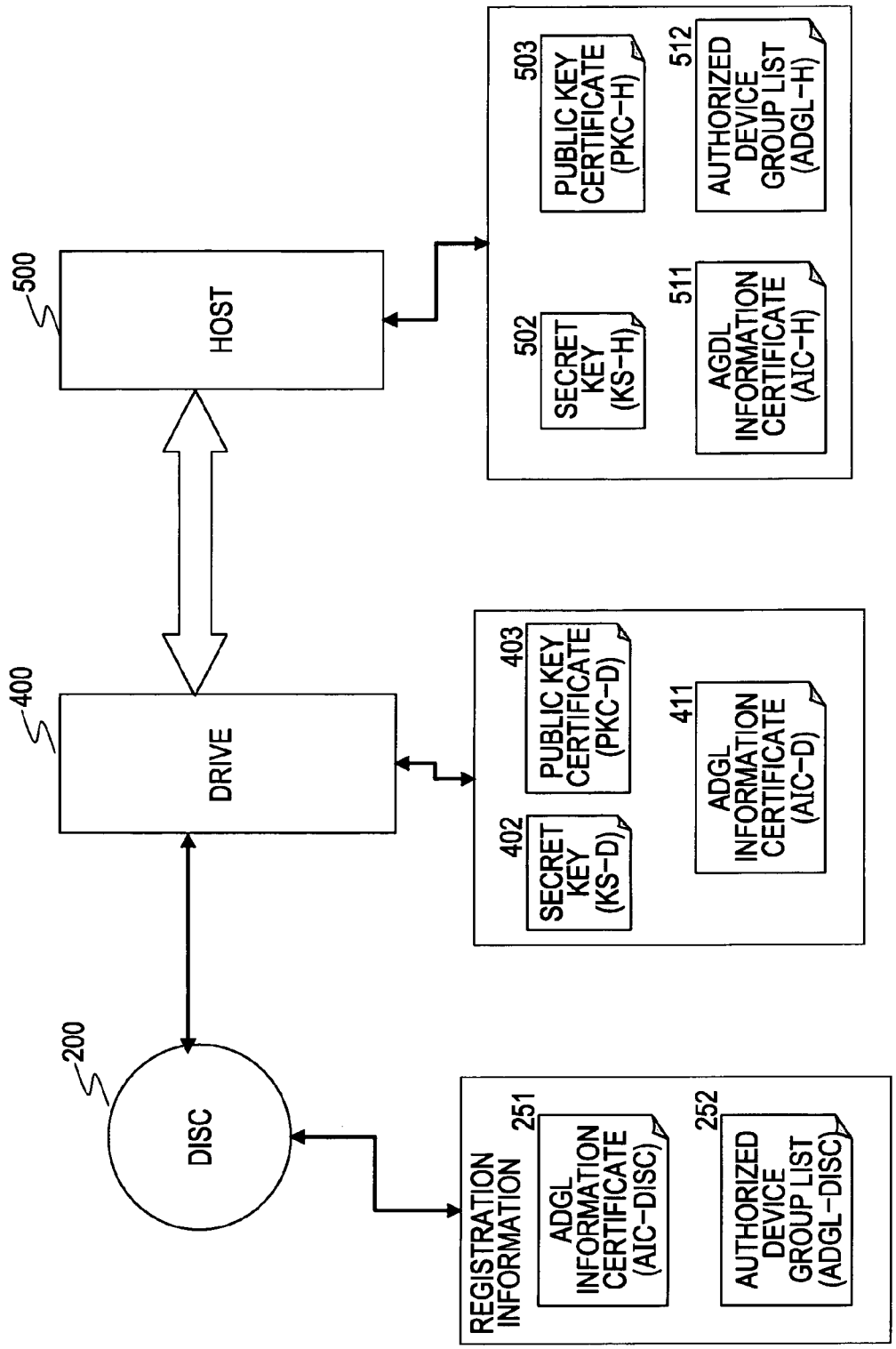
FIG. 12 is a diagram describing data stored in an information recording medium, a drive, and an information processing device.

Each of a drive 400 and a host 500 stores a public key certificate (PKC) in accordance with the public key encryption method, and a secret key (KS). As illustrated in FIG. 12, the drive 400 holds a drive public key certificate (PKC-D) 403 and a drive secret key (KS-D) 402, and the host 500 holds a host public key certificate (PKC-H) 503, and a host secret key (KS-H) 502.

An information recording medium 200, the drive 400, and the host 500 includes an ADGL information list (AIC) serving as a number-of-devices data certificate in addition to the public key certificate (PKC) and the secret key (KS). That is to say, the information recording medium 200 includes an AIC-DISC 251, the drive 400 includes an AIC-D 411, and the host 500 includes an AIC-H 511. Note that the holding information of the information recording medium is shown with (-DISC), the holding information of the drive is shown with (-D), and the holding information of the host is shown with (-H).

The information recording medium 200 and the host 500 further store an authorized device group list (ADGL) serving as a group of authorized device certificates. That is to say, the information recording medium 200 stores an ADGL-DISC 252, and the host 500 holds an ADGL 512. The authorized device group list (ADGL) is a list made up of a group of multiple authorized device group certificates (ADGC).

Note that with regard to each data illustrated in FIG. 12, the information recording medium holds the data as the recorded data of a data recording region or a lead-in region, and the drive 400 and the drive 500 hold the data in nonvolatile memory.

Figure 13:
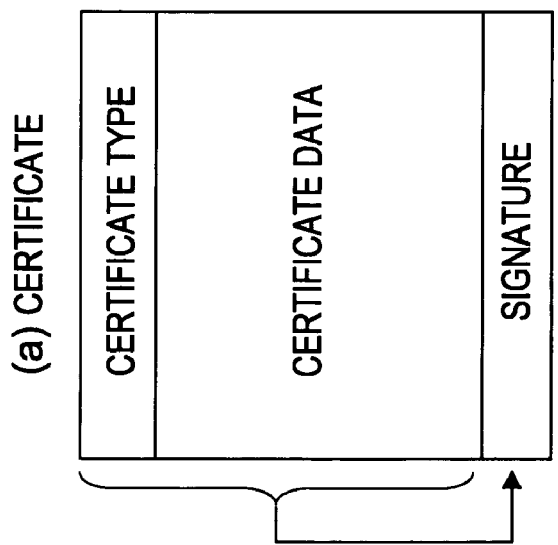
FIG. 13 is a diagram describing the data configuration and types of certificate.

Description will be made with reference to FIG. 13 and the subsequent drawings regarding these respective certificates, i.e., a public key certificate (PKC),
an authorized device group certificate (ADGC) and authorized device group list (ADGL), and
an ADGL information certificate (AIC).

FIG. 13(a) illustrates the common configuration of each certificate, and FIG. 13(b) is a diagram describing correspondence between the type information set to each certificate and a certificate.

As illustrated in FIG. 13(a), any of a public key certificate (PKC), authorized device group certificate (ADGC), and ADGL information certificate (AIC) stores the following data.

(a) Certificate Type
(b) Certificate Data
(c) Electronic Signature

With (a) certificate type, as illustrated in FIG. 13(b), a different type number is set thereto for each certificate, such as 1: public key certificate (PKC),
2: authorized device group certificate (ADGC), and
3: ADGL information certificate (AIC).

Which certificate this is can be determined based on the type number.

With (b) certificate data, data corresponding to each of certificates of a public key certificate (PKC), authorized device group certificate (ADGC), and ADGL information certificate is stored therein. Description will be made regarding the details of these with reference to FIG. 14 and the subsequent drawings.

(c) Electronic signature is the electronic signature of the administration center serving as the issue entity of each certificate, i.e., signature data generated by applying the secret key of the administration center, and is signature data to be generated by applying the secret key of the administration center to (a) certificate type and (b) certificate data.

Signature data enables tampering verification of certificates and confirmation of validity to be performed. That is to say, applying the public key of the administration center which is disclosed enables tampering verification of certificates and confirmation of validity to be performed.

Hereinafter, description will be made regarding the details of certificate data to be stored in each certificate with reference to FIG. 14 through FIG. 16. First, description will be made regarding the data configuration of a public key certificate (PKC) with reference to FIG. 14.

FIG. 14(a) illustrates a certificate data example of a public key certificate (PKC). FIG. 14(b) illustrates a data configuration example of a public key certificate to which the elliptical curve cryptography is applied.

As illustrated in FIG. 14(a), the certificate data of a public key certificate (PKC) includes a certificate ID, a public key, and the other information. For example, the drive receives a public key certificate (PKC-D) storing a public key corresponding to the drive from the administration center, and stores and holds this in nonvolatile memory such as flash memory or the like. Also, the secret key (KS-D) corresponding to the public key is provided. A pair of a public key certificate and a secret key is also provided to the host, and are held in nonvolatile memory such as a hard disk or flash memory within the host.

A public key certificate (PKC) is data of which disclosure is permitted, and is output depending on the request of another instrument, for example. An instrument which received the public key certificate of another instrument executes tampering verification of the public key certificate based on the signature of the administration center appended to the received public key certificate, and following confirmation of validity of the received public key certificate, the public key is obtained from the received public key certificate. Note that tampering verification of a public key certificate based on the signature of the administration center is executed by applying the public key of the administration center. The public key of the administration center is also disclosed data, which can be obtained by utilizing the key stored in nonvolatile memory or the like of the drive or host, or by receiving the key via a network or a recording medium.

The drive and the host are provided with a secret key along with a public key certificate. That is to say, the drive and the host are each provided with a pair of a public key certificate (PKC) and a secret key, which are held in each memory thereof. A public key certificate storing a public key is data of which disclosure is permitted, but a secret key is securely held in each device so as not to let this leak out.

FIG. 14(b) illustrates a data configuration example of a public key certificate to which the elliptical curve cryptography is applied. A certificate type (certificate type=1) described with reference to FIG. 13(b), and a certificate ID and a public key which are described with reference to FIG. 14(a) are stored in a public key certificate, and an electronic signature generated by applying the secret key of the administration center corresponding to these stored data is set thereto.

FIG. 15 illustrates each data configuration of (a) authorized device group certificate (ADGC) data, (b) authorized device group certificate (ADGC) data example to which the elliptical curve cryptography is applied, and (c) authorized device group list (ADGL). As described above, (c) authorized device group list (ADGL) is set as a list storing a plurality of authorized device group certificate (ADGC) information.

First, description will be made regarding (a) authorized device group certificate (ADGC) data. (a) authorized device group certificate (ADGC) data includes "authorized device group certificate (ADGC) data length", "authorized device group list (ADGL) sequence number", "first through last public key certificate ID within an ADGC", and "authorized public key certificate information".

An authorized device group certificate (ADGC) is an authorized device certificate storing information indicating whether or not a public key certificate (PKC) issued to the drive, host, or the like serving as a device utilizing contents is valid or invalidated (revoked). That is to say, an authorized device group certificate (ADGC) is applied for confirming whether or not the device is a valid device authorized by the administration center serving as the administration entity of contents.

A device, which executes mutual authentication, determines that the entity with which mutual authentication is being executed holds a valid public key certificate in the event that the ID of the public key certificate of the other entity received from the other entity is registered in an authorized device group certificate (ADGC) as a valid ID. In the event that the ID of the public key certificate received from the other entity is registered as a invalid ID in the authorized device group certificate (ADGC), the public key certificate of the other entity is invalidated, and determination can be made that the device of the other entity is unauthorized. In this case, processing such as input/output of contents and so forth is not performed.

An authorized device group certificate (ADGC) is appended with the electronic signature of the administration center, and is set as a certificate having difficulty in tampering, as with a public key certificate (PKC). An authorized device group certificate (ADGC) is set for each of various types of group, such as an authorized device group certificate (ADGC) for drive, an authorized device group certificate (ADGC) for application, an authorized device group certificate (ADGC) corresponding to devices of manufacturer A, or the like, for example.

The authorized device group certificate (ADGC) illustrated in FIG. 15(a) is certificate data corresponding to one certain group, which stores the public key certificate ID (PKC-ID) of each device such as a device, application, or the like serving as the issue destination of the certificate belonged to group thereof. This denotes "first through last public key certificate ID" within the certificate data in FIG. 15(a). Further, "authorized public key certificate information" corresponding devices belonged to the group are stored. "Authorized public key certificate information" is information which can confirm validity of the public key certificate provided to a device belonging to the group. "Authorized public key certificate information" is information which can confirm the validity or invalidity regarding each of the first through last public key certificate IDs.

In the event of performing mutual authentication processing, the validity of the public key certificate of the other entity can be confirmed by obtaining the public key certificate of the other entity, and referencing "authorized public key certificate information" thereof.

In the event that there is change in the number of registered devices serving as the configuration members within the group, or change in the registration information of validity/invalidity, the authorized device group certificate (ADGC) thereof is updated at the administration center as appropriate, and a new authorized device group certificate (ADGC) is issued. "Authorized device group certificate (ADGC) sequence number" is a different number which is set for each of this updating. For example, a sequence number which is counted up for each updating processing is set.

An authorized device group certificate (ADGC) further stores AIC data. AIC data is the same information as information stored in the ADGL information certificate (AIC) described later with reference to FIG. 16, and is data of at least any of the number of all registered devices or the number of invalidated (revoked) devices in an authorized device group list (ADGL) which is a group of multiple authorized device group certificates (ADGL). That is to say, AIC data is at least any of the following information.

(A) the number of all registered devices registered in an ADGL (B) the number of all unauthorized devices registered in an ADGL The authorized device group list (ADGL) in FIG. 15(c) is a registration list which is set as a group of multiple authorized device group certificates (ADGCs), which stores list data length, the above AIC data, the number of the authorized device group certificates (ADGCs) registered as a list, and further the authorized device group certificate (ADGC) information.

FIG. 15(b) illustrates a data example of an authorized device group certificate (ADGC) to which the elliptical curve cryptography is applied. A certificate type (certificate type=2) described with reference to FIG. 13(b), "authorized device group certificate (ADGC) data length", "authorized device group certificate (ADGC) sequence number", "AIC data", "first through last public key certificate (PKC) ID", and "authorized public key certificate information", which have been described with reference to FIG. 15(a), are stored therein, and an electronic signature generated by applying the secret key of the administration center corresponding to these stored data is set thereto.

(a) Authorized device group certificate (ADGC) and (c) authorized device group list (ADGL) are updated at the administration center depending on modification processing such as modification of the registered devices, validating/ invalidating of registered devices, and so forth as necessary. "ADGL sequence number" is a different number which is set for each of this updating.

FIG. 16 is a diagram describing an ADGL information certificate (AIC) serving as a number-of-devices data certificate. FIG. 16(a) illustrates the certificate data configuration of an ADGL information certificate (AIC), and FIG. 16(b) illustrates the data configuration example of an ADGL information certificate (AIC) to which the elliptical curve cryptography is applied.

As illustrated in FIG. 16(a), "ADGL sequence number" and "AIC data" are stored in the certificate data of an ADGL information certificate (AIC). An ADGL sequence number is a sequence number corresponding to the latest authorized device group list (ADGL) which has been issued at that time. A sequence number is a number which is counted up by one for each issue of an authorized device group list (ADGL), for example.

"AIC data" is at least any of the following data corresponding to the latest authorized device group list (ADGL) which has been issued at that time.

(A) the number of all registered devices registered in an ADGL (B) the number of all invalid devices registered in an ADGL When performing playback and recording of data utilizing an information recording medium (disc), mutual authentication is performed between devices which execute input/output of data, e.g., between a drive and a host. With this mutual authentication processing, it is necessary to execute validity determining processing of mutual public key certificates (PKCs). When performing this PKC validity determination, the authorized public key certificate information of an authorized device group certificate (ADGC) included in an authorized device group list (ADGL) is referenced.

However, an authorized device group certificate (ADGC) and an authorized device group list (ADGL) are updated as necessary depending on modification processing such as modification of the registered devices, validating/invalidating of registered devices, and so forth. Accordingly, performing validity determination processing to which an old ADGC is applied sometimes causes contents to be output to a device which has already been invalidated.

In order to prevent such a situation, with the present invention, new/old determination of an ADGL and an ADGC to which either of "authorized device group list (ADGL) sequence number" or "AIC data" is applied is performed, and updating processing is performed as necessary. Further, mutual authentication processing to which the authorized device group certificate (ADGC) included in the updated authorized device group list (ADGL) is applied is performed.

FIG. 17 illustrates the storage situation of each certificate in an information recording medium, a drive, and a host. The information recording medium records an authorized device group list (ADGL) including one or more authorized device group certificates (ADGCs), and an ADGL information certificate (AIC) in a lead-in region.

The drive stores a public key certificate (PKC) in nonvolatile memory. The drive reads out an authorized device group list (ADGL) from the information recording medium to transfer this to the host. Further, the drive inputs an authorized device group certificate (ADGC) storing the registration information of the public key certificate of the host (PKC-H) from the host, and determines validity of the public key certificate of the host (PKC-H). Further, the drive stores an ADGL information certificate (AIC) in nonvolatile memory, and performs updating processing as necessary. The drive executes the updating processing based on new/old determination in accordance with the ADGL information certificate (AIC) to be input from the information recording medium or the host.

The host stores a public key certificate (PKC), an authorized device group list (ADGL), and an ADGL information certificate (AIC) in nonvolatile memory, and performs updating processing of an ADGL and an AIC as necessary. The host executes the updating processing based on the input from the information recording medium via the drive or from a server connected with the host.

Next, description will be made regarding a specific pattern of the updating processing of an ADGL information certificate (AIC), and an authorized device group (ADGL) which is executed at the host and drive.

Note that the drive executes the updating processing of an ADGL information certificate (AIC), and the host executes the updating processing of an ADGL information certificate (AIC), and an authorized device group list (ADGL).

Note that an authorized device group list (ADGL) includes one or more authorized device group certificates (ADGCs).

Note that hereinafter, description will be made sequentially regarding three patterns of updating processing:

(1) updating processing based on an ADGL sequence number, (2) updating processing based on AIC data=the number of registered devices, and (3) updating processing based on AIC data=the number of invalid (revoked) devices.

(1) Updating Processing Based on an ADGL Sequence Number

Figure 18:
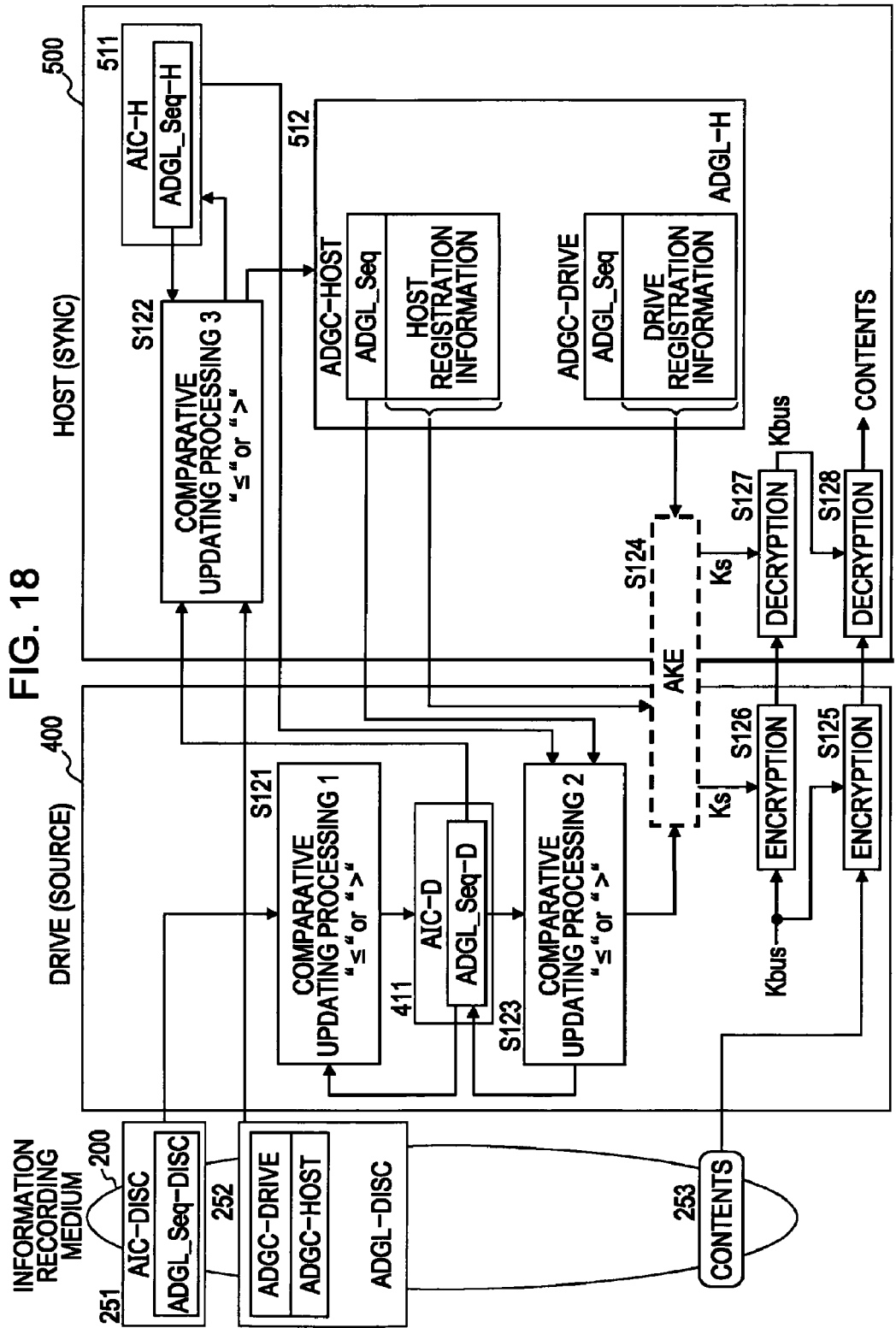
FIG. 18 is a diagram describing updating processing of registration information based on an ADGL sequence number.

First, description will be made regarding updating processing based on an ADGL sequence number with reference to FIG. 18. FIG. 18 is a diagram describing processing wherein when outputting contents 253 stored in the information recording medium 200 to the host 500 via the drive 400, and playing back the contents 253, an ADGL information certificate (AIC) and an authorized device group list (ADGL) are updated based on an ADGL sequence number, and mutual authentication and key exchange (AKE) between the drive 400 and the host 500 is executed based on the updated information. Let us say that the output destination of contents is a source, and the input destination of contents is a sync. In this example, the drive 400 is a source and the host 500 is a sync.

First, the drive 400 reads an ADGL information certificate (AIC-DISC) 251 stored in the information recording medium 200, and compares the ADGL sequence number of an ADGL information certificate (AIC-D) 411 stored in the memory of itself with that of the ADGL information certificate (AIC-DISC) 251 in step S121.

An ADGL sequence number is assigned with a new number (e.g., one increment) for each updating as described above, and comparing sequence numbers enables new/old comparison between the ADGL information certificate (AIC-DISC) 251 read from the information recording medium 200 and the ADGL information certificate (AIC-D) 411 stored in the memory of itself. For example, in the event that AIC-D sequence No.<AIC-DISC sequence No.

holds, the drive 400 determines that the AIC-DISC is newer than the AIC-D, and in this case, performs updating processing wherein the ADGL information certificate (AIC-D) 411 stored in the memory of itself is substituted with the ADGL information certificate (AIC-DISC) 251 read from the information recording medium 200.

Note that with the comparative updating processing in step S121, the drive 400 first verifies the signature appended with the ADGL information certificate (AIC-DISC) 251 read from the information recording medium 200, and confirms that the ADGL information certificate (AIC-DISC) is an authorized certificate without being tampered. Following this confirmation, the drive 400 performs comparison and updating.

Step S122 is comparative updating processing to be executed at the host 500. The host 500 inputs the ADGL information certificate (AIC-D) 411 stored in the memory of the drive 400 from the drive 400, and confirms that the certificate is a certificate without tampering using verification of signature thereof, following which executes ADGL sequence number comparative processing with the ADGL information certificate (AIC-H) 511 stored in the memory of the host 500. In the event that AIC-H sequence No.<AIC-D sequence No.

holds, the host 500 determines that the AIC-D is newer than the AIC-H, and in this case, performs updating processing wherein the ADGL information certificate (AIC-H) 511 stored in the memory of itself is substituted with the ADGL information certificate (AIC-D) 411 input from the drive 400.

Note that in the event that

AIC-H sequence No.<AIC-D sequence No.

holds, the host 500 executes updating processing regarding the authorized device group list (ADGL-H) which the host stores in the memory as well. The host 500 executes this updating processing as processing such as substituting the authorized device group list (ADGL-H) with the authorized device group list (ADGL-DISC) stored in the information recording medium 200, or updating the authorized device group list (ADGL-H) by obtaining the latest authorized device group list (ADGL) via a network.

Next, the drive 400 inputs the ADGL information certificate (AIC-H) 511 held in the memory of the host 500 in step S123, and compares the ADGL sequence number of the ADGL information certificate (AIC-D) 411 stored in the memory of itself with that of the ADGL information certificate (AIC-H) 511. In the event that AIC-D sequence No.<AIC-H sequence No.

holds, the drive 400 determines that the AIC-H is newer than the AIC-D, and in this case, performs updating processing wherein the ADGL information certificate (AIC-D) 411 stored in the memory of itself is substituted with the ADGL information certificate (AIC-H) 511 input from the drive 500.

Note that even with the comparative updating processing in step S123, the drive 400 verifies the signature appended to the ADGL information certificate (AIC-H) 511 input from the host 500, and confirms that the certificate is an authorized certificate which has not been tampered. Following this confirmation, the drive 400 performs comparison and updating.

With the comparative updating processing in step S123, the drive 400 further obtains the authorized device group certificate (ADGC-H) storing the registration information of the host included in the authorized device group list (ADGL-H) 512 stored in the memory of the host 500, and following verification of signature thereof, compares the ADGL sequence number set in the authorized group certificate (ADGC-H) with the ADGL sequence number of the ADGL information certificate (AIC-D) 411 stored in the memory of itself. In the event that ADGC-H sequence No.<AIC-D sequence No.

holds, the drive determines that the host holds only the authorized device group certificate of an old version not corresponding to the AIC-D sequence number, and cancels the processing without proceeding to the mutual authentication processing (AKE).

In the event that the drive 400 determines in step S123 that

ADGC-H sequence No.≧AIC-D sequence No.

holds, the flow proceeds to the next step S124.

In step S124, the mutual authentication and key exchange (AKE) processing is performed between the drive 400 and the host 500, and also this processing generates a session key Ks. Further, the drive 400 generates a bus key (Kbus) serving as the encryption key of contents, encrypts the contents 253 using the bus key (Kbus), and outputs this to the host 500. Further, the drive 400 encrypts the bus key Ks using the session key Ks (step S126), and outputs this to the host 500.

The host 500 executes decryption processing to which the session key Ks is applied to obtain the bus key (Kbus) in step S127, and executes decryption processing to which the bus key is applied to obtain contents in step S128. Note that description will be made in detail at the subsequent stage regarding the mutual authentication and transfer processing of contents in step S124 and the subsequent steps.

With the present processing example, an arrangement is made wherein new/old determination of each certificate is performed based on the ADGL sequence numbers appended to the ADGL information certificate (AIC) and the authorized device group certificate, and in the event that a new ADGL information certificate (AIC) or authorized device group certificate (ADGC) is confirmed as compared with the certificate held by the device itself, updating is performed, and validity of a device is determined based on the updated authorized device group certificate (ADGC), whereby authentication based on an old authorized device group certificate (ADGC) can be prevented, and illegal use of contents can be eliminated.

(2) Updating Processing Based on AIC Data=the Number of Registered Devices

Figure 19:
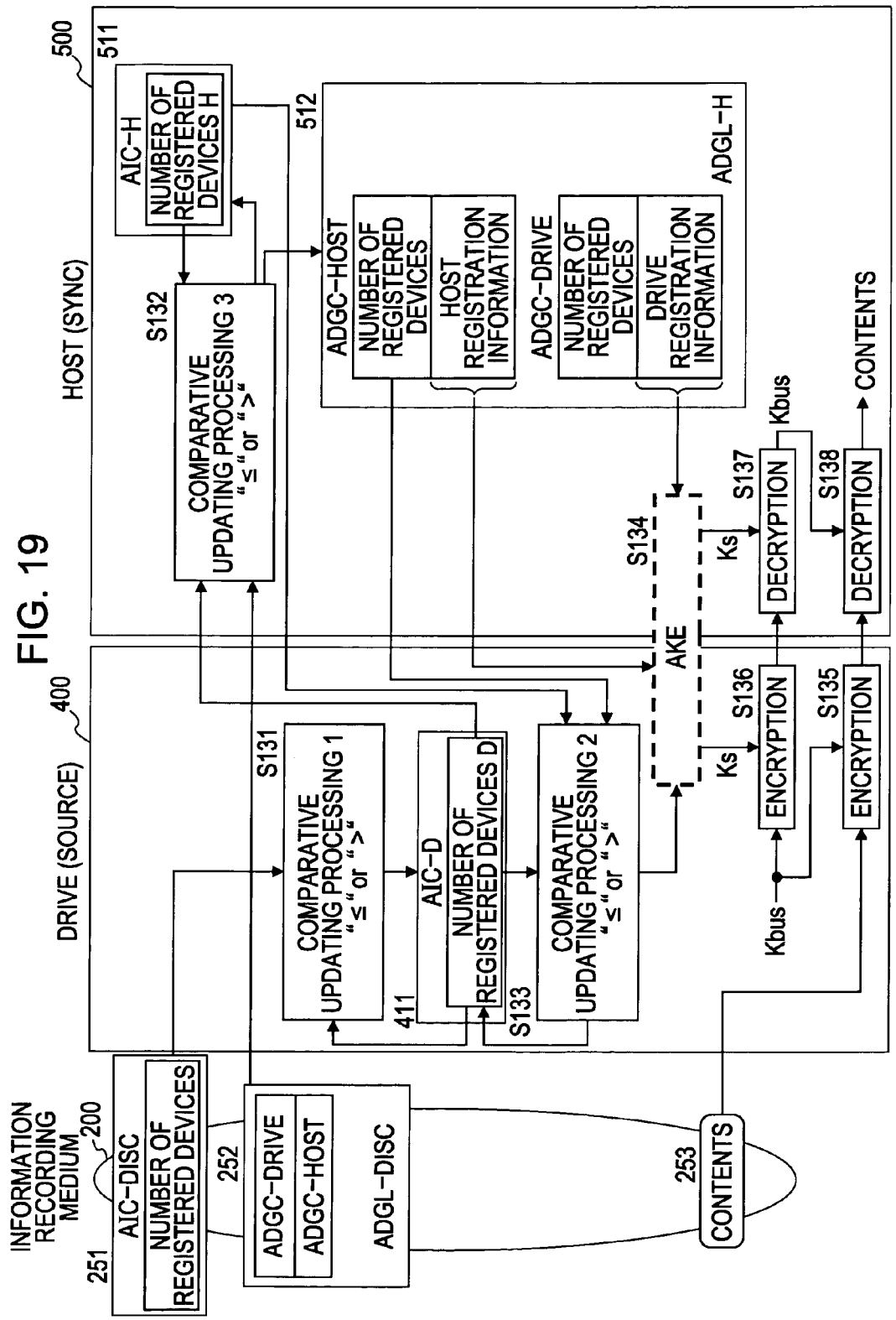
FIG. 19 is a diagram describing updating processing of registration information based on AIC data=the number of registered devices.

Next, description will be made regarding a processing example for executing updating based on the number of registered devices in the setting wherein AIC data is the number of devices registered in an authorized device group list (ADGL) with reference to FIG. 19. FIG. 19 is a diagram describing processing wherein when outputting the contents 253 stored in the information recording medium 200 to the host 500 via the drive 400, and playing back the contents 253, an ADGL information certificate (AIC), and an authorized device group list (ADGL) are updated based on the AIC data (the number of registered devices), and mutual authentication and key exchange (AKE) between the drive 400 and the host 500 is executed based on the updated information. Note that the output source of contents is a source, and the input destination of contents is a sync, and in this example, the drive 400 is a source, and the host 500 is a sync.

First, the drive 400 reads out the ADGL information certificate (AIC-DISC) 251 stored in the information recording medium 200 in step S131, and compares AIC data thereof (number of registered devices) with the AIC data (the number of registered devices) of the ADGL information certificate (AIC-D) 411 stored in the memory of itself.

AIC data (number of registered devices) is basically set to be increased for each updating, and accordingly, a certificate of which AIC data (number of registered devices) is a great value is determined as the latest certificate. For example, in the event that AIC data of AIC-D<AIC data of AIC-DISC holds, the drive 400 determines that the AIC-DISC is newer than the AIC-D, and performs updating processing wherein the ADGL information certificate (AIC-D) 411 stored in the memory of itself is substituted with the ADGL information certificate (AIC-DISC) 251 read from the information recording medium 200.

Note that with the comparative updating processing in step S131, the drive 400 first verifies the signature appended to the ADGL information certificate (AIC-DISC) 251 read from the information recording medium 200, and confirms that the ADGL information certificate (AIC-DISC) is an authorized certificate without being tampered. Following this confirmation, the drive 400 performs comparison and updating.

Step S132 is comparative updating processing to be executed at the host 500. The host 500 inputs the ADGL information certificate (AIC-D) 411 stored in the memory of the drive 400 from the drive 400, and confirms that the certificate is a certificate without tampering using verification of signature thereof, following which executes comparative processing with the ADGL information certificate (AIC-H) 511 stored in the memory of the host 500. In the event that AIC data of AIC-H<AIC data of AIC-D holds, the host 500 determines that the AIC-D is newer than the AIC-H, and in this case, performs updating processing wherein the ADGL information certificate (AIC-H) 511 stored in the memory of itself is substituted with the ADGL information certificate (AIC-D) 411 input from the drive 400.

Note that in the event that AIC data of AIC-H<AIC data of AIC-D holds, the host 500 executes updating processing regarding the authorized device group list (ADGL-H) which the host stores in the memory as well. The host 500 executes this updating processing as processing such as substituting the authorized device group list (ADGL-H) with the authorized device group list (ADGL-DISC) stored in the information recording medium 200, or updating the authorized device group list (ADGL-H) by obtaining the latest authorized device group list (ADGL) via a network.

Further, the drive 400 inputs the ADGL information certificate (AIC-H) 511 held in the memory of the host 500 in step S133, and compares the AIC data (number of registered devices) of the ADGL information certificate (AIC-D) 411 stored in the memory of itself with that of the ADGL information certificate (AIC-H) 511. In the event that AIC data of AIC-D<AIC data of AIC-H holds, the drive 400 determines that the AIC-H is newer than the AIC-D, and in this case, performs updating processing wherein the ADGL information certificate (AIC-D) 411 stored in the memory of itself is substituted with the ADGL information certificate (AIC-H) 511 input from the drive 500.

Note that even with the comparative updating processing in step S133, the drive 400 verifies the signature appended to the ADGL information certificate (AIC-H) 511 input from the host 500, and confirms that the certificate is an authorized certificate which has not been tampered. Following this confirmation, the drive 400 performs comparison and updating.

With the comparative updating processing in step S133, the drive 400 further obtains the authorized device group certificate (ADGC-H) storing the registration information of the host included in the authorized device group list (ADGL-H) 512 stored in the memory of the host 500, and following verification of signature thereof, compares the AIC data (number of registered devices) set in the authorized group certificate (ADGC-H) with the AIC data (number of registered devices) of the ADGL information certificate (AIC-D) 411 stored in the memory of itself. With this comparison, in the event that AIC data of AIC-H<AIC data of AIC-D holds, the drive determines that the host holds only the authorized device group certificate of an old version not corresponding to the AIC data of the AIC-D, and cancels the processing without proceeding to the mutual authentication processing (AKE).

In the event that the drive 400 determines in step S133 that

AIC data of ADGC-H≧AIC data of AIC-D holds, the flow proceeds to the next step S134.

In step S134 through S138, the mutual authentication and key exchange (AKE) processing between the drive 400 and the host 500, transmission processing of contents and bus key at the drive 400 side, and reception data and decryption processing at the host 500 side are executed, which are the same processing as those in FIG. 18, and details thereof will be described at a subsequent stage.

With the present processing example, the number of registered devices serving as AIC data appended to an ADGL information certificate (AIC) and an authorized device group certificate (ADGC) is applied to new/old determination of each certificate. The number of registered devices serving as AIC data is increased by updating of a certificate, or unchangeable, but in many cases, the number of registered devices is increased, and is unchangeable in the case of an invalidated (revoked) invalid device alone being updated. In the event that the number of registered devices is unchangeable, it is unnecessary to perform updating. For example, the number of rewriting of flash memory to be used as nonvolatile memory for storing the certificate of the drive 400 or host 500 can be reduced. In the event of the above new/old determination using a sequence number, even if the number of registered devices is unchangeable, upon the sequence number is changed, all sequence numbers need to be changed, resulting in a problem wherein frequency of use of flash memory is increased.

However, this AIC data, i.e., with a configuration wherein new/old determination of a certificate based on the number of registered devices is performed, for example, in the event that the number of invalidated (revoked) devices increases, upon leaving the number of registered devices unchangeable, updating processing at the drive or host is not performed, and accordingly, it is necessary to employ operations management wherein in the event of the number of invalidated (revoked) devices being increased, the number of registered devices are always increased. With the case of the number of invalidated (revoked) devices being increased, even if the number of registered devices is actually not increased, this method can be workable by updating the number of registration using processing such as setting a dummy registered device or the like for example.

Figure 20:
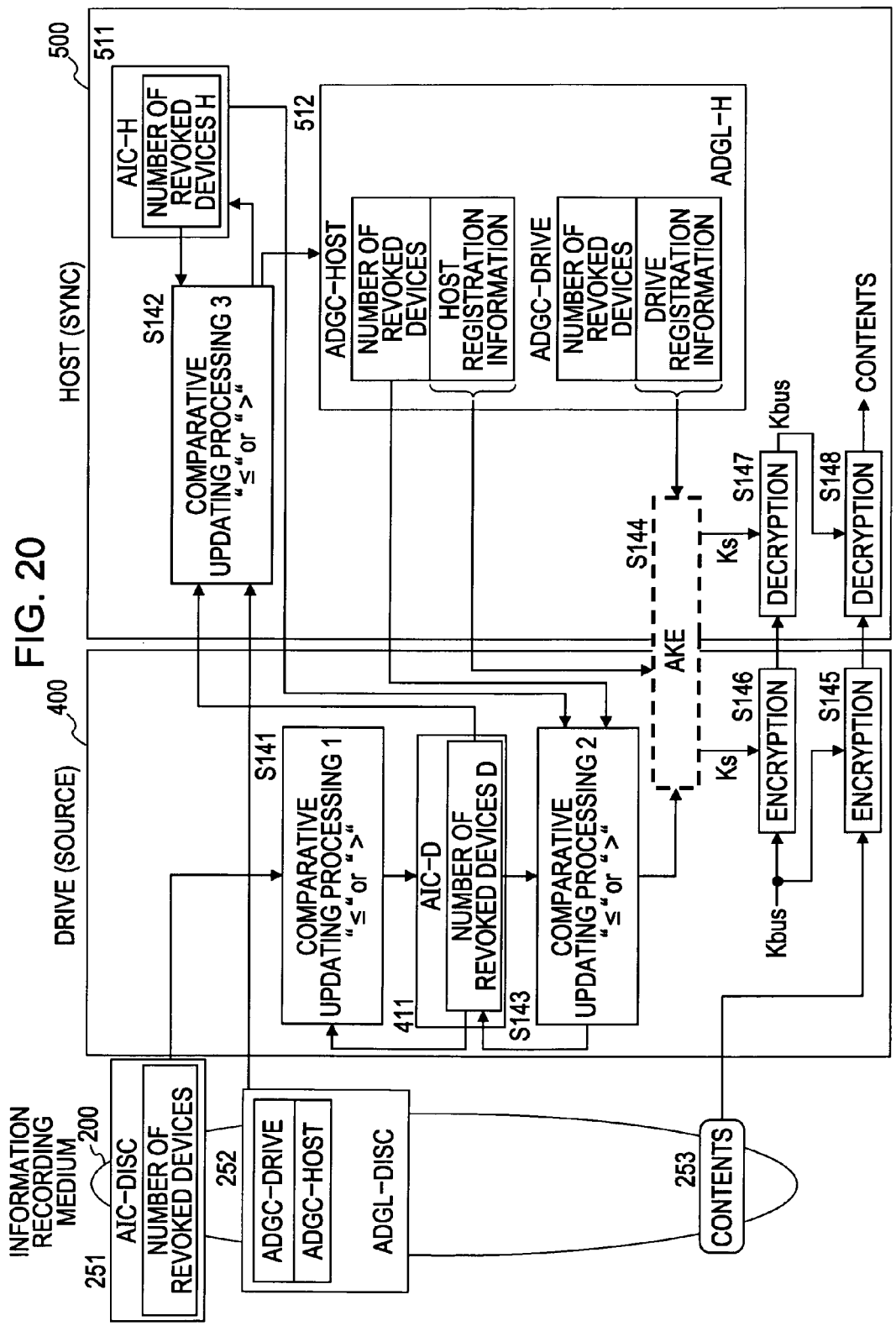
FIG. 20 is a diagram describing updating processing of registration information based on AIC data=the number of revoked devices.

(3) Updating Processing Based on AIC Data=the Number of Invalid (Revoked) Devices Next, description will be made with reference to FIG. 20 regarding processing in a case wherein of devices registered in an authorized device group list (ADGL), the number of invalidated (revoked) is set as AIC data, and updating processing is performed based on the AIC data, i.e., the number of invalid devices. FIG. 20 is a diagram describing processing wherein when outputting the contents 253 stored in the information recording medium 200 to the host 500 via the drive 400, and playing back the contents 253, an ADGL information certificate (AIC), and an authorized device group list (ADGL) are updated based on the AIC data (the number of invalid devices), and mutual authentication and key exchange (AKE) between the drive 400 and the host 500 is executed based on the updated information. Note that the output source of contents is a source, and the input destination of contents is a sync, and in this example, the drive 400 is a source, and the host 500 is a sync.

First, the drive 400 reads out the ADGL information certificate (AIC-DISC) 251 stored in the information recording medium 200 in step S141, and compares AIC data thereof (number of invalid devices) with the AIC data (the number of invalid devices) of the ADGL information certificate (AIC-D) 411 stored in the memory of itself.

AIC data (number of invalid devices) is basically set to be increased for each updating, and accordingly, a certificate of which AIC data (number of invalid devices) is a great value is determined as the latest certificate. For example, in the event that AIC data of AIC-D<AIC data of AIC-DISC holds, the drive 400 determines that the AIC-DISC is newer than the AIC-D, and in this case, performs updating processing wherein the ADGL information certificate (AIC-D) 411 stored in the memory of itself is substituted with the ADGL information certificate (AIC-DISC) 251 read from the information recording medium 200.

Note that with the comparative updating processing in step S141, the drive 400 first verifies the signature appended to the ADGL information certificate (AIC-DISC) 251 read from the information recording medium 200, and confirms that the ADGL information certificate (AIC-DISC) is an authorized certificate without being tampered. Following this confirmation, the drive 400 performs comparison and updating.

Step S142 is comparative updating processing to be executed at the host 500. The host 500 inputs the ADGL information certificate (AIC-D) 411 stored in the memory of the drive 400 from the drive 400, and confirms that the certificate is a certificate without tampering using verification of signature thereof, following which executes AIC data (number of invalid devices) comparative processing with the ADGL information certificate (AIC-H) 511 stored in the memory of the host 500. In the event that AIC data of AIC-H<AIC data of AIC-D holds, the host 500 determines that the AIC-D is newer than the AIC-H, and in this case, performs updating processing wherein the ADGL information certificate (AIC-H) 511 stored in the memory of itself is substituted with the ADGL information certificate (AIC-D) 411 input from the drive 400.

Note that in the event that

AIC data of AIC-H<AIC data of AIC-D holds, the host 500 executes updating processing regarding the authorized device group list (ADGL-H) which the host 500 stores in the memory as well. The host 500 executes this updating processing as processing such as substituting the authorized device group list (ADGL-H) with the authorized device group list (ADGL-DISC) stored in the information recording medium 200, or updating the authorized device group list (ADGL-H) by obtaining the latest authorized device group list (ADGL) via a network.

Further, the drive 400 inputs the ADGL information certificate (AIC-H) 511 held in the memory of the host 500 in step S143, and compares the AIC data (number of invalid devices) of the ADGL information certificate (AIC-D) 411 stored in the memory of itself with that of the ADGL information certificate (AIC-H) 511. In the event that AIC data of AIC-D<AIC data of AIC-H holds, the drive 400 determines that the AIC-H is newer than the AIC-D, and in this case, performs updating processing wherein the ADGL information certificate (AIC-D) 411 stored in the memory of itself is substituted with the ADGL information certificate (AIC-H) 511 input from the drive 500.

Note that even with the comparative updating processing in step S143, the drive 400 verifies the signature appended to the ADGL information certificate (AIC-H) 511 input from the host 500, and confirms that the certificate is an authorized certificate which has not been tampered. Following this confirmation, the drive 400 performs comparison and updating.

With the comparative updating processing in step S143, the drive 400 further obtains the authorized device group certificate (ADGC-H) storing the registration information of the host included in the authorized device group list (ADGL-H) 512 stored in the memory of the host 500, and following verification of signature thereof, compares the AIC data (number of invalid devices) set in the authorized group certificate (ADGC-H) with the AIC data (number of invalid devices) of the ADGL information certificate (AIC-D) 411 stored in the memory of itself. With this comparison, in the event that AIC data of AIC-H<AIC data of AIC-D holds, the drive determines that the host holds only the authorized device group certificate of an old version not corresponding to the AIC data of the AIC-D, and cancels the processing without proceeding to the mutual authentication processing (AKE).

In the event that the drive 400 determines in step S143 that

AIC data of ADGC-H≧AIC data of AIC-D holds, the flow proceeds to the next step S144.

In step S144 through S148, the mutual authentication and key exchange (AKE) processing between the drive 400 and the host 500, transmission processing of contents and bus key at the drive 400 side, and reception data and decryption processing at the host 500 side are executed, which are the same processing as those in FIG. 18, and details thereof will be described at a subsequent stage.

With the present processing example, the number of invalid devices serving as AIC data appended to an ADGL information certificate (AIC) and an authorized device group certificate (ADGC) is applied to new/old determination of each certificate. The number of invalid devices serving as AIC data is increased by updating of a certificate, or unchangeable, but in many cases, only the number of registered devices is increased, and the number of invalid devices is unchangeable, but the number of invalid devices is increased in the case of invalidated (revoked) invalid device being updated. In the event that the number of registered devices is unchangeable, it is unnecessary to perform updating. For example, the number of rewriting of flash memory to be used as nonvolatile memory for storing the certificate of the drive 400 or host 500 can be reduced. In the event of the above new/old determination using a sequence number, even if the number of invalid devices is unchangeable, upon the sequence number is changed, all sequence numbers need to be changed, resulting in a problem wherein frequency of use of flash memory is increased.

Description will be made with reference to FIG. 21 and FIG. 22 regarding the procedures of comparative updating processing 1 through 3 (see FIG. 19 and FIG. 20) executed at the drive and the host in the new/old determination processing of an ADGL information certificate (AIC) and an authorized device group certificate (ADGC) described with reference to FIG. 19 and FIG. 20.

Figure 21:
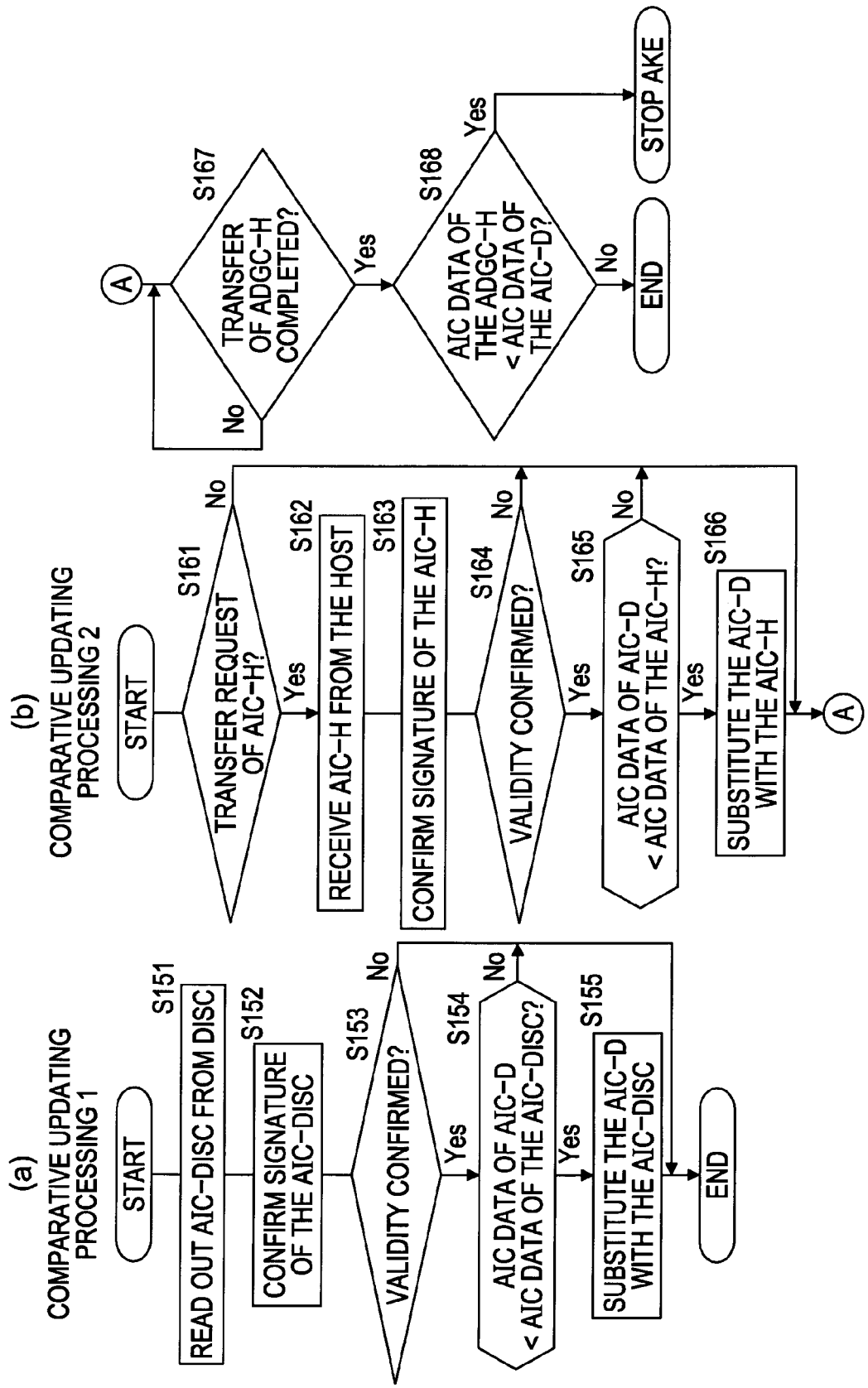
FIG. 21 is a diagram describing the detailed sequence of updating processing of registration information based on AIC data.
Figure 22:
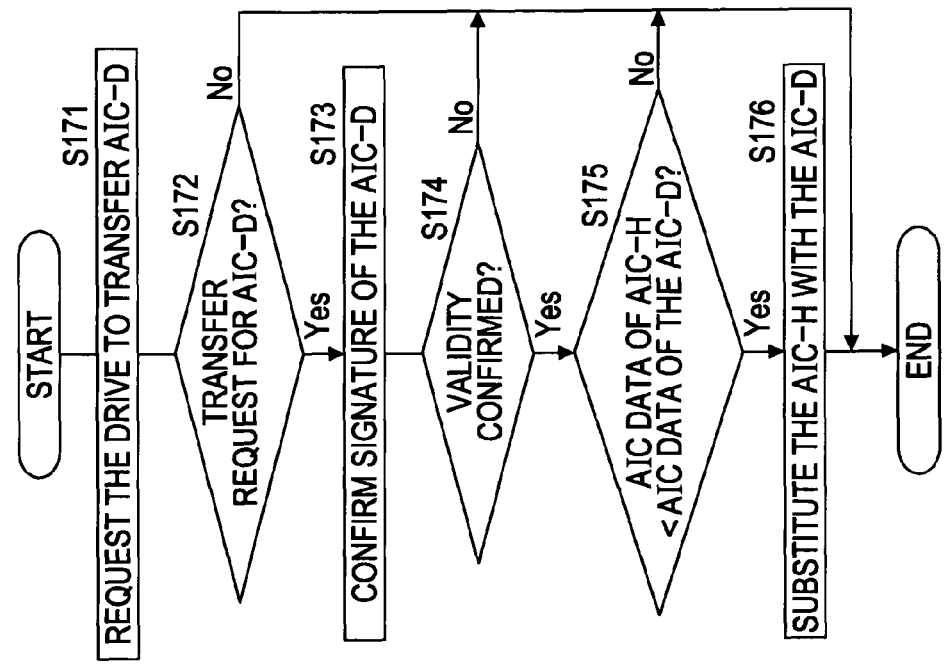
FIG. 22 is a diagram describing the detailed sequence of updating processing of registration information based on AIC data.

FIG. 21(*a*) is a flowchart illustrating the comparative updating processing 1 which the drive 400 executes, i.e., step S131 illustrated in FIG. 19, and the processing sequence in step S141 illustrated in FIG. 20. The drive reads out an ADGL information certificate (AIC-DISC) in step S151, and executes verification of the signature of the ADGL information certificate (AIC-DISC). In the event that validity of the certificate is not confirmed using signature verification (No in step S153), the subsequent processing is cancelled. In this case, contents transfer processing is not executed.

In the event of confirming validity of the certificate using signature verification (Yes in step S153), the drive 400 executes comparison between the AIC data (number of registered devices, or number of invalid devices) of the ADGL information certificate (AIC-DISC) obtained from the information recording medium and the AIC data (number of registered devices, or number of invalid devices) of the ADGL information certificate (AIC-D) stored in the memory of itself in step S154. In the event that AIC data of AIC-D<AIC data of AIC-DISC holds, the drive 400 determines that the AIC-DISC is newer than the AIC-D, the flow proceeds to step S155, and the drive 400 performs updating processing wherein the ADGL information certificate (AIC-D) stored in the memory of itself is substituted with the ADGL information certificate (AIC-DISC) read from the information recording medium. In the event that the above condition, AIC data of AIC-D<AIC data of AIC-DISC is not satisfied, the drive 400 determines that it is unnecessary to update the ADGL information certificate (AIC-D) stored in the memory of itself with the ADGL information certificate (AIC-DISC) read out from the information recording medium, and terminates the processing without performing the updating processing.

Next, description will be made regarding the comparative updating processing 2 which the drive 400 executes, i.e., step S133 illustrated in FIG. 19, and the processing sequence in step S143 illustrated in FIG. 20. The drive 400 receives an ADGL information certificate (AIC-H) transfer request from the host in step S162, following which receives an ADGL information certificate (AIC-H) in step S162 from the host. In step S163, the drive 400 executes signature verification of the ADGL information certificate (AIC-H), and in the event that validity of the certificate has not been confirmed with signature verification (No in step S164), the drive 400 cancels the subsequent processing. In this case, contents transfer processing is not executed.

In the event of confirming validity of the certificate using signature verification (Yes in step S164), the drive 400 executes comparison between the AIC data (number of registered devices, or number of invalid devices) of the ADGL information certificate (AIC-H) obtained from the host and the AIC data (number of registered devices, or number of invalid devices) of the ADGL information certificate (AIC-D) stored in the memory of itself in step S165. In the event that AIC data of AIC-D<AIC data of AIC-H holds, the drive 400 determines that the AIC-H is newer than the AIC-D, the flow proceeds to step S166, and the drive 400 performs updating processing wherein the ADGL information certificate (AIC-D) stored in the memory of itself is substituted with the ADGL information certificate (AIC-H) obtained from the host. In the event that the above condition, AIC data of AIC-D<AIC data of AIC-H is not satisfied, the drive 400 determines that it is unnecessary to update the ADGL information certificate (AIC-D) stored in the memory of itself with the ADGL information certificate (AIC-H) obtained from the host, and performs no updating processing.

Next, the drive 400 confirms reception of the authorized device group certificate (ADGC-H) from the host in step S167, following which executes comparison between the AIC data (number of registered devices, or number of invalid devices) set in the authorized device group certificate (ADGC-H) and the AIC data (number of registered devices, or number of invalid devices) of the ADGL information certificate (AIC-D) stored in the memory of itself in step S168. If the condition, AIC data of AIC-H<AIC data of AIC-D holds, the drive 400 determines that the host holds only the authorized device group certificate of an old version not corresponding to the AIC data of the AIC-D, and cancels the processing without proceeding to the mutual authentication processing (AKE). If the condition, AIC data of AIC-H<AIC data of AIC-D does not hold, the drive 400 terminates the comparative updating processing 2.

Next, description will be made regarding the comparative updating processing 3 in FIG. 22(*c*) which the drive 500 executes, i.e., step S132 illustrated in FIG. 19, and the processing sequence in step S142 illustrated in FIG. 20. The host executes an ADGL information certificate (AIC-D) transfer request as to the drive in step S171, and upon the host confirming reception of the ADGL information certificate (AIC-D) from the drive in step S172, the host executes signature verification of the ADGL information certificate (AIC-D), but in the event of not confirming validity of the certificate using signature verification (No in step S174), the host cancels the subsequent processing. In this case, contents transfer processing is not executed.

In the event of confirming validity of the certificate as a result of signature verification of the ADGL information certificate (AIC-D) in step S173 (Yes in step S174), the host executes AIC data (number of registered devices, or number of invalid devices) comparative processing between the ADGL information certificate (AIC-D) and the ADGL information certificate (AIC-H) stored in the host memory in step S175. In the event that AIC data of AIC-H<AIC data of AIC-D holds, the host determines that the AIC-D is newer than the AIC-H, and in this case, the flow proceeds to step S176, the host performs updating processing wherein the ADGL information certificate (AIC-H) stored in the memory of itself is substituted with the ADGL information certificate (AIC-D) 411 input from the drive.

Note that in the event that

AIC data of AIC-H<AIC data of AIC-D holds, the host executes updating processing regarding the authorized device group list (ADGL-H) which the host stores in the memory as well. The host executes this updating processing as processing such as substituting the authorized device group list (ADGL-H) with the authorized device group list (ADGL-DISC) stored in the information recording medium via the drive, or updating the authorized device group list (ADGL-H) by obtaining the latest authorized device group list (ADGL) via a network.

Figure 23:
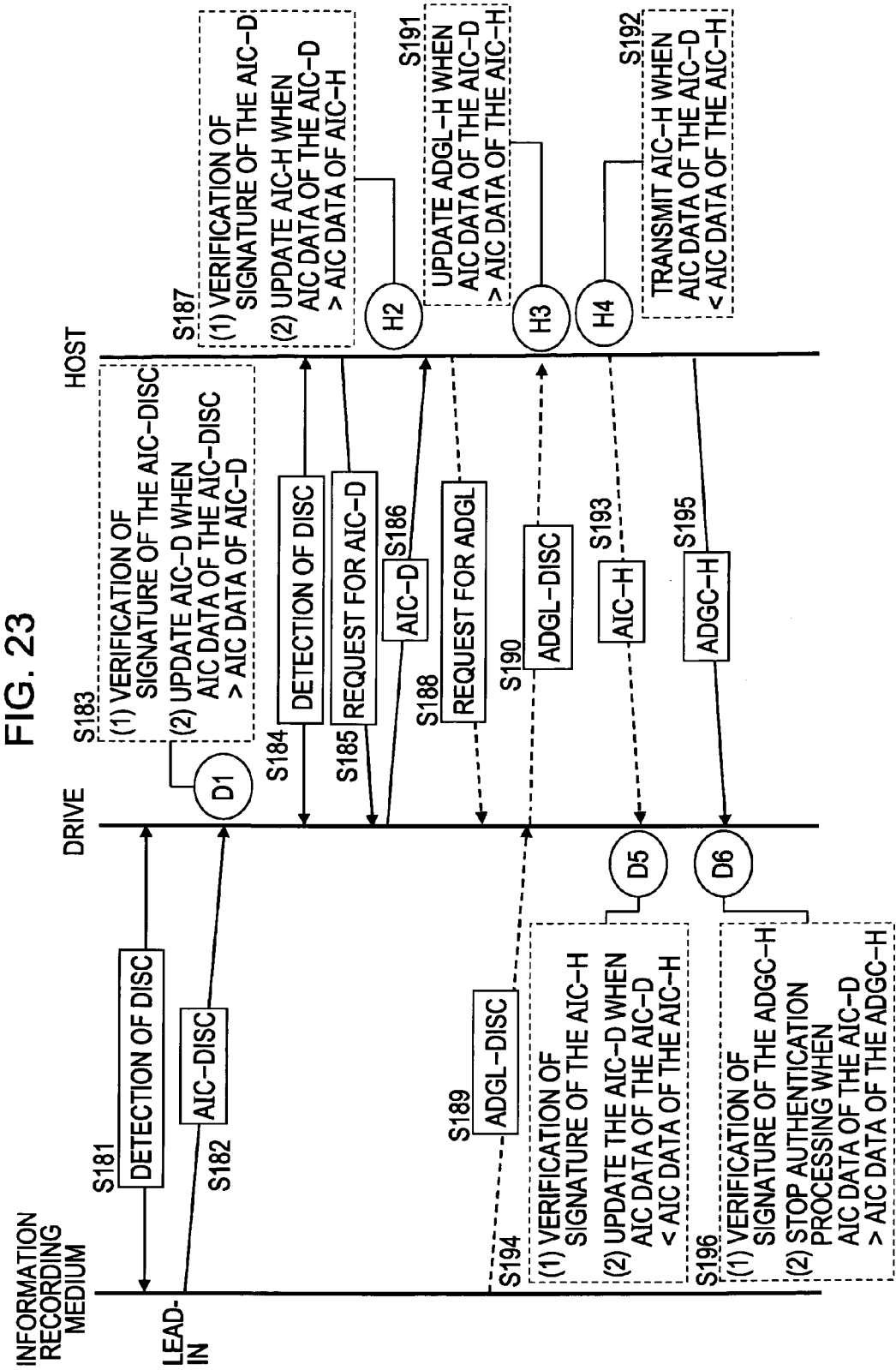
FIG. 23 is a diagram describing a communication sequence between an information recording medium, a drive, and an information processing device in updating processing of registration information based on AIC data.

Next, description will be made with reference to FIG. 23 regarding a data communication sequence to be executed between an information recording medium (disc), drive, and host in the processing of the comparative updating processing 1 through 3 (see FIG. 19 and FIG. 20) to be executed at the drive and the host.

In step S181, the drive executes detection of an information recording medium (disc) in step S181, and upon an information recording medium being detected, the drive executes readout of an ADGL information certificate (AIC-DISC) from the lead-in region of the information recording medium (disc) in step S182, and executes the comparative updating processing 1 (step S131 in FIG. 19, and step S141 in FIG. 20). This comparative updating processing 1 includes (1) signature verification of the ADGL information certificate (AIC-DISC), (2) confirmation of AIC data of AIC-DISC<AIC data of AIC-D, and updating processing based on the confirmation.

Next, upon the host obtaining disc detection information from the drive in step S184, the host requests an ADGL information certificate (AIC-D) of the drive in step S185, and receives an ADGL information certificate (AIC-D) from the drive in step S186. Next, the host executes the comparative updating processing 3 (step S132 in FIG. 19, step S142 in FIG. 20). This comparative updating processing 3 includes (1) signature verification of the ADGL information certificate (AIC-D), (2) confirmation of AIC data of AIC-D<AIC data of AIC-H, and updating processing based on the confirmation.

Further, in the event that

AIC data of AIC-D<AIC data of AIC-H holds, the host executes transmission request of an authorized device group list (ADGL-DISC) as to the drive to obtain the authorized device group list (ADGL-DISC) from the drive to execute updating processing of the authorized device group (ADGL) in step S188, the drive reads out an authorized device group list (ADGL-DISC) from the disc in step S189, and transmits this to the host in step S190.

In step S191, the host executes updating processing for substituting the authorized device group list (ADGL-H) stored in the memory with the authorized device group list (ADGL-DISC). This processing is executed only in the event that AIC data of AIC-D<AIC data of AIC-H holds. Note that in the event that the host has a configuration capable of connecting to a network, the host may obtain the latest authorized device group list (ADGL) from a server to be connected via the network to perform updating.

In the event that

AIC data of AIC-D<AIC data of AIC-H holds, the host obtains the ADGL information certificate (AIC-H) stored in the memory in step S192, and transmits this to the drive in step S193.

The drive executes the comparative updating processing 2 (step S133 in FIG. 19, step S143 in FIG. 20). This comparative updating processing 2 includes (1) signature verification of the ADGL information certificate (AIC-H), (2) confirmation of AIC data of AIC-D<AIC data of AIC-H, and updating processing based on the confirmation.

Further, the drive receives the authorized device group certificate (ADGC-H) storing the registration information of the host included in the authorized device group list (ADGL-H) from the host in step S195, performs in step S196

(1) signature verification of the authorized device group certificate (ADGC-H), (2) confirmation of AIC data of AIC-D<AIC data of AIC-H, and determines execution or cancellation of authentication processing based on the confirmation. In the event that AIC data of AIC-D<AIC data of AIC-H holds, this means that the host possesses an old authorized device group certificate (ADGC-H), and accordingly, the drive cancels the processing.

Next, description will be made with reference to FIG. 24 regarding the entire processing sequence in playback processing which subjects between the drive and the host to bus connection, and accompanies transfer of contents.

Figure 24:
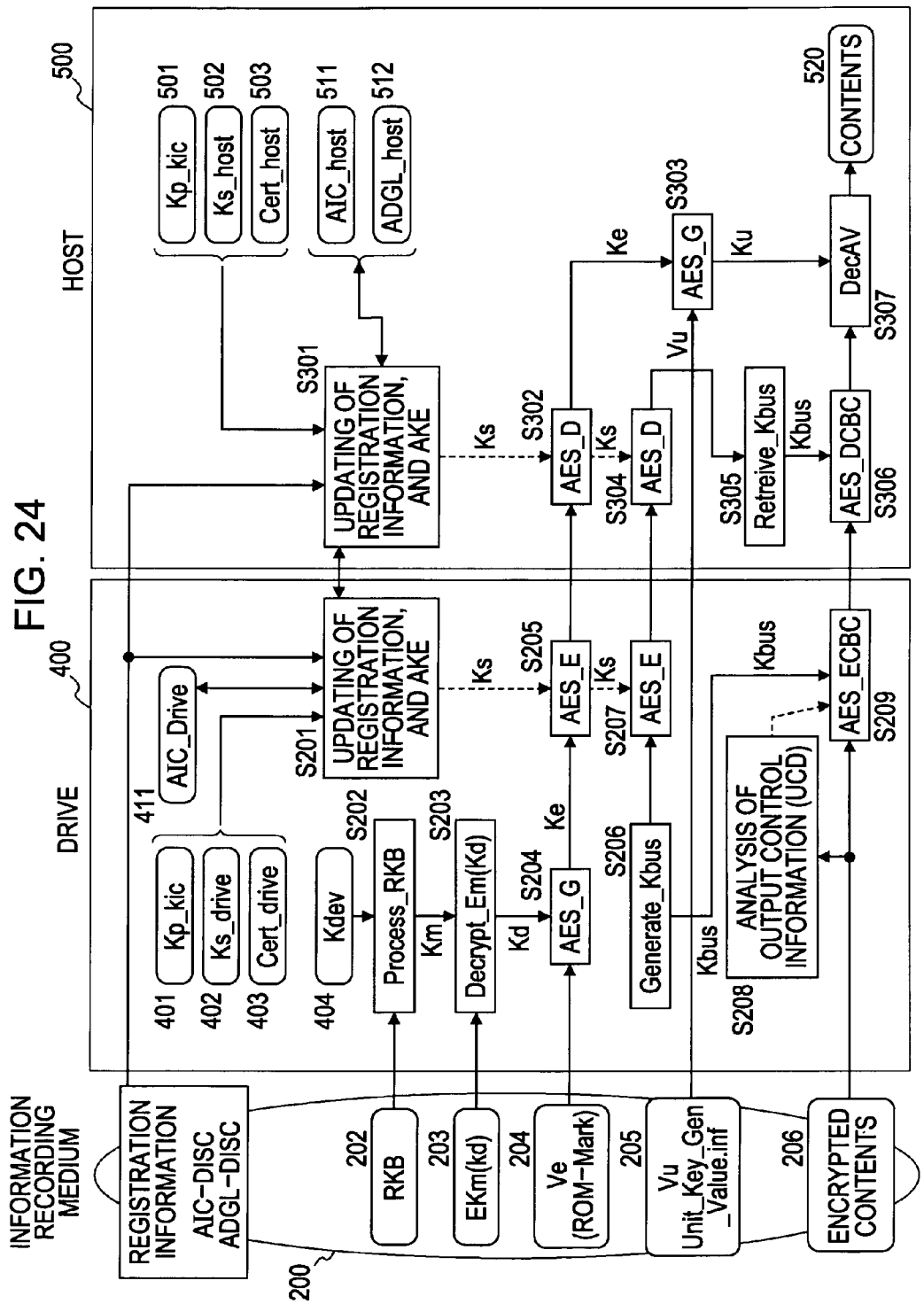
FIG. 24 is a diagram describing updating processing of registration information, mutual authentication, and a contents playback sequence in contents playback accompanying contents transfer between a drive and an information processing device.

FIG. 24 illustrates an information recording medium 200, a drive 400 for mounting the information recording medium 200 and executing readout of data from the information recording medium 200, and the processing of a host 500 for inputting contents and other data from the drive 400 via the connection bus, and executing contents playback processing in accordance with an application program. Note that a bus connecting between the drive 400 and the host 500 is a connection bus made up of an ATAPI-BUS, for example. Note that this bus may be USB or other connection bus.

The information recording medium 200 stores various types of information previously described with reference to FIG. 9, i.e., registration information 201 serving as a registration device list to be applied to mutual authentication and key exchange processing (AKE) in accordance with the public key encryption method, an RKB 202 serving as an encryption key block storing a media key Km, an encrypted disc key Ekm(Kd) 203 obtained by encrypting a disc key Kd with the media key Km, a ROM mark Ve204, unit key generation information Vu205, and encrypted contents 206. The registration information 201 includes an ADGL information certificate (AIC-DISC), and an authorized device group list (ADGL-DISC).

The drive 400 stores a public key [Kp_kic] 401 of the administration center in accordance with the public key encryption method, a secret key [Ks_drive] 402 corresponding to a drive in accordance with the public key encryption method, a public key certificate [Cert_drive] 403 storing a public key corresponding to a drive in accordance with the public key encryption method, and a device key [Kdev] 404, and further an ADGL information certificate (AIC-D) 411.

On the other hand, the host 500 stores a public key [Kp_kic] 501 of the administration center in accordance with the public key encryption method, a host secret key [Ks_host] 502, a host public key certificate [Cert_host] 503 storing a host public key, and further an ADGL information certificate (AIC-host) 511, and an authorized device group list (ADGL-host) 512.

First, in steps S201 and S301, updating of registration information, mutual authentication, and key exchange (AKE) processing is executed between the drive 400 and the host 500.

The updating of registration information is processing previously described with reference to FIG. 18 through FIG. 23, updating processing of an ADGL information certificate (AIC) and an authorized device group list (ADGL) is executed in accordance with any of (1) updating processing based on an ADGL sequence number, (2) updating processing based on AIC data=the number of registered devices, and (3) updating processing based on AIC data=the number of invalid (revoked) devices.

Following this updating processing of registration information, the mutual authentication, and key exchange (AKE) processing is executed between the drive 400 and the host 500. Description will be made regarding the detailed sequence of the mutual authentication, and key exchange (AKE) processing with reference to FIG. 25. This processing is executable, for example, by applying mutual authentication utilizing the public key algorithm stipulated by ISO/IEC9798-3, and a key generation processing method utilizing the public key algorithm stipulated by ISO/IEC11770-3. Note that as for a method which is put into practical use as a mutual authentication method utilizing a public key, there is a method to be described in DTCP (Digital Transmission Content Protection) Specification Volume 1 (Informational Version), for example.

Figure 25:
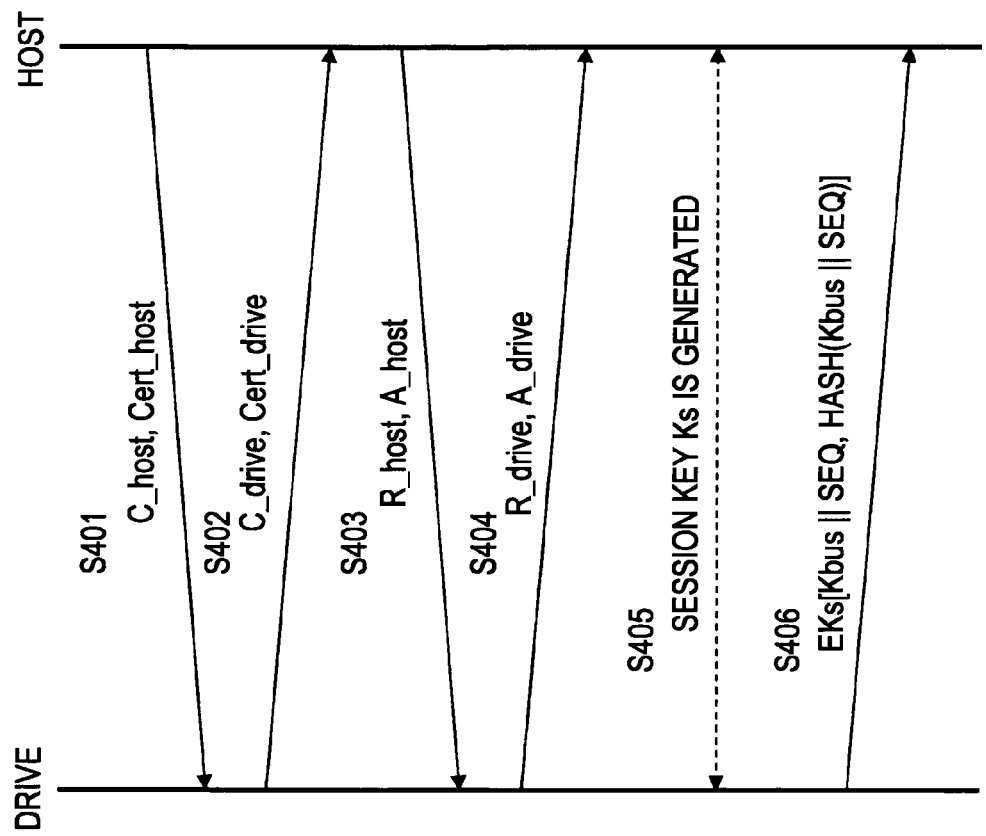
FIG. 25 is a diagram describing a mutual authentication and key exchange (AKE) processing sequence to be executed between a drive and an information processing device.

Description will be made regarding the processing sequence illustrated in FIG. 25. In step S401, the host transmits challenge data [C_host] generated by random number generation processing, and a public key certificate [Cert_host] to the drive. The public key certificate [Cert_host] is the public key certificate illustrated in FIG. 14(b).

The drive side which received this data verifies validity of the public key certificate [Cert_host] by signature verification processing of the public key certificate [Cert_host]. The signature verification processing is executed by applying the public key [Kp_kic] 401 (see FIG. 24) of the administration center held by the drive.

Upon verifying validity of the public key certificate [Cert_host], the drive obtains a public key certificate ID from the public key certificate [Cert_host], and confirms whether or not the public key certificate ID of the host is a valid ID without being invalidated (revoked) with reference to the authorized public key certificate information of the authorized device group certificate (ADGC) storing the registration information of the host. The authorized device group certificate (ADGC) applied here is the certificate updated in the previous updating processing of the registration information by new/old comparison of various types of certificate being executed.

In the event that validity of the public key certificate [Cert_host] has not been confirmed, or it has been confirmed that the host is not registered based on the authorized device group certificate (ADGC), or the host is registered, but is invalidated (revoked), the drive executes notification of an error message or the like, and terminates the processing. The subsequent contents, output, and playback processing are cancelled.

In the event that validity of the public key certificate [Cert_host] has been confirmed, and it has been confirmed that the host is registered, and also is a host possessing an authorized public key certificate without being invalidated (revoked), the drive transmits challenge data [C_drive] generated by random number generation processing, and the public key certificate at the drive side [Cert_drive] to the host in step S402.

The host executes signature verification of the public key certificate at the drive side [Cert_drive]. The signature verification processing is executed by applying the public key [Kp_kic] 501 (see FIG. 24) of the administration center held by the host side.

Upon verifying validity of the public key certificate [Cert_drive], the host obtains a public key certificate ID from the public key certificate [Cert_drive], and confirms whether or not the public key certificate ID of the drive is a valid ID without being invalidated (revoked) with reference to the authorized public key certificate information of the authorized device group certificate (ADGC) storing the registration information of the drive. The authorized device group certificate (ADGC) applied here is the certificate updated in the previous updating processing of the registration information by new/old comparison of various types of certificate being executed.

In the event that validity of the public key certificate [Cert_drive] has not been confirmed, or it has been confirmed that the drive is not registered based on the authorized device group certificate (ADGC), or the drive is registered, but is invalidated (revoked), the host executes notification of an error message or the like, and terminates the processing. The subsequent contents, output, and playback processing are cancelled.

In the event that validity of the public key certificate [Cert_drive] has been confirmed, the host executes computation based on the challenge data [C_drive] received from the drive to calculate a parameter [A_host], and transmits this to the drive along with the new generated random number [R_host] (step S403).

On the other hand, the drive executes computation based on the challenge data [C_host] received from the host to calculate a parameter [A_drive], and transmits this to the host along with the new generated random number [R_drive] (step S404).

According to this processing, both of the drive and the host consequently share the random numbers [R_host] and [R_drive], and parameters [A_host] and [A_drive], and both of the drive and the application generate a common session key Ks based on these shared data (step S405).

The drive further transmits data EKs [(Kbus∥SEQ), hash (Kbus∥SEQ)] obtained by encrypting combined data [Kbus∥SEQ] of the bus key Kbus generated based on a random number, and the sequence number SEQ of the bus key, and a hash value [hash (Kbus∥SEQ)] calculated as tampering verification data of this combined data using the session key Ks to the host application. Note that this processing in step S406 is equivalent to the bus key generation processing (Generate_Kbus) in step S206, and the processing of encryption processing of the bus key using the session key Ks in step S207.

The bus key Kbus is a key to be employed as an encryption key at the time of transfer processing of encrypted contents from the drive to the host side via the connection bus, which is generated based on a random number at the drive. As for the bus key, there is a case wherein the bus key is generated based on a random number at the time of the first mutual authentication following detection of disc insertion, and the same value is utilized until the disc is ejected or power source is turned off, and a case wherein the bus key is switched to a different bus key each time mutual authentication is performed. The sequence number corresponding to each bus key transfer is correlated with each of the mutual authentication for the sake of preventing the bus key to be substituted secretly.

Now returning to FIG. 24, description will be continued regarding the processing sequence wherein the drive 400 transfers data such as contents obtained from the information recording medium to the host 500 via the connection bus, and plays this back.

Upon completing the mutual authentication and key exchange (AKE) with the host 500, the drive 400 executes decryption processing of the RKB 202 serving as an encryption key block read out from the information recording medium 200 by applying the device key Kdev 404 held within the drive in step S202 to obtain the media key Km from the RKB 202. Note that only the instrument of which use of contents has been authorized can obtain the media key Km from the RKB 202, so an instrument revoked as unauthorized instrument cannot decrypt the RKB using a device key possessed by itself, and cannot obtain the media key Km.

Upon succeeding in obtaining of the media key Km in step S202, the drive 400 executes decryption processing of the encrypted disc key Ekm(Kd) obtained from the information recording medium 200 by applying the obtained media key Km to obtain the disc key Kd in step S203.

Next, in step S204, the drive 400 executes key generation processing based on the obtained disc key Kd, and the ROM mark Ve204 obtained from the information recording medium 200, e.g., key generation processing in accordance with the AES encryption algorithm to generate an embedded key Ke. The key generation processing in accordance with the AES encryption algorithm is the same as previously described with reference to FIG. 10.

The drive encrypts the embedded key Ke using the session key Ks generated in the previous mutual authentication and key exchange processing (AKE), and transmits this to the host 500 via the connection bus.

The processing in step S206 and step S207 is equivalent to the processing in step S406 of the mutual authentication and key exchange processing (AKE) previously described with reference to FIG. 25, which is processing wherein the drive 400 generates the bus key Kbus based on a random number (step S206), generates data by encrypting data including the bus key Kbus using the session key Ks (step S207), and transmits this data to the host 500 via the connection bus. The transmission data is, as previously described with reference to FIG. 25, data EKs [(Kbus||SEQ), hash (Kbus||SEQ)] obtained by encrypting combined data [Kbus||SEQ] of the bus key Kbus generated based on a random number, and the sequence number SEQ of the bus key, and a hash value [hash (Kbus||SEQ)] calculated as tampering verification data of this combined data using the session key Ks to the host application.

Further, the drive 400 executes output control based on output control information included in the user control data (UCD) of the encrypted contents 206 read out from the information recording medium 200, and the stored data of the public certificate of the host obtained from the host 500 in the mutual authentication and key exchange processing (AKE) in step S208, and encrypts the encrypted contents 206 using the bus key Kbus corresponding to a control pattern to output the generated encrypted data to the host 500 via the connection bus in step S209.

The encrypted contents 206 to be read out from the information recording medium 200 is, for example, encrypted data subjected to scrambling processing, and the drive encrypts the data subjected to scrambling processing using the bus key Kbus again to output this to the host side. Executing output of data using the re-encryption processing to which the bus key Kbus is applied allows only the authenticated host possessing the bus key Kbus to perform decryption to which the bus key Kbus is applied, and obtain contents 350 using decryption processing.

Figure 4:
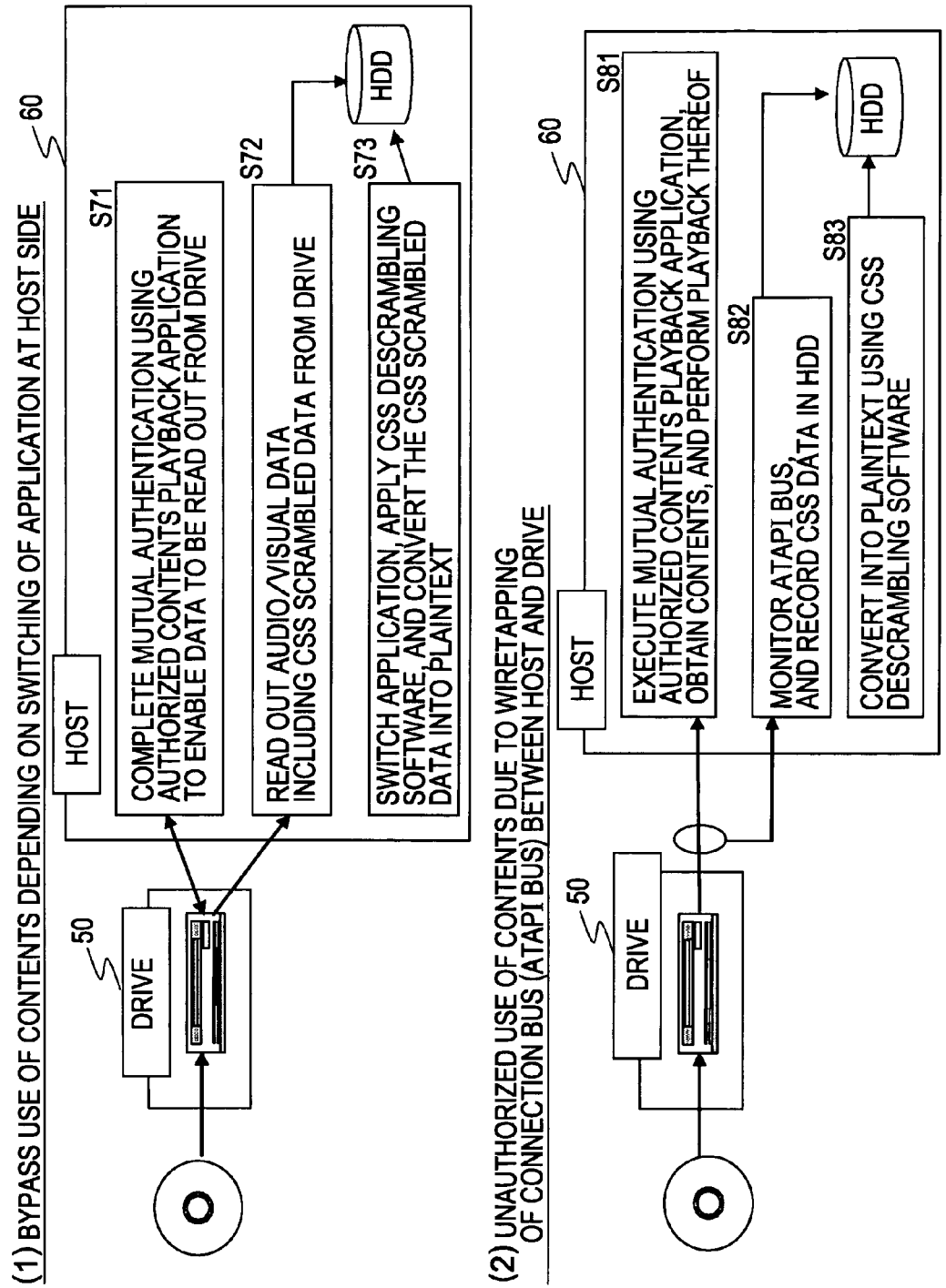
FIG. 4 is a diagram describing an illegal use example of contents in a conventional processing configuration accompanying contents transfer between a host and a drive.

That is to say, as previously described with reference to FIG. 4, even if bypass acquisition of contents by switching an application at the PC (host) side which inputs contents, or acquisition of contents by wiretapping the transfer data of the connection bus between the drive and the host is performed, the contents to be obtained is data encrypted using the bus key Kbus, and only the specific host application alone which has established authentication with the drive possesses the bus key Kbus, and accordingly, decryption of input contents cannot be executed unless the specific host application is employed. The data encrypted with the bus key Kbus cannot be decrypted using the CSS descrambling program alone, whereby illegal use of contents can be prevented.

Thus, the devices according to the present invention, such as the drive, host, and so forth execute validity determination processing of the public key certificate obtained from a device to be authenticated in accordance with the new authorized device group certificate selected based on the above new/old determination, and also execute the mutual authentication and key exchange (AKE) as to the device to be authenticated, and set a contents communication path, and a secure communication path including the communication path of a key to be applied to the encryption processing of contents as the condition of establishment of the mutual authentication, and execute data communication via these communication paths.

Figure 26:
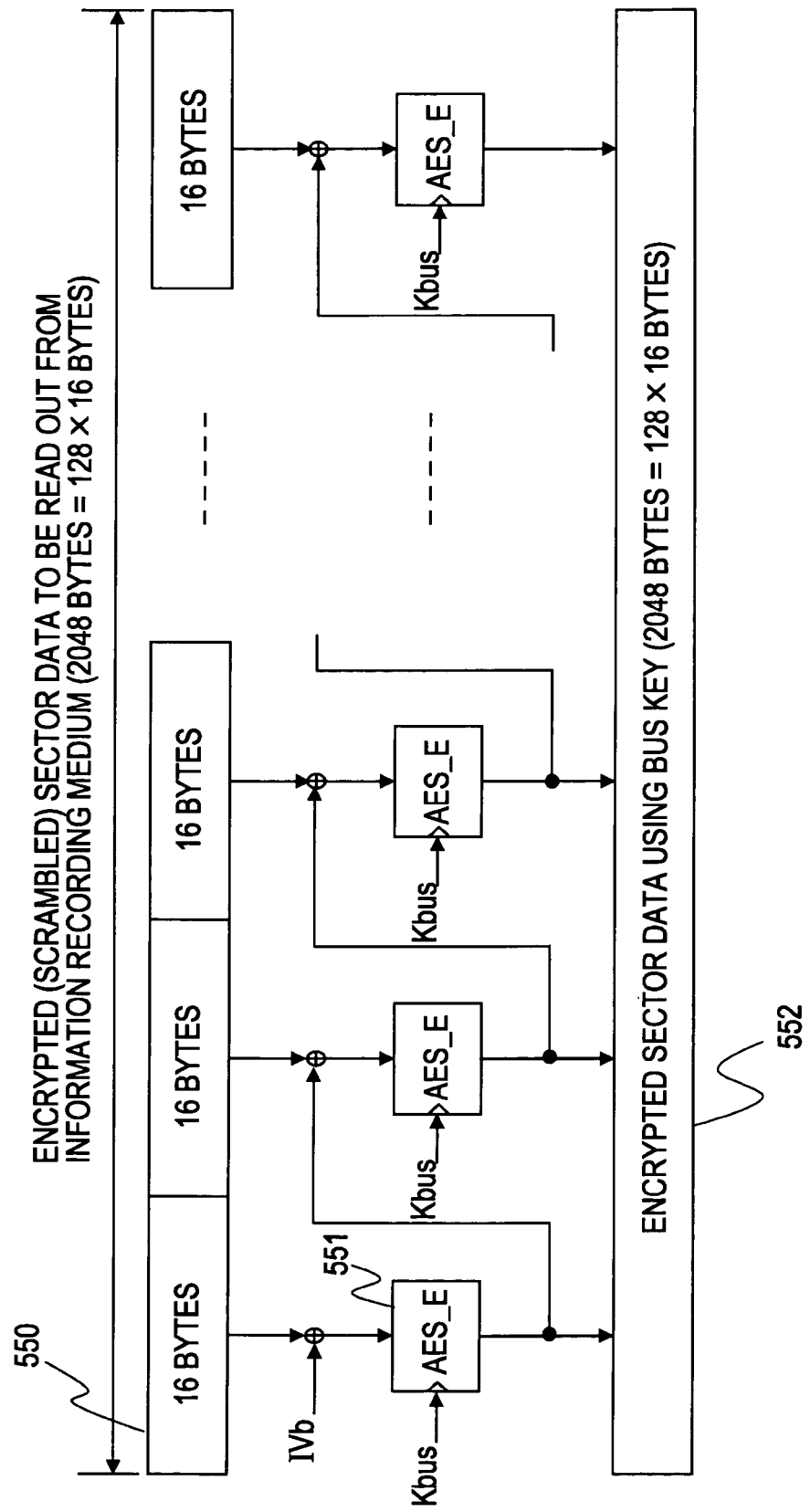
FIG. 26 is a diagram describing an encryption processing configuration based on the bus key Kbus of contents to be executed at a drive.

Description will be made regarding the encryption processing pattern of the encrypted contents 206 to which the bus key Kbus is applied with reference to FIG. 26. The encryption processing of the encrypted contents 206 to which the bus key Kbus is applied is executed by block encryption processing to which the AES-CBC mode is applied as illustrated in FIG. 26, for example.

The drive 400 subjects the encrypted contents to be read out from the information recording medium 200 to processing for performing encryption in increments of a certain data block (16 bytes) by applying the bus key Kbus generated at the drive.

First, the drive 400 obtains the headmost 16-byte data from sector data 550 of 2048 bytes serving as the configuration data of encrypted contents to be read out from the information recording medium 200, inputs the exclusive-OR (XOR) results as to an initial value IVb to an AES encryption processing unit [AES_E] 551, and executes the encryption processing in accordance with the AES encryption algorithm to which the bus key Kbus is applied to generate the encrypted data of the 16-byte block data. Note that the initial value IVb is a constant which has been set beforehand. The IVb is sometimes obtained from the user control data (UCD) corresponding to the sector data 550, for example.

Further, this generated data is applied as an input value to be applied to encryption of the next block. Hereinafter, the drive 400 repeatedly executes the exclusive-OR (XOR) and the AES encryption processing in the same way for each 16-byte block data to generate encrypted sector data 552 using the bus key, and transmits this data to the application at the host 500 side via the connection bus such as an ATAPI-BUS or the like. The host 500 side decrypts this input encrypted data to perform playback processing.

Now returning to FIG. 24, description will be made regarding the processing sequence of the host 500 side. The host 500 first executes the mutual authentication and key exchange (AKE) as to the drive 400 in step S301 as described above to obtain the session key Ks.

Next, in step S302, the host 500 executes decryption processing to which the session key Ks is applied as to the embedded key Ke encrypted by the session key Ks input from the drive via the connection bus, i.e., [EKs (Ke)] to obtain the embedded key Ke.

Further, in step S303, the host 500 executes the AES key generation processing (see FIG. 10) to which the embedded key Ke is applied as to the unit key generation information Vu input from the drive via the connection bus to obtain the unit key Ku.

Next, in step S304, the host 500 executes decryption processing to which the session key Ks is applied as to the bus key Kbus encrypted by the session key Ks input from the drive via the connection bus, i.e., [EKs (Kbus)] to obtain the bus key Kbus.

Note that as previously described with reference to FIG. 25, the data to be transmitted from the drive, which includes the bus key Kbus, is data EKs [(Kbus∥SEQ), hash (Kbus∥SEQ)] obtained by encrypting combined data [Kbus∥SEQ] of the bus key Kbus and the sequence number SEQ of the bus key, and a hash value [hash (Kbus∥SEQ)] calculated as tampering verification data of this combined data using the session key Ks.

In step S304, the application of the host 500 decrypts the data EKs [(Kbus∥SEQ), hash (Kbus∥SEQ)] using the session key Ks to obtain the combined data [Kbus∥SEQ] of the bus key Kbus and the sequence number SEQ of the bus key, and a hash value [hash (Kbus∥SEQ)] calculated as tampering verification data of this combined data.

Next, in step S305, the application of the host 500 calculates the hash value of the combined data [Kbus∥SEQ], and compares this calculated hash value with the hash value [hash (Kbus∥SEQ)] included in the input data from the drive. The application of the host 500 determines that the combined data [Kbus∥SEQ] has not been tampered if both of the hash values are the same, and makes the transition to the contents decryption processing to which the bus key Kbus is applied in step S306.

In step S306, the application of the host 500 executes the decryption processing of the encrypted contents re-encrypted by the bus key Kbus to be input from the drive 400.

Figure 27:
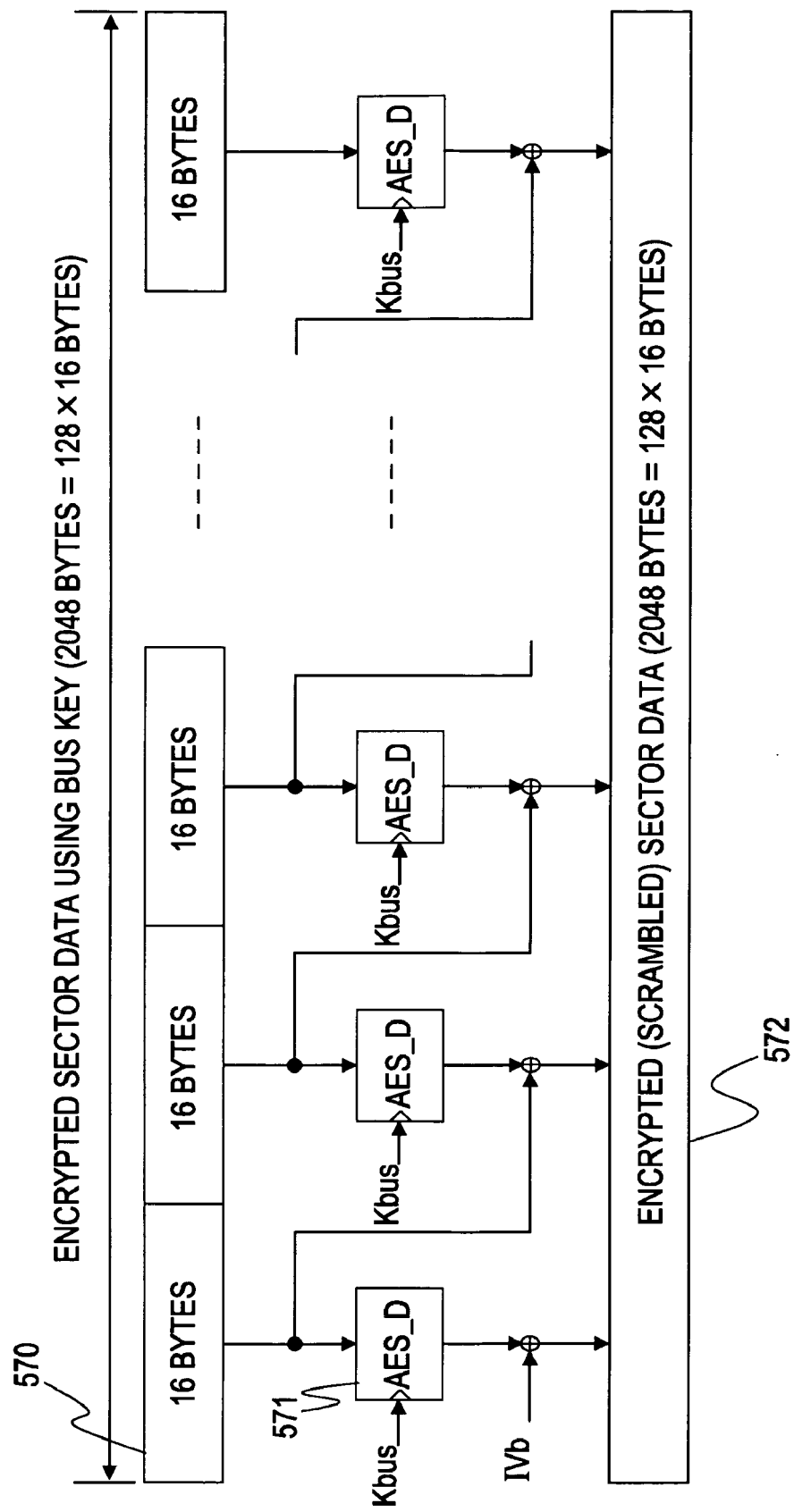
FIG. 27 is a diagram describing a decrypting processing configuration based on the bus key Kbus of contents to be executed at an information processing device.

Description will be made regarding the details of the decryption processing of the encrypted contents re-encrypted by the bus key Kbus with reference to FIG. 27. The encryption processing of the encrypted contents to which the bus key Kbus is applied is executed by block encryption processing to which the AES-CBC mode is applied as illustrated in FIG. 27, for example.

The application of the host 500 executes processing for performing decryption in increments of a certain data block (16 bytes) as to the encrypted contents to be input from the drive 400 via the connection bus by applying the bus key Kbus input from the drive.

First, the application of the host 500 obtains the headmost 16-byte data from sector data 570 of 2048 bytes serving as the configuration data of encrypted contents to be input from the drive 400 via the connection bus, inputs this to the AES decryption processing unit [AES_D] 571, and executes the decryption processing in accordance with the AES encryption algorithm to which the bus key Kbus is applied, and further executes the exclusive-OR (XOR) computing as to the initial value IVb to obtain the decrypted results. The initial value IVb is a constant which has been set beforehand. The IVb is sometimes obtained from the user control data (UCD) corresponding to the sector data 570, for example.

Further, the decryption result data in increments of 16 bytes is applied as an input value to be applied to decryption processing of the next block. Hereinafter, the application of the host 500 repeatedly executes the AES decryption processing and the exclusive-OR (XOR) computing for each 16-byte block data in the same way to obtain sector data of which encryption by the bus key is decrypted, i.e., encrypted (scrambled) sector data 572 in a data state stored in the information recording medium 200.

Further, the host 500 executes decryption processing of encrypted contents in a data state stored in the information recording medium 200 by applying the unit key Ku in step S307 illustrated in FIG. 24. This decryption processing is executed as the same processing as previously described with reference to FIG. 11.

According to the above processing, the host 500 obtains decrypted contents 520, performs output processing as to an output unit such as speakers, display, or the like to execute playback of the contents.

Thus, an arrangement is made wherein the drive for executing readout of data of the information recording medium re-encrypts the data subjected to scrambling processing which is read out from the information recording medium by applying the bus key Kbus to output this to the host side. Accordingly, only the application at the host side possessing the bus key Kbus, i.e., only the host application of which mutual authentication has been established as to the drive is allowed to perform decryption to which the bus key is applied, and is allowed to utilize encrypted contents in decryption processing.

Accordingly, even if bypass acquisition of contents by switching an application at the PC (host) side which inputs contents, or acquisition of contents by wiretapping the transfer data of the connection bus between the drive and the host is performed, only the specific host application, which has established authentication with the drive and possesses the same bus key Kbus, is allowed to perform decryption of data encrypted using the bus key Kbus, and accordingly, the other applications, e.g., a CSS descrambling program cannot perform decryption of data encrypted using the bus key Kbus, thereby preventing illegal use of contents.

Figure 28:
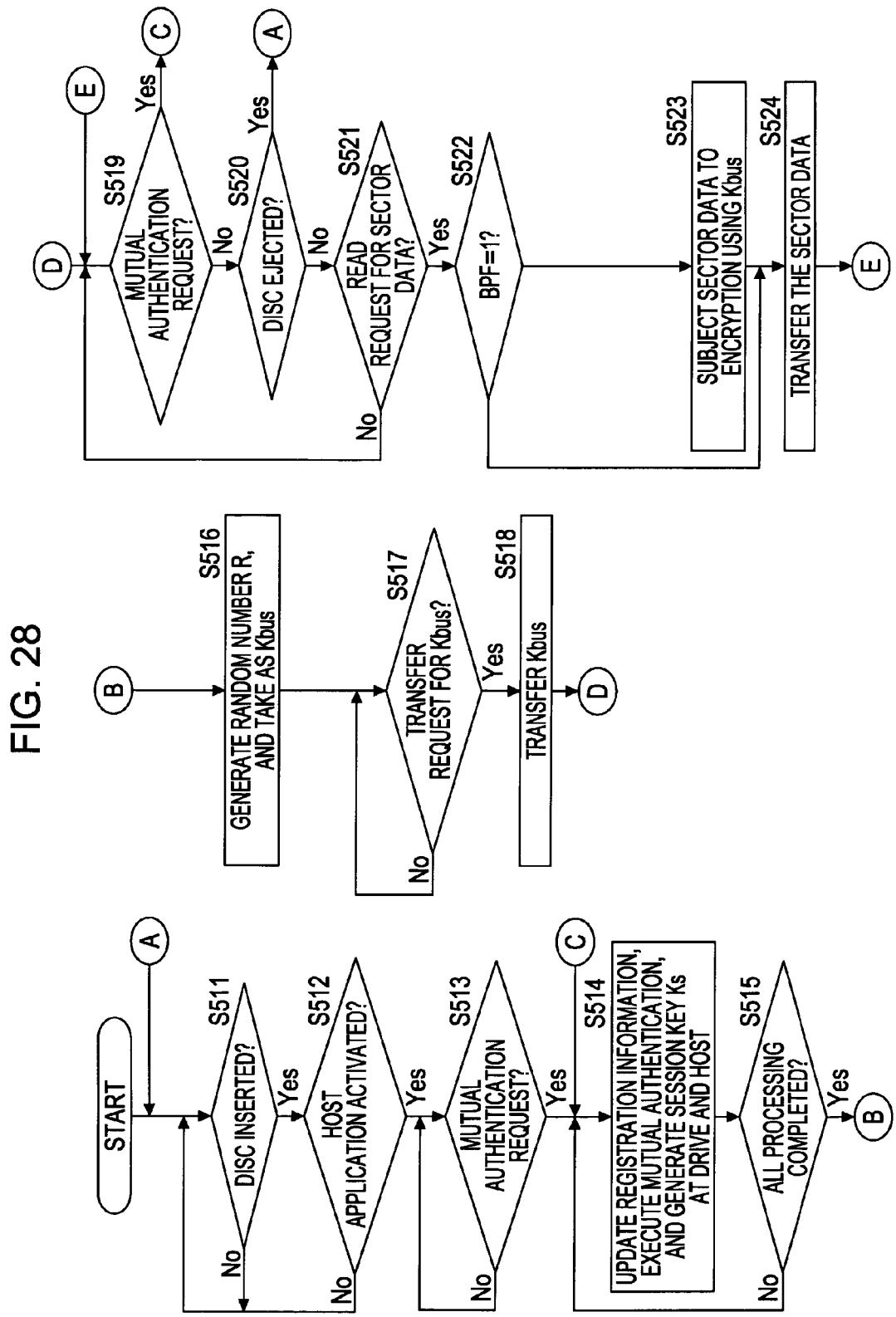
FIG. 28 is a flowchart describing a processing sequence to be executed at a drive in playback processing accompanying contents transfer from a drive to a host.
Figure 29:
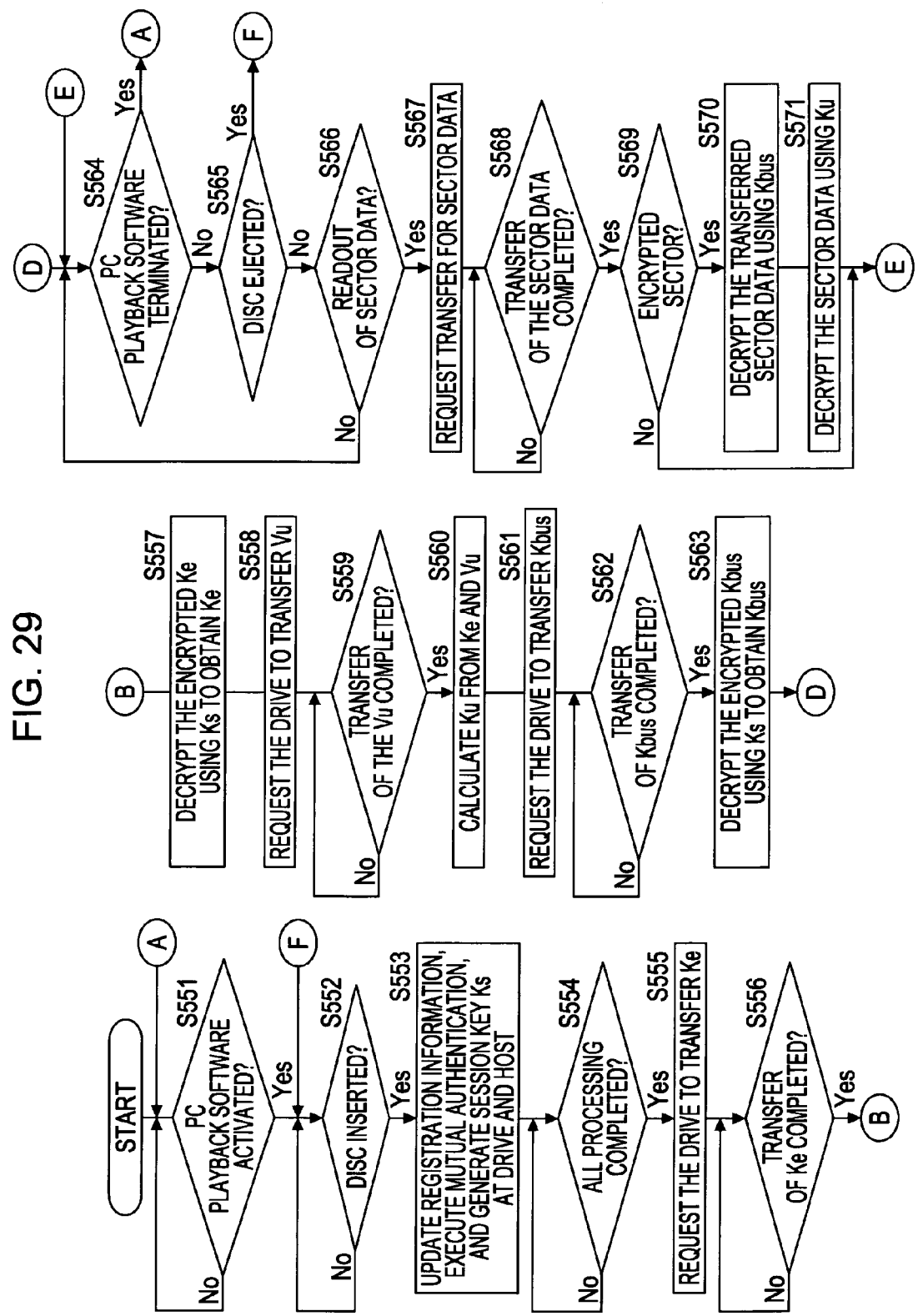
FIG. 29 is a flowchart describing a processing sequence to be executed at a host in playback processing accompanying contents transfer from a drive to a host.

Next, description will be made regarding each processing sequence of the drive and the host in the contents playback processing with reference to FIG. 28 and FIG. 29.

First, description will be made regarding a sequence for controlling output of contents from the drive to the host, with reference to FIG. 28.

Description will be made regarding each step of the flowchart in FIG. 28. First, the drive detects insertion of an information recording medium (disc) to the drive in step S511, and detects activation of the host application for executing the contents playback processing at the host side subjected to bus connection. The flow proceeds to step S513 on condition that those have been detected, where the drive awaits a mutual authentication request from the host side, and upon receiving a mutual authentication request, the drive executes the above-described registration information updating processing, and mutual authentication and key exchange (AKE) processing in accordance with the public key encryption method. Note that the registration information updating processing may be executed prior to receiving a mutual authentication request from the host.

In step S515, upon the drive confirming completion of the mutual authentication and key exchange (AKE) processing, the flow proceeds to step S516, where the drive executes generation processing of a random number R corresponding to the bus key Kb. Let us say that this generated random number R is taken as the bus key Kb. This processing is equivalent to the processing in step S206 in FIG. 24. Note that the bus key Kb is correlated with a sequence number, which prevents the bus key from being substituted secretly.

Upon the drive receiving a transfer request of the bus key from the host side in step S517, the drive transfers the bus key Kb to the host side. This processing is equivalent to the processing in step S207 in FIG. 24. Note that this transfer of the bus key is equivalent to the final step S406 of the mutual authentication and key exchange (AKE) processing in FIG. 25. The drive further generates data EKs [(Kbus∥SEQ), hash (Kbus∥SEQ)] obtained by encrypting combined data

[Kbus||SEQ] of the bus key Kbus and the sequence number SEQ of the bus key, and a hash value [hash (Kbus||SEQ)] calculated as tampering verification data of this combined data using the session key Ks to transmit this to the host side.

Next, the drive confirms that there is no new mutual authentication request in step S519, confirms that the information recording medium is not ejected in step S520, and awaits until the drive receives a contents acquisition request at the host side, i.e., a sector data readout request in step S521.

Note that in the event that there is a new mutual authentication request in step S519, the flow returns to step S514, where the drive executes the mutual authentication and key exchange (AKE) processing, generates a new session key, and transmits the bus key. The bus key to be generated at this time is the bus key of a sequence number 2, which is the same bus key as the previously generated bus key (sequence number 1).

Note that in the event that the drive determines in step S520 that the disc has been ejected from the drive, the flow returns to step S511, where the drive is set to an initial state, and all of the data such as the generated bus key, session key, and so forth is reset, i.e., eliminated.

Upon receiving a sector data readout request from the host side in step S521, the drive reads out output control information from the sector header (user control data) corresponding to sector data to be read out, and determines the value of the bus protection flag BPF. This processing is equivalent to the processing in step S208 in FIG. 24.

With the bus protection flag BPF, as previously described with reference to FIG. 8, the following information can be set.

BPF=1: including output restriction, and bus encryption
BPF=0: including no output restriction In the event that the drive determines that the bus protection flag BPF within the output control information of the sector header (user control data) corresponding to the sector data to be read out is set to "1" in step S522, the flow proceeds to step S523, where the drive encrypts the sector data read out from the information recording medium using the bus key Kbus, and outputs this to the host side in step S524. Note that the encryption processing of the sector data in step S523 is executed as the encryption processing to which the AES-CBC mode is applied as previously described with reference to FIG. 26, for example.

In the event that the drive determines that the bus protection flag BPF within the output control information of the sector header (user control data) corresponding to the sector data to be read out is set to "0" in step S522, the drive skips step S523 without executing encryption processing of the sector data read out from the information recording medium using the bus key Kbus, and outputs the readout contents from the information recording medium as it is to the host side in step S524. Note that this readout contents is a play list or file system information or the like, for example.

Thus, the drive determines whether or not encryption using the bus key is necessary based on regarding whether the bus protection flag BPF within the output control information of the sector header corresponding to the sector data to be read out is "0" or "1", and in the event that encryption using the bus key is necessary, the drive executes encryption of the output contents using the bus key, and outputs this.

Next, description will be made regarding the processing at the host side with reference to FIG. 29. The host activates a playback application program in step S551, and upon receiving notification that the disc has been inserted into the drive in step S552, the host executes the registration information updating processing, the mutual authentication as to the drive, and sharing processing of the session key.

Upon confirming completion of the mutual authentication and key exchange (AKE) processing in step S554, the flow proceeds to step S555, where the host requests the embedded key Ke of the drive. The embedded key Ke is a key generated by the drive performing key generation processing based on the ROM mark Ve obtained from the information recording medium, e.g., key generation processing in accordance with the AES encryption algorithm, and is encrypted using the session key Ks to transmit this to the host.

Upon receiving the encrypted embedded key Ke from the drive in step S556, the host executes decryption applying the session key Ks to obtain the embedded key Ke. Further, the host requests transfer of the unit key generation information Vu which is a recording seed (REC SEED) serving as information necessary for generating a key to be applied to the decryption processing of encrypted contents of the drive in step S558, and upon receiving the unit key generation information Vu in step S559, the host generates a unit key Ku based on the embedded key Ke and the unit key generation information Vu in step S560. This processing is equivalent to the processing in step S303 in FIG. 24.

Next, the host outputs a transmission request of the bus key Kbus to the drive in step S561, and upon obtaining the bus key Kbus encrypted with the session key Ks input via the connection bus, the host executes decryption processing applying the session key Ks to obtain the bus key Kbus in step S563. This processing is equivalent to the processing in step S305 in FIG. 24.

Next, following confirming that the playback software of the PC has not been completed (S564), and the disc has not been ejected (S565), in the event that the host determines that readout of data is performed due to a user instruction or the like (Yes in step S566), the host outputs a transfer request of sector data to the drive in step S567.

In the event that the host receives sector data from the drive (S568), and the data is encrypted data (Yes in step S569), the host executes decryption processing of encrypted contents encrypted by the bus key Kbus in step S570.

The decryption processing of encrypted contents encrypted by the bus key Kbus is executed by the block decryption processing to which the AES-CBC mode is applied for example, as previously described with reference to FIG. 27.

Further, the host executes the decryption processing of encrypted contents by applying the unit key Ku in step S571. This decryption processing is executed as the same processing as previously described with reference to FIG. 11. According to the above processing, the host obtains the decrypted contents, and executes playback of the contents.

With the above description, description has been made centered on the playback processing of data from the information recording medium, but also in the event of recording the data which the host generated or which is obtained externally on the information recording medium via the drive, mutual authentication is executed between the drive and the host. In this case as well, the host executes the above updating of the registration information, i.e., the updating processing of the ADGL information certificate (AIC) and the authorized device group list (ADGL). As for an updating processing pattern, the host executes any of the following three patterns:

(1) Updating processing based on an ADGL sequence number
(2) Updating processing based on AIC data=the number of registered devices
(3) Updating processing based on AIC data=the number of invalid (revoked) devices Description will be made regarding an updating processing sequence based on AIC data=the number of invalid (revoked) devices as an updating processing example of the registration information at the time of executing the data recording processing as to the information recording medium 200 with reference to FIG. 30.

Figure 30:
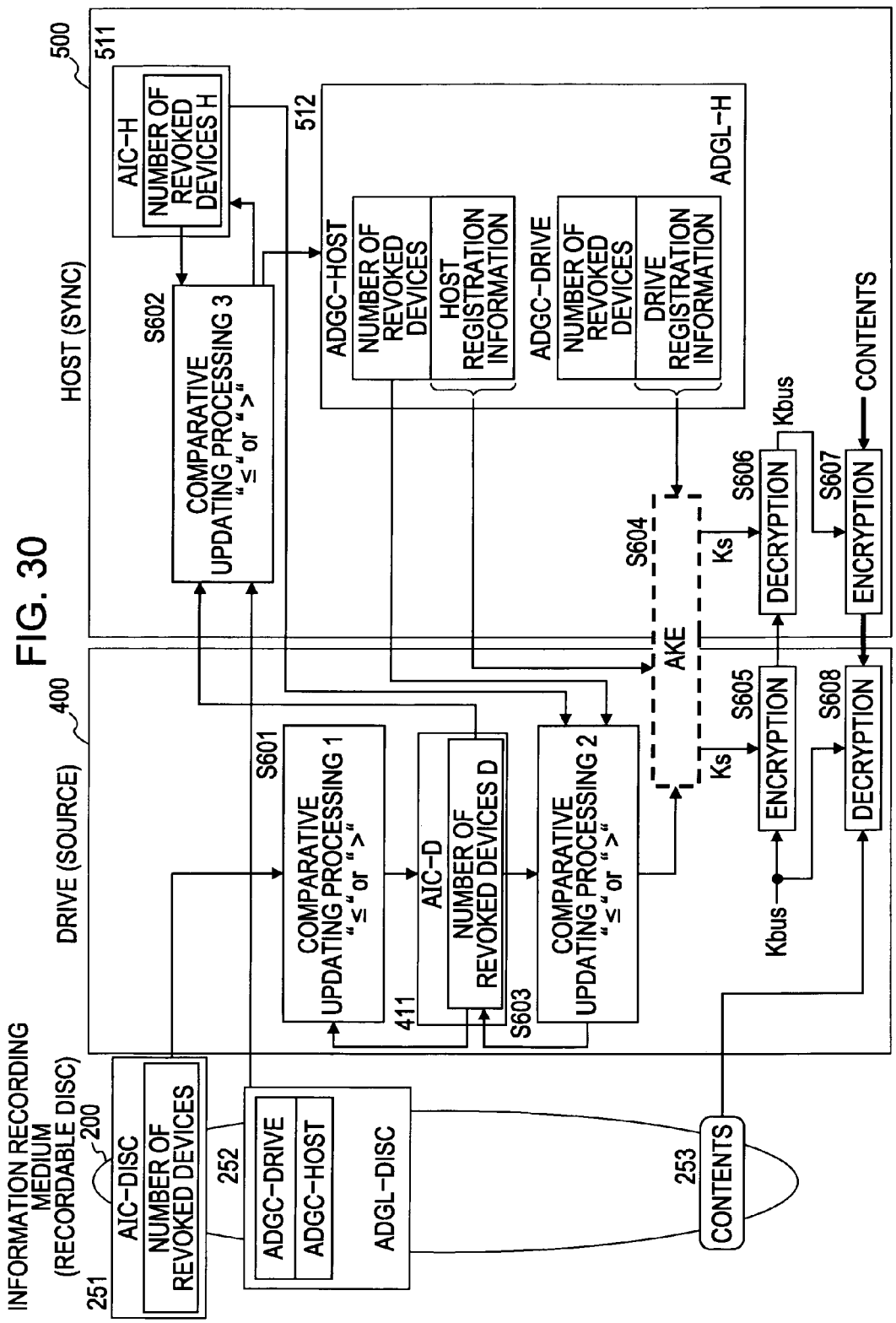
FIG. 30 is a diagram describing updating processing of registration information based on AIC data=the number of revoked devices to be executed in contents recording processing.

FIG. 30 is a diagram describing processing wherein when inputting the contents 253 from the host 500 via the drive 400 to record this in the information recording medium 200, the ADGL information certificate (AIC), and the authorized device group list (ADGL) are updated based on the AIC data (the number of invalid devices), and mutual authentication and key exchange (AKE) between the drive 400 and the host 500 is executed based on the updated information. Let us say that the output source of contents is a source, and the input destination of contents is a sync. In this example, the drive 400 is a source and the host 500 is a sync.

First, the drive 400 reads out the ADGL information certificate (AIC-DISC) 251 stored in the information recording medium 200 in which data can be written in step S601, and compares AIC data thereof (number of invalid devices) with the AIC data (the number of invalid devices) of the ADGL information certificate (AIC-D) 411 stored in the memory of itself. In the event that AIC data of AIC-D<AIC data of AIC-DISC holds, the drive 400 determines that the AIC-DISC is newer than the AIC-D, and in this case, performs updating processing wherein the ADGL information certificate (AIC-D) 411 stored in the memory of itself is substituted with the ADGL information certificate (AIC-DISC) 251 read from the information recording medium 200.

Note that with the comparative updating processing in step S601, the drive 400 first verifies the signature appended to the ADGL information certificate (AIC-DISC) 251 read from the information recording medium 200, and confirms that the ADGL information certificate (AIC-DISC) is an authorized certificate without being tampered. Following this confirmation, the drive 400 performs comparison and updating.

Step S602 is comparative updating processing to be executed at the host 500. The host 500 inputs the ADGL information certificate (AIC-D) 411 stored in the memory of the drive 400 from the drive 400, and confirms that the certificate is a certificate without tampering using verification of signature thereof, following which executes AIC data (number of invalid devices) comparative processing with the ADGL information certificate (AIC-H) 511 stored in the memory of the host 500. In the event that AIC data of AIC-H<AIC data of AIC-D holds, the host 500 determines that the AIC-D is newer than the AIC-H, and in this case, performs updating processing wherein the ADGL information certificate (AIC-H) 511 stored in the memory of itself is substituted with the ADGL information certificate (AIC-D) 411 input from the drive 400.

Note that in the event that

AIC data of AIC-H<AIC data of AIC-D holds, the host executes updating processing regarding the authorized device group list (ADGL-H) which the host stores in the memory as well. The host 500 executes this updating processing as processing such as substituting the authorized device group list (ADGL-H) with the authorized device group list (ADGL-DISC) stored in the information recording medium 200, or updating the authorized device group list (ADGL-H) by obtaining the latest authorized device group list (ADGL) via a network.

The drive 400 inputs the ADGL information certificate (AIC-H) 511 held in the memory of the host 500 in step S603, and compares the AIC data (number of invalid devices) of the ADGL information certificate (AIC-D) 411 stored in the memory of itself with that of the ADGL information certificate (AIC-H) 511. In the event that AIC data of AIC-D<AIC data of AIC-H holds, the drive 400 determines that the AIC-H is newer than the AIC-D, and in this case, performs updating processing wherein the ADGL information certificate (AIC-D) 411 stored in the memory of itself is substituted with the ADGL information certificate (AIC-H) 511 input from the drive 500.

Note that even with the comparative updating processing in step S603, the drive 400 verifies the signature appended to the ADGL information certificate (AIC-H) 511 input from the host 500, and confirms that the certificate is an authorized certificate which has not been tampered. Following this confirmation, the drive 400 performs comparison and updating.

With the comparative updating processing in step S603, the drive 400 obtains the authorized device group certificate (ADGC-H) storing the registration information of the host included in the authorized device group list (ADGL-H) 512 stored in the memory of the host 500, and following verification of signature thereof, compares the AIC data (number of invalid devices) set in the authorized group certificate (ADGC-H) with the AIC data (number of invalid devices) of the ADGL information certificate (AIC-D) 411 stored in the memory of itself. In the event that AIC data of AIC-H<AIC data of AIC-D holds, the drive determines that the host holds only the authorized device group certificate of an old version not corresponding to the AIC data of the AIC-D, and cancels the processing without proceeding to the mutual authentication processing (AKE).

In the event that the drive 400 determines in step S603 that

AIC data of ADGC-H>AIC data of AIC-D holds, the flow proceeds to the next step S604.

The processing in steps S604 through S608 is as follows.

S604: the mutual authentication and key exchange (AKE) processing between the drive 400 and the host 500

S605: encryption of the bus key Kbus generated at the drive 400 side using the session key Ks and transmission thereof S606: acquisition of the bus key Kbus by the decryption processing using the session key Ks in the host 500

S607: encryption transmission processing of contents using the bus key Kbus in the host 500

S608: decryption processing and recording processing of contents using the bus key Kbus in the host 400

The example illustrated in FIG. 30 is updating processing in the case that the AIC data is the number of invalid (revoked) devices, but updating processing based on ADGL sequence numbers, and updating processing based on AIC data=the number of registered devices are executed generally as the same processing as updating of the registration information at the time of playback of contents previously described.

Figure 31:
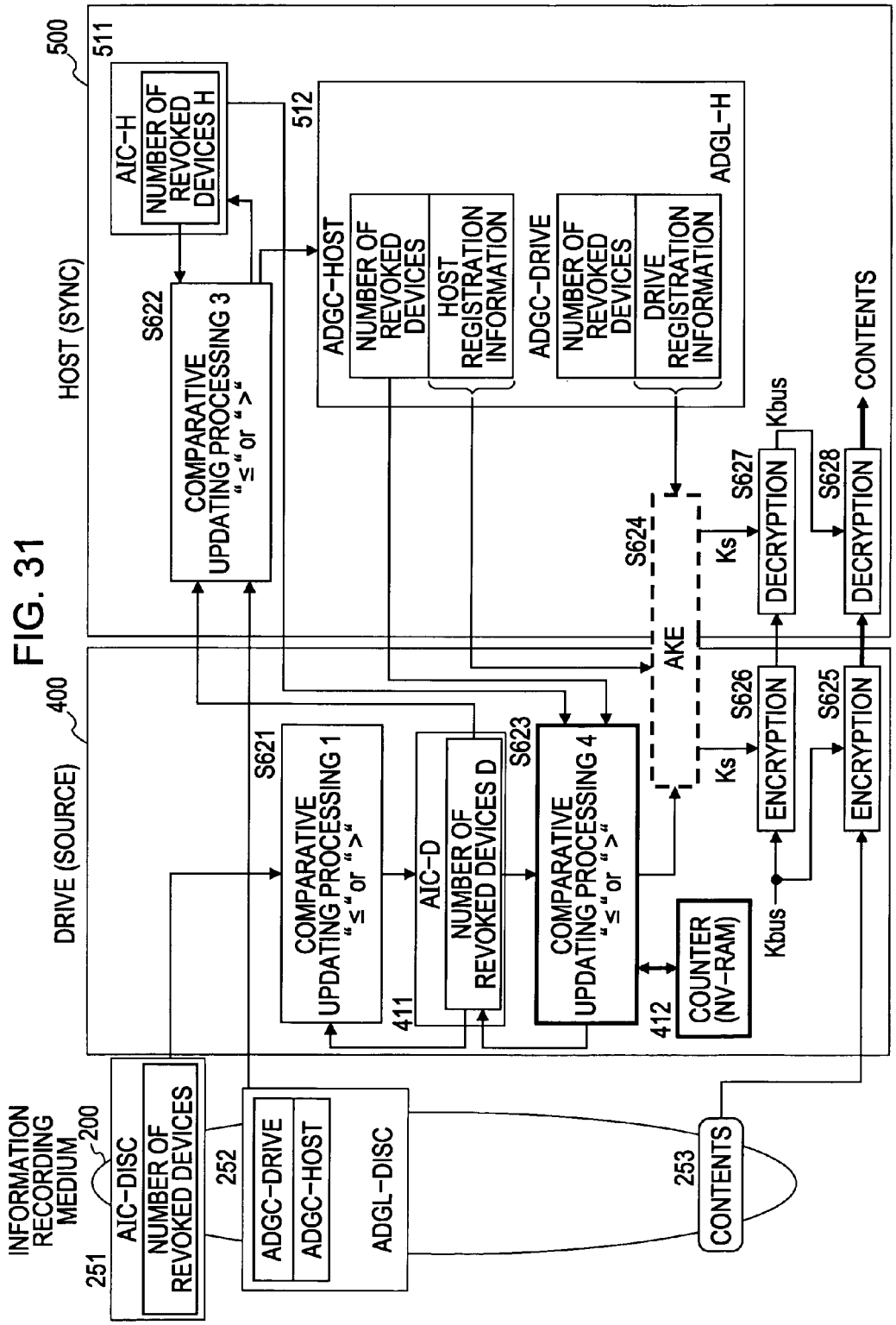
FIG. 31 is a diagram describing updating processing of registration information based on AIC data=the number of revoked devices in the case of allowing re-obtaining of an ADGL in a host.

With the above respective processing examples, an arrangement has been described wherein with comparison between the AIC data set in the authorized device group certificate (ADGC-H) to be input from the host side, and the AIC data of the ADGL information certificate (AIC-D) held by the drive, in the event that the authorized device group certificate (ADGC-H) to be input from the host side is older than the ADGL information certificate (AIC-D) held by the drive, the processing is cancelled without making the transition to the mutual authentication processing, but a configuration example will be described with reference to FIG. 31 and FIG. 32 wherein in such a case, an opportunity for obtaining a new authorized device group certificate (ADGC-H) is given to the host side, the drive repeatedly performs new/old comparison regarding the new authorized device group certificate (ADGC-H) obtained by the host a predetermined number of times.

FIG. 31 illustrates an updating processing sequence based on AIC data=the number of invalid (revoked) devices as an updating processing example of the registration information at the time of executing the playback processing of data from the information recording medium 200.

First, the drive 400 reads out the ADGL information certificate (AIC-DISC) 251 stored in the information recording medium 200 in step S621, verifies the signature thereof, confirms that the ADGL information certificate (AIC-DISC) is an authorized certificate without being tampered, following which compares AIC data thereof (number of invalid devices) with the AIC data (the number of invalid devices) of the ADGL information certificate (AIC-D) 411 stored in the memory of itself. In the event that AIC data of AIC-D<AIC data of AIC-DISC holds, the drive 400 determines that the AIC-DISC is newer than the AIC-D, and in this case, performs updating processing wherein the ADGL information certificate (AIC-D) 411 stored in the memory of itself is substituted with the ADGL information certificate (AIC-DISC) 251 read from the information recording medium 200.

Next, the host 500 inputs the ADGL information certificate (AIC-D) 411 stored in the memory of the drive 400 from the drive 400, and confirms that the certificate is a certificate without tampering using verification of signature thereof, following which executes AIC data (number of invalid devices) comparative processing with the ADGL information certificate (AIC-H) 511 stored in the memory of the host 500. In the event that AIC data of AIC-H<AIC data of AIC-D holds, the host 500 determines that the AIC-D is newer than the AIC-H, and in this case, performs updating processing wherein the ADGL information certificate (AIC-H) 511 stored in the memory of itself is substituted with the ADGL information certificate (AIC-D) 411 input from the drive 400.

Note that in the event that

AIC data of AIC-H<AIC data of AIC-D holds, the host executes updating processing regarding the authorized device group list (ADGL-H) which the host stores in the memory as well. The host 500 executes this updating processing as processing such as substituting the authorized device group list (ADGL-H) with the authorized device group list (ADGL-DISC) stored in the information recording medium 200, or updating the authorized device group list (ADGL-H) by obtaining the latest authorized device group list (ADGL) via a network.

The drive 400 inputs the ADGL information certificate (AIC-H) 511 held in the memory of the host 500 in step S623, and compares the AIC data (number of invalid devices) of the ADGL information certificate (AIC-D) 411 stored in the memory of itself with that of the ADGL information certificate (AIC-H) 511. In the event that AIC data of AIC-D<AIC data of AIC-H holds, the drive 400 determines that the AIC-H is newer than the AIC-D, and in this case, performs updating processing wherein the ADGL information certificate (AIC-D) 411 stored in the memory of itself is substituted with the ADGL information certificate (AIC-H) 511 input from the drive 500.

With the comparative updating processing in step S623, the drive 400 further obtains the authorized device group certificate (ADGC-H) storing the registration information of the host included in the authorized device group list (ADGL-H) 512 stored in the memory of the host 500, and following verification of signature thereof, compares the AIC data (number of invalid devices) set in the authorized group certificate (ADGC-H) with the AIC data (number of invalid devices) of the ADGL information certificate (AIC-D) 411 stored in the memory of itself. With this comparison, in the event that AIC data of AIC-H<AIC data of AIC-D holds, the drive determines that the host possesses only the authorized device group certificate of an old version not corresponding to the AIC data of the AIC-D, requests acquisition and transmission of a new authorized device group certificate (ADGC-H) of the host, and also counts up the value of a counter 412 by one. With this reacquisition request of the authorized device group certificate (ADGC-H), the maximum repeated number of times is set, for example, in the event of the maximum repeated number of times=5, the drive performs a reacquisition request until the value of the counter 412 becomes 5. In the event that the authorized device group certificate (ADGC-H) input from the host within this allowable number of times satisfies AIC data of ADGC-H≧AIC data of AIC-D, the flow proceeds to the subsequent processing, i.e., the mutual authentication processing (AKE). In the event that all of the certificates obtained in the reacquisition processing within the allowable number of times exhibit AIC data of AIC-H<AIC data of AIC-D, the processing is cancelled without proceeding to the mutual authentication processing (AKE).

In the event that the authorized device group certificate (ADGC-H) input from the host within this allowable number of times (e.g., five times) satisfies AIC data of ADGC-H≧AIC data of AIC-D, the processing of steps S624 through S628, i.e., the mutual authentication and key exchange (AKE) processing between the drive 400 and the host 500, transmission of the bus key and contents of the drive 400, and decryption of contents of the host 500 are executed.

Description will be made with reference to FIG. 32 regarding the details of the processing in step S623 in FIG. 31 which the drive 400 executes, i.e., processing for prompting the host side to perform reacquisition of an authorized device group list (ADGL-H) including the authorized device group certificate (ADGC-H).

The drive 400 receives a transfer request of the ADGL information certificate (AIC-H) from the host in step S701, following which receives the ADGL information certificate (AIC-H) in step S702 from the host. In step S703, the drive 400 executes signature verification of the ADGL information certificate (AIC-H), and in the event that validity of the certificate has not been confirmed with signature verification (No in step S704), the drive 400 cancels the subsequent processing. In this case, contents transfer processing is not executed.

In the event of confirming validity of the certificate using signature verification (Yes in step S704), the drive 400 executes comparison between the AIC data (number of invalid devices) of the ADGL information certificate (AIC-H) obtained from the host and the AIC data (number of invalid devices) of the ADGL information certificate (AIC-D) stored in the memory of itself in step S705. In the event that AIC data of AIC-D<AIC data of AIC-H holds, the drive 400 determines that the AIC-H is newer than the AIC-D, the flow proceeds to step S706, where the drive 400 performs updating processing wherein the ADGL information certificate (AIC-D) stored in the memory of itself is substituted with the ADGL information certificate (AIC-H) obtained from the host. In the event that the above condition, AIC data of AIC-D<AIC data of AIC-H is not satisfied, the drive 400 determines that the ADGL information certificate (AIC-D) stored in the memory of itself is newer than the ADGL information certificate (AIC-H) obtained from the host, and performs no updating processing.

Next, the drive 400 confirms reception of the authorized device group certificate (ADGC-H) from the host in step S707, following which executes comparison between the AIC data (number of invalid devices) set in the authorized device group certificate (ADGC-H) and the AIC data (number of invalid devices) of the ADGL information certificate (AIC-D) stored in the memory of itself in step S708.

In the event that

AIC data of AIC-H<AIC data of AIC-D does not hold, the drive 400 determines that the authorized device group certificate (ADGC-H) from the host is the authorized device group certificate of a new version corresponding to the AIC data of the AIC-D, executes reset processing for setting the counter to zero in step S711, terminates the comparative updating processing, and makes the transition to the next processing, i.e., the mutual authentication processing.

On the other hand, in the event that

AIC data of AIC-H<AIC data of AIC-D holds, the drive determines that the host possesses only the authorized device group certificate of an old version not corresponding to the AIC data of the AIC-D, the flow proceeds to step S709, where the drive determines whether or not the counter is equal to or smaller than the allowable reacquisition number of times.

In the event that the counter is equal to or smaller than the allowable reacquisition number of times, the drive counts up the counter by one in step S710, requests transmission of the authorized device group certificate (ADGC-H) of the host again, and repeatedly executes step S707 and the subsequent steps.

In the event that the counter has reached the allowable reacquisition number of times in step S709, the processing is cancelled without proceeding to the mutual authentication processing (AKE).

Upon following the present processing example, the host is given an opportunity for updating the authorized device group list (ADGL-H) possessed by itself, thereby enabling the authorized device group list (ADGL) to be obtained externally to perform playback and recording of contents.

Note that the processing described with reference to FIG. 31 is updating processing in the event that the AIC data is the number of invalid (revoked) devices, but updating processing based on ADGL sequence numbers, and updating processing based on the AIC data=the number of registered devices are also executable as processing permitting reacquisition processing.

[4. Counting of the Number of Times of Authentication, and Certificate Updating Processing]

As can be understood from the descriptions of the above multiple embodiments, in order that the host accesses the information recording medium via the drive, it is necessary that the host outputs the authorized device group certificate to the drive, the drive executes comparison between the AIC data set in the authorized device group certificate to be input from the host and the AIC data of the ADGL information certificate (AIC-D) which the drive possesses, executes mutual authentication on condition that the AIC data of the authorized device group certificate (ADGC-H) input from the host is not older than the ADGL information certificate (AIC-D) which the drive possesses, and this authentication is established.

Accordingly, the host is requested to perform processing for obtaining a newer authorized device group certificate. Examples of an obtaining processing method of a newer authorized device group certificate include a method for purchasing a disc to be newly released and obtaining from the disc, and a method wherein the host connects to a server for managing and distributing an authorized device group certificate, and obtains an authorized device group certificate via the server.

Updating using a disc causes a problem wherein it is necessary for a user to purchase a new disc storing a new authorized device group certificate. Also, in the event that the drive is a detachable device as to a device serving as the host such as a PC or the like, the drive is connected to various types of host (PC). The drive can obtain newer AIC data from the mounted information recording medium, and when obtaining new AIC data from the information recording medium, the host (PC) connected to the drive can also obtain and store the authorized device group certificate corresponding to new version thereof. Subsequently, however, upon the drive connecting to another host (PC), mounting a different disc, and attempting to perform authentication between the host and the drive, the AIC data of the authorized device group certificate possessed by the host (PC) connected at that time is older than the AIC data of the drive, and accordingly, the host is not allowed to use the disc.

Thus, it is always necessary for a user utilizing the host to consider updating of the authorized device group certificate stored in the host, which provides a problem. It is necessary for a user possessing multiple host devices, e.g., PCs to carefully execute updating of the authorized device group certificate in the multiple PCs.

Description will be made below regarding a configuration example wherein updating of the certificate in the host is executed in a sure manner while reducing the burden on the user.

Description will be made regarding the present embodiment with reference to FIG. 33. The overview of the present embodiments is summarized as follows.

(1) The host (e.g., PC) counts the number of times of mutual authentication with the drive, and upon the count value reaching a certain number of times, performs network connection to update the registration list. In some cases, updating of the registration list is performed from the drive.

(2) In the event that the count value of the host of mutual authentication as to the drive reaches the upper limit number of times, the host does not perform mutual authentication as to the drive, notifies a user that it is necessary to perform updating processing of the registration list. Alternatively, the host automatically makes the transition to updating processing of the registration list.

As described above, the updating procedures of an authorized device group certificate are specific, thereby enabling a licensee to be forced to obey the procedures as a compliance rule to be obeyed at the host side by a contract along with mutual authentication license.

Figure 33:
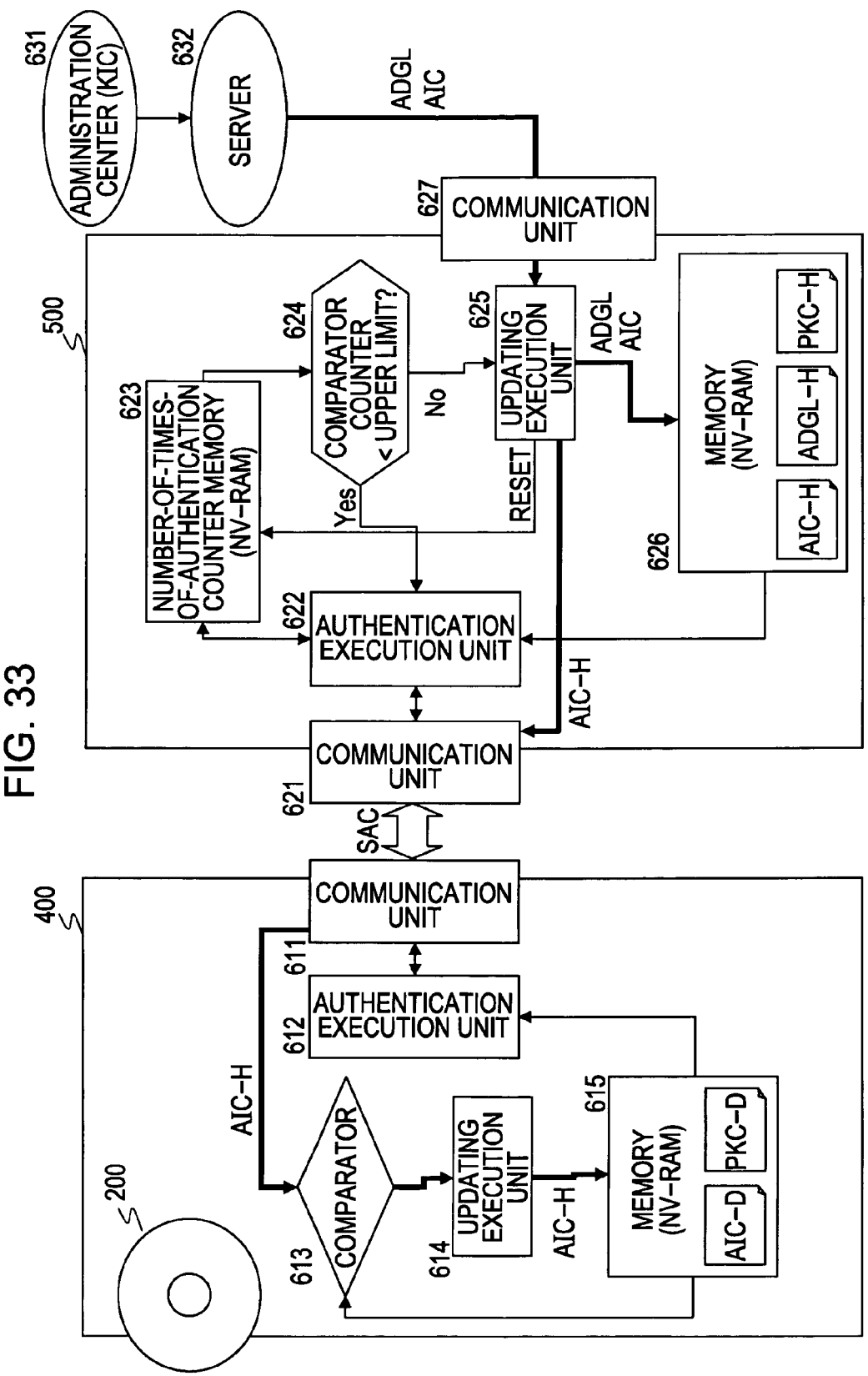
FIG. 33 is a diagram describing count processing of the number of times of authentication in a host, and processing for obtaining an ADGL based on a counter value.

FIG. 33 illustrates a drive 400 capable of mounting an information recording medium 200, and a host 500 such as a PC or the like for executing access to the information recording medium via the drive 400. The host 500 can connect to an external server 632 via a communication unit 627. The server 632 obtains and controls the authorized device group list (ADGL) storing the latest authorized device group certificate (ADGC) and the ADGL information certificate (AIC) via an administration center 631, and executes processing for distributing these respective certificates via a network.

Description will be made regarding the overview of the present embodiment with reference to FIG. 33. Description will be made at the subsequent stage regarding the detailed processing sequence with reference to FIG. 34 through FIG. 36. The host 500 executes mutual authentication processing as necessary when accessing the information recording medium 200 via the drive 400. The host 500 executes the authentication processing between the authentication execution unit 622 of the host 500 and the authentication execution unit 612 of the drive 400 via mutual communication units 611 and 612. With the authentication processing, as previously described with reference to the sequence chart in FIG. 25, the public key certificates (PKCs) stored in mutual memory 615 and 626 are employed.

The host 500 includes number-of-times-of-authentication counter memory 623 made up of nonvolatile memory (NV-RAM). The number-of-times-of-authentication counter memory 523 is memory for recording the number of times of authentication which is counted up based on completion of execution of the authentication processing as to the drive. Note that the initial value of the number-of-times-of-authentication counter memory 623 is zero.

With the host 500, when starting the authentication processing as to the drive 400, a comparator 624 reads out the count value of number of times of authentication stored in the number-of-times-of-authentication counter memory 623, and executes comparison with a predetermined upper limit value.

In the event that the count value of number of times of authentication stored in the number-of-times-of-authentication counter memory 623 is less than the upper limit value, the host 500 executes the authentication processing as to the drive 400. In the event that the count value of number of times of authentication stored in the number-of-times-of-authentication counter memory 623 has reached the upper limit value, the host 500 cancels execution of the authentication processing as to the drive 400. In this case, the host 500 executes processing for notifying a user that the count value of number of times of authentication has reached the upper limit value via a display or the like.

In the event that the count value of number of times of authentication has reached the upper limit value, the host 500 executes obtaining and updating processing of a certificate from the server 632 based on the user's instructions. Note that an arrangement may be made wherein obtaining and updating processing of a certificate from the server 632 are automatically executed on condition that the count value of number of times of authentication has reached the upper limit value.

The updating execution unit 625 of the host 500 accesses the server 632, obtains the authorized device group list (ADGL) storing the authorized device group certificate (ADGC), and the ADGL information certificate (AIC) from the server 632, and stores these in the memory (NV-RAM) 626.

Upon the updating execution unit 625 of the host 500 storing the latest authorized device group list (ADGL) and the ADGL information certificate (AIC) in the memory (NV-RAM) 626, the count value of the number-of-times-of-authentication counter memory 623 is reset to zero.

Subsequently, the authentication execution unit 622 executes the authentication processing as to the drive 400, and access to the information recording medium 200 is allowed on condition that the authentication is established.

Further, the host 500 outputs the ADGL information certificate (AIC) which the host 500 obtained from the server 632 via the interface between the host 500 and the drive 400 by the authentication processing to the drive 400. The drive 400 obtains the latest ADGL information certificate (AIC-H) via the communication unit 611. At this point in time, this certificate is the ADGL information certificate possessed by the host 500, so is represented with the AIC-H.

With the drive 400, the comparator 613 executes new/old comparison between the ADGL information certificate (AIC-H) obtained from the host 500, and the ADGL information certificate (AIC-D) stored in the memory 615 of the drive 400, and in the event that the comparator 613 determines that the ADGL information certificate (AIC-H) obtained from the host 500 is newer, the updating execution unit 614 executes updating processing for substituting the stored data in the memory 615 with the ADGL information certificate (AIC-H) obtained from the host 500. Note that the comparator 613 executes the comparison based on the number of registered devices recorded in each certificate, or the number of invalid devices, or the sequence numbers, or the like.

The host 500 also stores the latest certificate obtained from the server 632 in the drive 400, whereby both of the host and the drive can update to the latest certificate. With the present embodiment, an arrangement is made wherein an upper limit is set to the number of times of authentication processing as to the drive which the host executes, reaching the limit notifies a user that it is necessary to perform updating of a certificate, or executes updating processing, whereby appropriate certificate updating processing can be realized without controlling updating timing by a user while reducing the burden on the user.

Next, description will be made with reference to FIG. 34 through FIG. 36 regarding a series of processing involved in the authentication processing as to the drive, which the host connecting to the drive executes, obtaining and updating processing of a certificate from the server.

Figure 34:
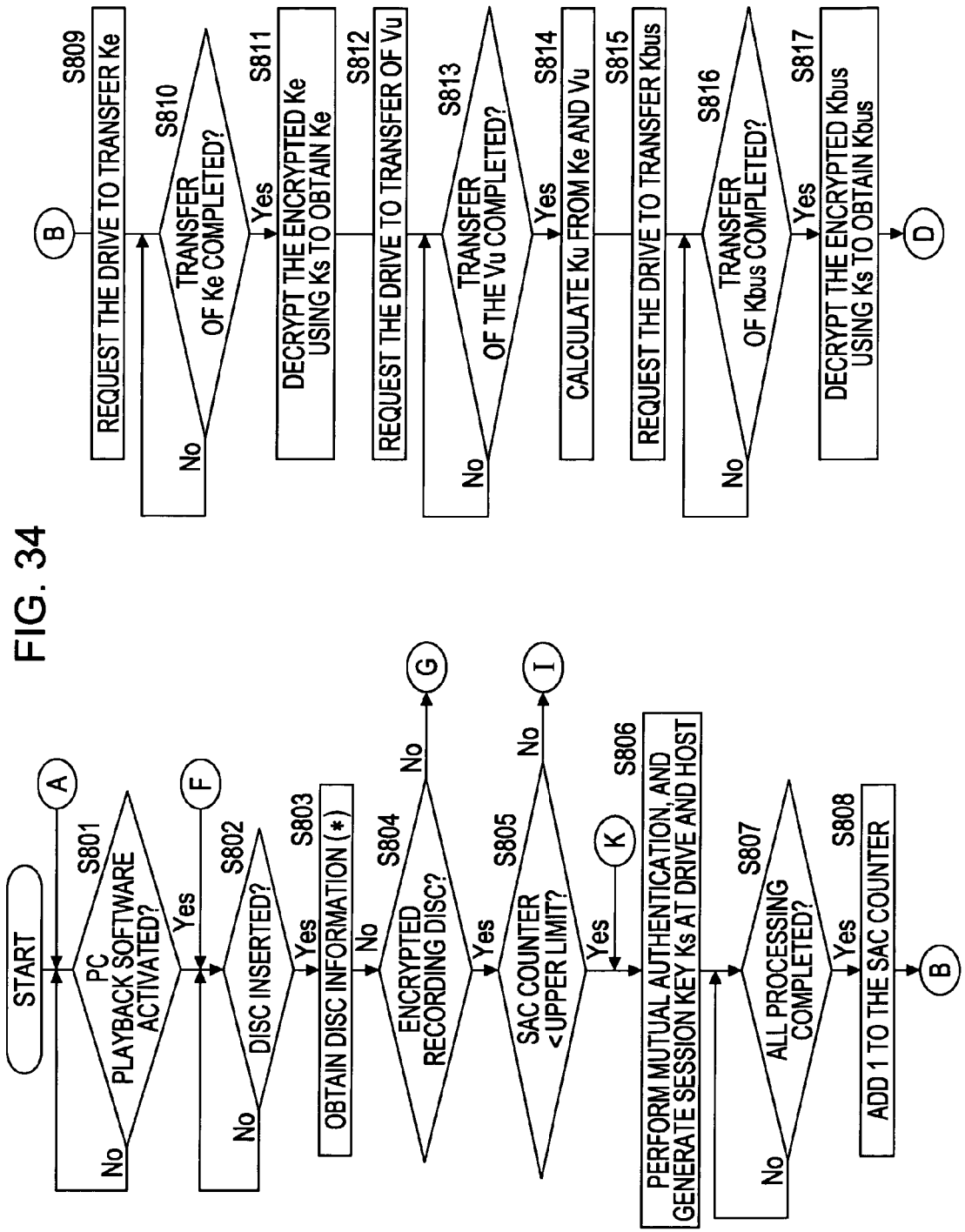
FIG. 34 is a flowchart describing count processing of the number of times of authentication in a host, and processing for obtaining an ADGL based on a counter value.

In step S801 in FIG. 34, the host activates a playback application program corresponding to contents stored in a disc. Upon the host receiving a detection notification of insertion of a disc from the drive in step S802, the host obtains disc information thereof from the drive. For example, the host can confirm whether or not the inserted disc is a disc subjected to encryption recording by utilizing data to be obtained by issuing "READ DVD STRUCTURE command" to the drive. This command is described in the command standard INCITS T10, Multimedia Commands-4 (MMC-4) in the SCSI (Small Computer System Interface) standard. As for another determination method, an arrangement may be made wherein determination is made from directory information to be obtained by interpreting a file system to be applied to disc recording.

In step S804, the host determines whether or not the disc set in the drive is a recording disc of encrypted data based on the disc information obtained in step S803. In the event that the disc set in the drive is not an encrypted disc, the flow proceeds to step G in FIG. 35, the host executes ordinary data playback processing, i.e., in step S829, following confirming that the disc is not ejected (S830), in the event that determination is made that readout of sector data is performed by user's instructions or the like (Yes in step S831), the host outputs a transfer request of sector data to the drive in step S832, and performs playback of data until determination is made in step S833 that sector data is completed.

Now returning to FIG. 34, in step S804, in the event that determination is made that the disc set in the drive is an encrypted disc, the host determines whether or not the count value of the number-of-times-of-authentication counter (SAC counter) has reached a predetermined upper limit value in step S805. This processing is equivalent to the processing at the comparator 624 of the number-of-times-of-authentication counter memory 623 in FIG. 33. Note that the initial value of the number-of-times-of-authentication counter memory 623 of the host is zero.

Figure 36:
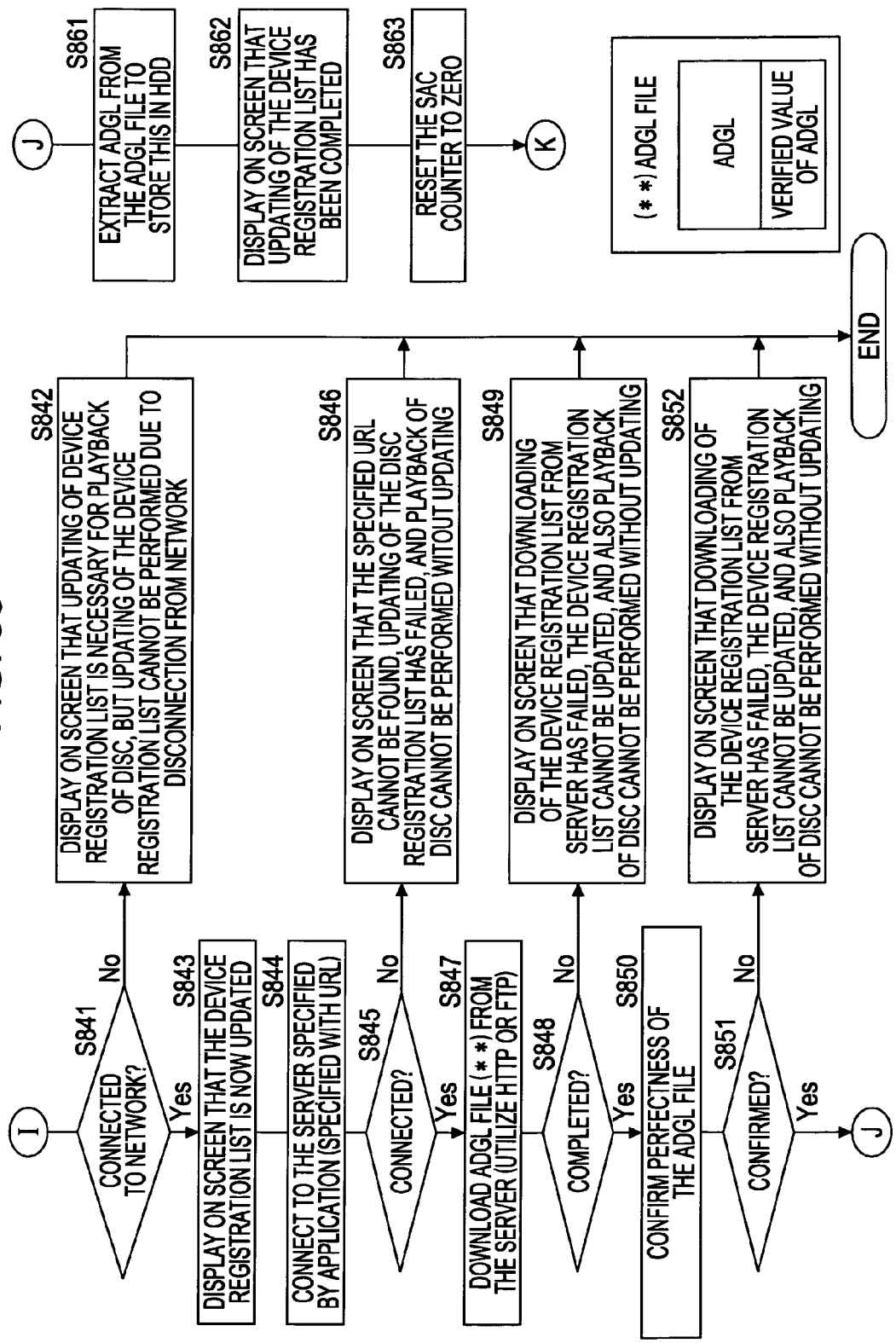
FIG. 36 is a flowchart describing count processing of the number of times of authentication in a host, and processing for obtaining an ADGL based on a counter value.

In the event that the count value of the number-of-times-of-authentication counter (SAC counter) has reached a predetermined upper limit value in step S805, the flow proceeds to step I in FIG. 36. This processing is equivalent to processing for obtaining an updated certificate from the server.

In step S841, determination is made as to whether or not the host is connected to a network, and in the event that the host is not connected to a network, it is necessary to update the device registration list to play back the disc, but the host displays on the screen that the device registration list cannot be updated because the host is not connected to a network, and terminates the processing. The user knows that it is necessary to obtain the authorized device group list (ADGL) storing the updated authorized device group certificate (ADGC) to play back the disc mounted on the drive based on the screen display.

Upon determining that the host is connected to a network in step S841, the flow proceeds to step S843, where the host displays on the screen that the updating processing of the authorized device group list (ADGL) storing the authorized device group certificate (ADGC) is now being updated, and connects to the server specified by the application running in the host in step S844. The URL of the server to be connected at the time of updating the authorized device group list (ADGL) is recorded in the application (contents playback application) running in the host, and the host connects to the server using this URL.

Completion of connecting to the server is confirmed in step S845, and in the event that the connection has failed, the flow proceeds to step S846, where the host displays on the screen that updating of the device registration list has failed, and the disc cannot be played back unless the device registration list is updated, and terminates the processing.

In the event that the connection has failed, the flow proceeds to step S847, where the host downloads the authorized device group list (ADGL) storing the latest authorized device group certificate (ADGC) from the connection server. For example, the host executes download processing based on the HTTP or FTP. With the authorized device group list (ADGL), as illustrated in a lower right portion of FIG. 36, tampering verification values (electronic signature, MAC, and so forth) are appended thereto, which makes up a tampering prevention configuration. Note that with the present processing flow, a download processing example of only the authorized device group list (ADGL) is illustrated, but it is desirable to employ an arrangement wherein downloading of the ADGL information certificate (AIC) is also performed as described above.

The host confirms completion of downloading in step S848. In the event that downloading cannot be completed, the flow proceeds to step S849, where the host displays on the screen that downloading of the device registration list from the server has failed, the device registration list cannot be updated, and the disc cannot be played back unless the device registration list is updated, and terminates the processing.

Upon confirming completion of the downloading in step S848, the host executes verification processing based on the verification values appended to the ADGL file to confirm that there is no tampering. In the event that the confirmation processing is completed, and it cannot be confirmed that there is no tampering, the flow proceeds to step S852, where the host displays on the screen that downloading of the device registration list from the server has failed, the device registration list cannot be updated, and the disc cannot be played back unless the device registration list is updated, and terminates the processing.

In the event that confirmation is made that there is no tampering, the flow proceeds to step S861, where the host obtains the authorized device group list (ADGL) from the downloaded ADGL file, and displays on the screen a notification of completion of the authorized device group list (ADGL). Further, the host executes processing for resetting the count value of the number-of-times-of-authentication counter (SAC counter) to zero in step S863. Note that as described with reference to FIG. 33, as described above, in the event of also performing the downloading processing of the ADGL information certificate (AIC) in step S847, the host executes confirmation of completeness using the signature verification of the ADGL information certificate (AIC) in step S850, and storing of the ADGL information certificate (AIC) in step S861, and at this time, the host may execute output processing as to the drive via the interface.

Next, returning to FIG. 34, step S806 and the subsequent steps will be described. In step S806, the host executes mutual authentication as to the drive, and sharing processing of a session key.

Upon confirming completion of the mutual authentication and key exchange (AKE) processing in step S807, the host counts up the count value of the number-of-times-of-authentication counter (SAC counter) memory by one. Next, the flow proceeds to step S809, where the host requests the embedded key Ke of the drive. The embedded key Ke is a key generated by the drive performing key generation processing based on the ROM mark Ve obtained from the information recording medium, e.g., key generation processing in accordance with the AES encryption algorithm, and is encrypted using the session key Ks to transmit this to the host.

Upon receiving the encrypted embedded key Ke from the drive in step S810, the host executes decryption applying the session key Ks to obtain the embedded key Ke. Further, the host requests transfer of the unit key generation information Vu which is a recording seed (REC SEED) serving as information necessary for generating a key to be applied to the decryption processing of encrypted contents of the drive in step S812, and upon receiving the unit key generation information Vu in step S813, the host generates a unit key Ku based on the embedded key Ke and the unit key generation information Vu in step S814. This processing is equivalent to the processing in step S303 in FIG. 24, for example.

Next, the host outputs a transmission request of the bus key Kbus to the drive in step S815, and upon obtaining the bus key Kbus encrypted with the session key Ks input via the connection bus in step S816, the host executes decryption processing applying the session key Ks to obtain the bus key Kbus in step S817. This processing is equivalent to the processing in step S305 in FIG. 24, for example.

Figure 35:
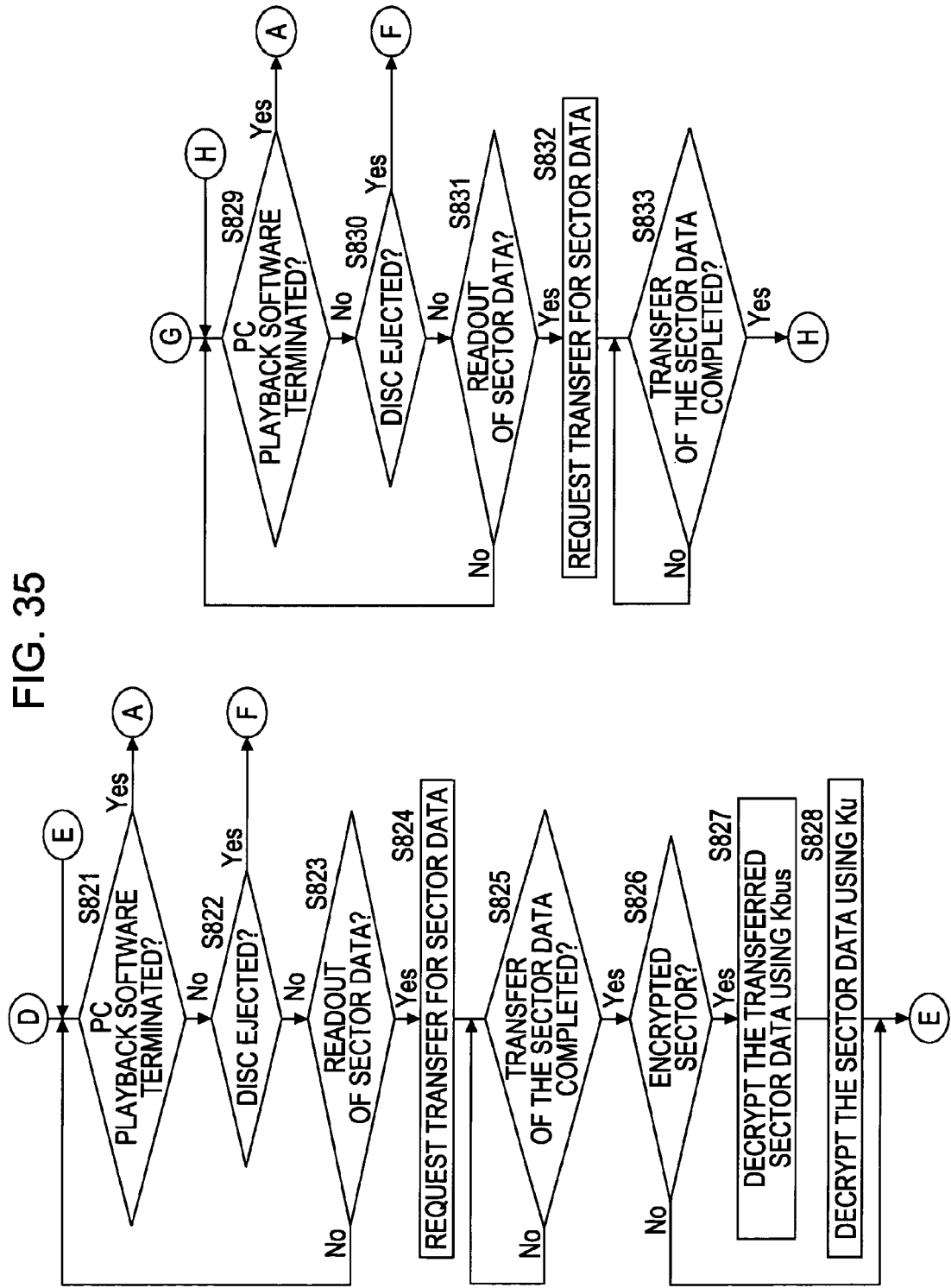
FIG. 35 is a flowchart describing count processing of the number of times of authentication in a host, and processing for obtaining an ADGL based on a counter value.

Next, the flow proceeds to step S821 in FIG. 35. Following confirming that the playback software of the PC has not been completed (S821), and the disc has not been ejected (S822), in the event that the host determines that readout of sector data is performed due to a user instruction or the like (Yes in step S823), the host outputs a transfer request of sector data to the drive in step S824.

In the event that the host receives sector data from the drive (S825), and the data is encrypted data (Yes in step S826), the host executes decryption processing of encrypted contents encrypted by the bus key Kbus in step S827.

The decryption processing of encrypted contents encrypted by the bus key Kbus is executed by the block decryption processing to which the AES-CBC mode is applied for example, as previously described with reference to FIG. 27.

Further, the host executes the decryption processing of encrypted contents by applying the unit key Ku in step S828. This decryption processing is executed as the same processing as previously described with reference to FIG. 11. According to the above processing, the host obtains the decrypted contents, and executes playback of the contents.

With the above description, description has been made centered on the playback processing of data from the information recording medium, but in the event of recording the data which the host generated or which is obtained externally on the information recording medium via the drive as well, mutual authentication is executed between the drive and the host. In this case as well, the host executes increment processing of the above count value of mutual authentication, comparison processing as to the upper limit value, updating of a certificate from the server in the event of the count value of mutual authentication reaching the upper limit value, i.e., updating processing of the ADGL information certificate (AIC) and the authorized device group list (ADGL). As for an updating processing pattern, the host executes any of the following three patterns:

(1) Updating processing based on an ADGL sequence number
(2) Updating processing based on AIC data=the number of registered devices
(3) Updating processing based on AIC data=the number of invalid (revoked) devices

[5. Configuration of Information Processing Device]

Figure 37:
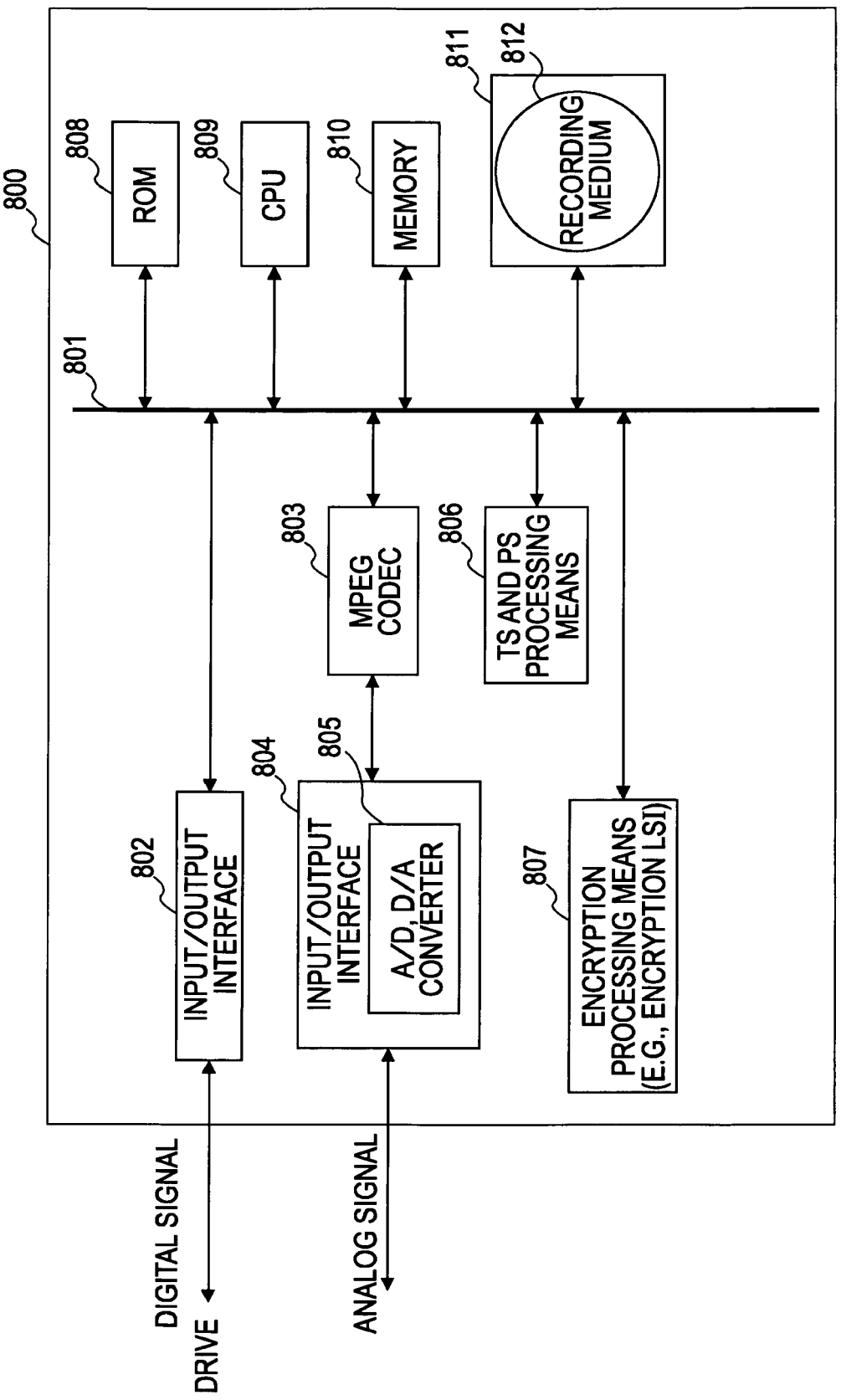
FIG. 37 is a diagram illustrating a configuration example of an information processing device serving as a host of the present invention.

Next, description will be made regarding an information processing device configuration example of the host and drive devices with reference to FIG. 37 and FIG. 38.

First, description will be made regarding the configuration of an information processing device serving as the host with reference to FIG. 37. An information processing device 800 includes a CPU 809 for executing data processing in accordance with various types of program such as an OS, contents playback or recording application program, mutual authentication processing program, and so forth, ROM 808 serving as a recording region such as a program, parameters, and so forth, memory 810, an input/output interface 802 for inputting/outputting a digital signal, an input/output interface 804 for inputting/outputting an analog signal, and including A/D and D/A converter 805, an MPEG codec 803 for executing encoding and decoding processing of MPEG data, TS and PS processing means 806 for executing TS (Transport Stream) and PS (Program Stream) processing, encryption processing means 807 for executing various types of encryption processing such as mutual authentication, decryption processing of encrypted contents, a recording medium 812 such as a hard disk or the like, and a drive 811 for performing driving of the recording medium 812, and input/output of a data recording/playback signal, and the respective blocks are connected to a bus 801.

The information processing device (host) 800 is connected to the drive through a connection bus such as a ATAPI-BUS or the like, for example. The above contents encrypted by the bus key is input from the digital signal input/output interface 802, and is subjected to decryption processing using the AES-CBC mode for example by the encryption processing means 807 as necessary.

Note that a program for executing playback or recording processing of contents is stored within the ROM 808 for example, and the memory 810 is employed as storage of parameters and data, or a work area during execution of the program as necessary.

The ROM 808 or the recording medium 812 stores the public key of the administration center previously described with reference to FIG. 24, a secret key corresponding to the host, a public key certificate corresponding to the host, and further, the registration information of the authorized device group list (ADGL-H), and the ADGL information certificate (AIC-H).

Next, description will be made regarding the configuration of the information processing device serving as the drive for executing readout and recording of contents stored in the information recording medium, and transfer of data as to the host. The drive 850 includes a CPU 852 for executing readout of contents, recording of contents, and data processing in accordance with various types of program such as a transfer processing program, a mutual authentication program, and so forth, ROM 855 serving as a storage area such as a program, parameters, and so forth, memory 856, an input/output interface 853 for inputting/outputting a digital signal, encryption processing means 854 for executing various types of encryption processing such as mutual authentication, generation of a bus key, encryption processing of output data, and so forth, and a recording medium interface 857 for performing driving of an information recording medium 858 such as DVD, Blu-ray disc, and so forth, and input/output of a digital recording/playback signal, and the respective blocks are connected to a bus 851.

The drive 850 is connected to the host through a connection bus such as an ATAPI-BUS or the like for example, and re-encrypts, for example, encrypted (scrambled) contents stored in the information recording medium 858 using the bus key Kbus to output this from the input/output interface 853. Encryption of contents applying the bus key Kbus is executed, for example, in the AES-CBC mode by the encryption processing means 854.

Note that the ROM 855 or the memory 856 stores the public key of the administration center previously described with reference to FIG. 24, a secret key corresponding to the drive, a public key certificate corresponding to the drive, and a device key for applying to the processing of an encryption key block RKB, and further, the ADGL information certificate (AIC-D). Also, the ROM 855 or the memory 856 stores a program and so forth for executing readout and obtaining of contents, and mutual authentication processing.

So far detailed description has been made regarding the present invention while referencing specific embodiments. However, it is fully apparent that one skilled in the art can make various modifications and substitutions to the embodiments without departing from the spirit and scope of the present invention. That is to say, the present invention has been disclosed by way of embodiments as examples, so the embodiments should be interpreted illustratively and not restrictively. In order to determine the spirit and scope of the present invention, the appended Claims should be referred to.

Note that a series of processing described within the present specification can be executed by hardware, or software, or a combined configuration of both. In the event of executing processing using software, a program which records a processing sequence can be executed by being installed into the memory within a computer integrated in dedicated hardware, or this program can be executed by being installed into a general-purpose computer capable of executing various types of processing.

For example, the program can be recorded in a hard disk or ROM (Read Only Memory) serving as a recording medium beforehand. Alternatively, the program can be temporally or eternally stored (recorded) in a removable recording medium such as CD-ROM (Compact Disc Read Only Memory), MO (Magneto Optical) disc, DVD (Digital Versatile Disc), magnetic disk, semiconductor memory, or the like. Such a removable recording medium can be provided as so-called packaged software.

Note that the program is wirelessly transferred to a computer from a download site, or is transferred to a computer by cable via a network such as a LAN (Local Area Network), the Internet, or the like in addition to installing the program into a computer from such a removable recording medium. The computer can receive the program thus transferred, and install the program into a recording medium such as a built-in hard disk, or the like.

The various types of processes described in the present specification are not restricted to being executed in that particular time-sequence; rather, the processes may be executed in parallel or individually, as necessary and depending on the processing capabilities of the device executing the processing. Note that the term "system" in the present specification means a logical group configuration of multiple devices, and is not restricted to a case in which the devices having the respective configurations are included in the same casing.

INDUSTRIAL APPLICABILITY

As described above, according to the configuration of the present invention, an arrangement is made wherein with playback or recording processing of contents accompanying data transfer between two different devices such as a drive and a host or the like, when performing mutual authentication between devices for executing data transfer, the number of times of authentication is counted, and in the event of this reaching a predetermined upper limit value of the number of times of authentication, authentication processing is cancelled, and it is necessary to update a certificate to be applied to authentication, whereby contents use due to continuity of authentication processing to which an old certificate is applied can be eliminated, and obtaining of the latest certificate can be prompted.

With the configuration of the present invention, in the event of performing transfer of contents from the transmission side (source) device to the reception side (sync) device of the contents, an authorized device group certificate is applied to determine validity of the public key certificate of each device to be applied in mutual authentication employing the public key encryption method to be executed. Further, in order to perform new/old determination of this authorized device group certificate, an arrangement is made wherein a number-of-devices data certificate (AIC) in which the number of registered devices of an authorized device group list (registration list) set as a group of authorized device group certificates, the number of invalid (revoked) devices, or the like is set as registration data is applied, an arrangement is made wherein the recency of an authorized group certificate is determined based on the changing situation of the number of registered or revoked devices of the registration information, such as regarding a certificate of which the number of registered devices is great as a new one, or regarding a certificate of which the number of revoked devices is small as a new one, an arrangement is made wherein mutual authentication is executed by determining validity of the public key certificate of a device applying a new authorized device group certificate, and further, and an arrangement is made wherein the number of times of authentication is counted, and in the event of the counted value reaching a predetermined upper limit value, authentication is cancelled, it is necessary to update a certificate to be applied to authentication, thereby preventing authentication processing to which an old authorized device certificate is applied, and illegal contents acquisition, and eliminating illegal use of contents.

An arrangement is made wherein updating processing of an authorized device group list (registration list) which an information processing device stores is executed as appropriate based on a number-of-devices data certificate (AIC) in which the number of registered devices, the number of invalid (revoked) devices, or the like is set as registration data, whereby the storage list of the information processing device for executing playback or recording processing of contents can be updated as necessary.

Further, the number of registered devices or the number of revoked devices is applied to new/old determination of each certificate, whereby the number of rewriting of flash memory to be employed as nonvolatile memory for storing certificates of the drive or host can be reduced. That is to say, in the event of new/old determination using a sequence number, all sequence numbers are updated when a sequence number is changed, and accordingly, frequency in use of flash memory increases, but upon the number of registered devices or the number of revoked devices being applied to new/old determination of each certificate, it is unnecessary to perform updating of a certificate at the drive and host when the number of registered devices or the number of revoked devices is unchanged, resulting in reduction in the number of times of rewriting of the flash memory. Accordingly, small inexpensive memory can be mounted.

The invention claimed is:

1. An information processing device, comprising:
a certificate storage unit configure to store authorized device certificates;
an authentication execution unit configured to execute device authentication processing with a recording medium access drive using an authorized device certificate stored in the certificate storage unit and an authorized device certificate stored in the recording medium access drive, when a recording medium is inserted into the recording medium access drive;
a count-value storage unit configured to count a number of times of authentication executed via said authentication execution unit and store the number of times of authentication as a count value; and
an updating execution unit configured to execute updating processing to obtain a new authorized device certificate, wherein
said authentication execution unit is further configured to execute the device authentication processing with the recording medium access drive, under a condition that the count value of the number of times of authentication has not reached a predetermined upper value of the number of times of authentication, and
said updating execution unit is further configured to execute the updating processing, under a condition that the count value of the number of times of authentication has reached the predetermined upper value of the number of times of authentication.

2. The information processing device according to claim 1, wherein
said updating execution unit is further configured to store the new authorized device certificate in said certificate storage unit under the condition that the count value of the number of times of authentication has reached the predetermined upper limit of the number of times of authentication.

3. The information processing device according to claim 2, wherein
said updating execution unit is further configured to reset the count value of the number of times of authentication stored in said count-value storage unit, when executing the updating processing.

4. The information processing device according to claim 2, wherein
said updating execution unit is further configured to obtain the new authorized device certificate from a server connected to a network.

5. The information processing device according to claim 2, wherein
said updating execution unit is further configured to execute validity confirmation processing of an authorized device certificate obtained externally and update an authorized device certificate stored in said certificate storage unit in a case of confirming validity.

6. The information processing device according to claim 1, wherein
said updating execution unit is further configured to execute notification processing, under the condition that the count value of the number of times of authentication has reached the predetermined upper limit of the number of times of authentication.

7. The information processing device according to claim 2, wherein
said updating execution unit is further configured to output at least part of the new authorized device certificate to the recording medium access drive, as certification data to be stored in the recording medium access drive.

8. The information processing device according to claim 7, wherein
said certificate data to be stored in said recording medium access drive includes data to be applied to a new/old comparison of an authorized device certificate.

9. The information processing device according to claim 8, wherein
said data to be applied to the new/old comparison of an authorized device certificate is one of a sequence number in an authorized device certificate, a number of registered devices in an authorized device certificate, and a number of invalid devices in an authorized device certificate.

10. An information processing method for causing an information processing apparatus to perform authentication processing, comprising:
storing authorized device certificates in a certificate storage unit;
comparing a count value of a number of times of authentication and a predetermined upper limit value of the number of times of authentication;
authenticating with a recording medium access drive using an authorized device certificate stored in the storing and an authorized device certificated stored in the recording medium access drive, by an authentication execution unit, when a recording medium is inserted into the recording access drive and under a condition that the count value of the number of times of authentication has not reached a predetermined upper limit value of the number of times of authentication; and
updating an authorized device certificate to obtain a new authorized device certificate, under a condition that the count value of the number of times of authentication has reached the predetermined upper value of the number of times of authentication.

11. The information processing method according to claim 10, further comprising
counting the number of times of authentication and storing the counted number of times of authentication as the count value of the number of times of authentication, when authenticating.

12. The information processing method according to claim 10, further comprising
storing the new authorized device certificate in said certificate storage unit, under the condition that the count value of the number of times of authentication has reached the predetermined upper limit of the number of times of authentication.

13. The information processing method according to claim 11, further comprising
resetting the count value of the number of times of authentication stored in said storage unit, when updating.

14. The information processing method according to claim 12, wherein
the updating includes obtaining the new authorized device certificate from a server connected to a network.

15. The information processing method according to claim 12, wherein
the updating further comprises executing validity confirmation processing of an authorized device certificate obtained externally and updating an authorized device certificate stored in said certificate storage unit, in a case of confirming validity.

16. The information processing method according to claim 10, further comprising
notifying a user, under the condition that the count value of the number of times of authentication has reached the predetermined upper limit of the number of times of authentication.

17. The information processing method according to claim 12, further comprising
outputting at least part of the new authorized device certificate to the recording medium access drive, as certification data to be stored in the recording medium access drive.

18. The information processing method according to claim 17, wherein
said certificate data to be stored in the recording medium access drive includes data to be applied to a new/old comparison of an authorized device certificate.

19. The information processing method according to claim 18, wherein
said data to be applied to the new/old comparison of an authorized device certificate is one of a sequence number in an authorized device certificate, a number of registered devices in an authorized device certificate, and a number of invalid devices in an authorized device certificate.

20. A computer readable storage medium storing computer readable instructions thereon, that, when executed by a processor, cause the processor to execute a process, comprising:
storing authorized device certificates in a certificate storage unit;
comparing a count value of a number of times of authentication and a predetermined upper limit value of the number of times of authentication;
authenticating with a recording medium access drive using an authorized device certificate stored in the storing and an authorized device certificated stored in the recording medium access drive, when a recording medium is inserted into the recording access drive and under a condition that the count value of the number of times of authentication has not reached a predetermined upper limit value of the number of times of authentication; and
updating an authorized device certificate to obtain a new authorized device certificate, under a condition that the count value of the number of times of authentication has reached the predetermined upper value of the number of times of authentication.

* * * * *